US012794982B1

(12) United States Patent
Gerzon et al.

(10) Patent No.: US 12,794,982 B1
(45) Date of Patent: Nov. 10, 2026

(54) SYSTEMS AND METHODS FOR DYNAMIC DATA RECORD ALLOCATION

(71) Applicant: DK Crown Holdings Inc., Boston, MA (US)

(72) Inventors: Yuriy Gerzon, North Easton, MA (US); Daniel Hannigan-Daley, Toronto (CA); Ryan Thomas Cave, Carrollton, TX (US)

(73) Assignee: DK Crown Holdings Inc., Boston, MA (US)

( * ) Notice: Subject to any disclaimer, the term of this patent is extended or adjusted under 35 U.S.C. 154(b) by 0 days.

(21) Appl. No.: 19/441,115

(22) Filed: Jan. 6, 2026

(51) Int. Cl.
*H04L 67/1097* (2022.01)
*G07F 17/32* (2006.01)

(52) U.S. Cl.
CPC ...... *H04L 67/1097* (2013.01); *G07F 17/3237* (2013.01); *G07F 17/3288* (2013.01)

(58) Field of Classification Search
CPC ...... G06F 16/248; G06F 3/0482; G06F 40/30; G06N 20/00; G06N 3/045; G06N 3/08; G06N 3/09; G06N 5/04; G06Q 10/06315; G06Q 10/067; G06Q 10/10; G06Q 10/40; G06Q 30/02; G06Q 30/0201; G06Q 50/34; G07F 17/3223; G07F 17/3225; G07F 17/323; G07F 17/3237; G07F 17/3239; G07F 17/3244; G07F 17/3276; G07F 17/3288; H04L 41/16; H04L 41/22; H04L 43/08; H04L 63/1416; H04L 63/1425; H04L 63/1433; H04L 63/20; H04L 67/02; H04L 67/10; H04L 67/1097; H04L 67/12; H04L 67/306; H04L 67/535
See application file for complete search history.

(56) References Cited

U.S. PATENT DOCUMENTS

| | | |
|---|---|---|
| 8,585,496 B2 | 11/2013 | Demino et al. |
| 8,756,178 B1 | 6/2014 | Bruckhaus et al. |
| 9,183,296 B1 | 11/2015 | Song et al. |

(Continued)

FOREIGN PATENT DOCUMENTS

WO WO-2023/064563 A1 4/2023

OTHER PUBLICATIONS

International Search Report & Written Opinion on International Patent Application No. PCT/US2026/010301, dated May 15, 2026.

(Continued)

*Primary Examiner* — Christopher Biagini
(74) *Attorney, Agent, or Firm* — Foley & Lardner LLP

(57) ABSTRACT

Systems and methods for managing data operations in distributed computing environments are disclosed. A system can maintain a plurality of sessions. The system can receive, from a client device associated with a network profile, a request identifying a grouping comprising a plurality of selections. The system can select, based on the plurality of selections of the grouping, a subset of sessions in which the grouping is to be entered. The system can determine, based on the plurality of selections and a subset of live events, that a first condition of the grouping is satisfied prior to completion of all of the live events and update the profile according to a first output value. The system can determine, based on outcomes of the subset of sessions, a second output value for the grouping and update the network profile according to the second output value.

20 Claims, 13 Drawing Sheets

(56) References Cited

U.S. PATENT DOCUMENTS

| | | | | |
|---|---|---|---|---|
| 10,861,289 | B1 * | 12/2020 | Gordon | G07F 17/3225 |
| 2009/0309352 | A1 * | 12/2009 | Walker | G07F 17/329 29/527.2 |
| 2013/0137507 | A1 | 5/2013 | Walker et al. | |
| 2014/0011561 | A1 | 1/2014 | Lutnick et al. | |
| 2018/0025586 | A1 | 1/2018 | Lockton | |
| 2019/0371128 | A1 * | 12/2019 | Koustas | G06Q 50/34 |
| 2020/0084085 | A1 | 3/2020 | Tucker et al. | |
| 2020/0265673 | A1 | 8/2020 | Oberberger et al. | |
| 2020/0364745 | A1 | 11/2020 | Lewis et al. | |
| 2021/0334707 | A1 | 10/2021 | Walters et al. | |
| 2022/0122421 | A1 | 4/2022 | Huke et al. | |
| 2023/0241516 | A1 * | 8/2023 | Salik | A63F 13/828 463/42 |
| 2023/0282063 | A1 | 9/2023 | Mendell et al. | |
| 2023/0283854 | A1 | 9/2023 | Mendell et al. | |
| 2023/0321529 | A1 | 10/2023 | Sundareson | |
| 2024/0086773 | A1 | 3/2024 | Oppenheimer | |
| 2024/0314401 | A1 | 9/2024 | Mendell | |
| 2024/0419300 | A1 | 12/2024 | Mcivor et al. | |
| 2025/0006013 | A1 | 1/2025 | Fine et al. | |
| 2025/0265671 | A1 | 8/2025 | Wexler et al. | |
| 2025/0371942 | A1 | 12/2025 | Cloud et al. | |
| 2025/0371945 | A1 | 12/2025 | Huss et al. | |
| 2026/0141778 | A1 | 5/2026 | Enzminger et al. | |

OTHER PUBLICATIONS

Non-Final Office Action on U.S. Appl. No. 19/441,152, dated Apr. 1, 2026.

Non-Final Office Action on U.S. Appl. No. 19/441,146, dated Mar. 12, 2026.

Notice of Allowance on U.S. Appl. No. 19/441,146 dated Jul. 10, 2026.

Notice of Allowance on U.S. Appl. No. 19/441,152 dated Jul. 23, 2026.

* cited by examiner

300A

300B

300C

300E

SYSTEMS AND METHODS FOR DYNAMIC DATA RECORD ALLOCATION

BACKGROUND

Providing synchronized information is useful for networked computing environments including multiple computing systems. Information can be shared using different formats or protocols. It is challenging to provide synchronized information efficiently in computing systems via computer networks having different types of computing devices.

SUMMARY

Conventional data allocation systems can rely on binary event datasets in which statistical parameters are modeled as approximately equal probability conditions to allocate processing resources. Such environments can use fixed multipliers and/or constant scaling ratios that assume uniform likelihoods for event success and failure across data records/selections. When external data sources, such as dynamically sourced feeds and/or data interfaces, include event parameters with asymmetrical probability distributions, conventional approaches can experience instability in multiplier scaling and/or system resource allocation. Under such circumstances, excessive output distributions can occur for improbable combinations, or minimal weighting can reduce uniformity among more frequent conditions. As a result, base processing operations can fail to generate suitable outcome values for such data. Such limitations restrict the ability of peer-based data exchange approaches to process variable-probability datasets.

The techniques described herein can implement a probability transformation process in which externally obtained values can be converted into normalized multiplier parameters for use within distributed data processing environments. In some implementations, the systems and methods described herein can extract event information from data sources/interfaces and generate/obtain one or more probability values for each identified event based on value transformation and/or normalization operations. In some implementations, a nonlinear function can be applied to the derived probability to generate a multiplier that scales inversely with likelihood. Such multipliers of different conditional events/selections can be limited by a configurable ceiling parameter, such that further operations can properly process the conditional events/selections according to the distributed processing techniques described herein.

At least one aspect relates to a system. The system can include one or more processors coupled to non-transitory memory. The system can maintain a plurality of sessions corresponding to a plurality of live events. The system can receive, from a client device associated with a network profile, a request identifying a grouping comprising a plurality of selections, where the grouping corresponds to a plurality of conditions respectively associated with a plurality of output values. The system can select, based on the plurality of selections of the grouping, a subset of sessions of the plurality of sessions in which the grouping is to be entered. The system can determine, based on the plurality of selections of the grouping and a subset of the plurality of live events corresponding to the plurality of selections, that a first condition of the plurality of conditions of the grouping is satisfied prior to completion of all of the plurality of live events. The system can update the network profile according to a first output value determined based on a first output value of the plurality of output values corresponding to the first condition responsive to determining that the first condition of the grouping has been satisfied. The system can determine, based on a respective outcome of each session of the subset of the plurality of sessions following the completion of all of the plurality of live events, a second output value for the grouping. The system can update the network profile according to the second output value.

In some implementations, the system can determine that the first condition of the grouping is satisfied based on a predetermined number of the plurality of selections being satisfied. In some implementations, the system can determine a number of the plurality of selections that are satisfied prior to completion of all of the plurality of live events. In some implementations, the system can determine the first output value based on the number of the plurality of selections that are satisfied prior to completion of all of the plurality of live events.

In some implementations, the system can receive, from the client device, an indication of an input value associated with the grouping. In some implementations, the system can determine the first output value based at least in part on a multiplier and the input value. In some implementations, the system can determine the multiplier as a function of a number of the plurality of selections that are satisfied.

In some implementations, the system can receive, from one or more external data sources, outcome data corresponding to the subset of the plurality of live events. In some implementations, the system can determine that the first condition is satisfied based at least in part on the outcome data indicating that the plurality of selections satisfy a predetermined level of correctness. In some implementations, the system can determine, based on the outcome data, that all of the plurality of live events have been completed. In some implementations, the system can determine the second output value for the grouping responsive to determining that all of the plurality of live events have completed.

In some implementations, the system can determine that the second output value exceeds the first output value. In some implementations, the system can update the network profile based on an additional output value equal to a difference between the second output value and the first output value. In some implementations, updating the network profile according to the first output value comprises updating the network profile based on the first output value prior to determining the second output value. In some implementations, the system can determine that a total output value for the grouping does not exceed the first output value. In some implementations, the system can determine that the second output value is zero in response to determining that the total output value for the grouping does not exceed the first output value.

At least one other aspect relates to a method. The method can be performed, for example, by one or more processors coupled to non-transitory memory. The method can include maintaining a plurality of sessions corresponding to a plurality of live events. The method can include receiving, from a client device associated with a network profile, a request identifying a grouping comprising a plurality of selections, where the grouping corresponds to a plurality of conditions respectively associated with a plurality of output values. The method can include selecting, based on the plurality of selections of the grouping, a subset of sessions of the plurality of sessions in which the grouping is to be entered. The method can include determining, based on the plurality of selections of the grouping and a subset of the plurality of live events corresponding to the plurality of selections, that a first condition of the plurality of conditions of the grouping is satisfied prior to completion of all of the plurality of live events. The method can include updating a network profile according to a first output value determined based on a first output value of the plurality of output values corresponding to the first condition responsive to determining that the first condition of the grouping has been satisfied. The method can include determining, based on a respective outcome of each session of the subset of the plurality of sessions following the completion of all of the plurality of live events, a second output value for the grouping. The method can include updating the network profile according to the second output value.

In some implementations, the method can include determining that the first condition of the grouping is satisfied based on a predetermined number of the plurality of selections being satisfied. In some implementations, the method can include determining a number of the plurality of selections that are satisfied prior to completion of all of the plurality of live events. In some implementations, the method can include determining the first output value based on the number of the plurality of selections that are satisfied prior to completion of all of the plurality of live events.

In some implementations, the method can include receiving, from the client device, an indication of an input value associated with the grouping. In some implementations, the method can include determining the first output value based at least in part on a multiplier and the input value. In some implementations, the method can include determining the multiplier as a function of a number of the plurality of selections that are satisfied.

In some implementations, the method can include receiving, from one or more external data sources, outcome data corresponding to the subset of the plurality of live events. In some implementations, the method can include determining that the first condition is satisfied based at least in part on the outcome data indicating that the plurality of selections satisfy a predetermined level of correctness. In some implementations, the method can include determining, based on the outcome data, that all of the plurality of live events have been completed. In some implementations, the method can include determining the second output value for the grouping responsive to determining that all of the plurality of live events have completed.

In some implementations, the method can include determining that the second output value exceeds the first output value. In some implementations, the method can include updating the network profile based on an additional output value equal to a difference between the second output value and the first output value. In some implementations, updating the network profile according to the first output value comprises updating the network profile based on the first output value prior to determining the second output value. In some implementations, the method can include determining that a total output value for the grouping does not exceed the first output value. In some implementations, the method can include determining that the second output value is zero in response to determining that the total output value for the grouping does not exceed the first output value.

At least one aspect relates to a system. The system can include one or more processors coupled to non-transitory memory. The system can maintain a plurality of sessions corresponding to one or more live events, with each session of the plurality of sessions corresponding to a respective one of a plurality of classifications, wherein each first session of a first subset of the plurality of sessions corresponds to a first classification and each second session of a second subset of the plurality of sessions corresponds to a second classification. The system can receive, from a client device, a request identifying a grouping comprising a plurality of selections. The system can determine that at least one first selection of the plurality of selections corresponds to the first classification, wherein the at least one first selection of the plurality of selections is associated with a respective first probability value that is greater than a threshold and each other selection of the plurality of selections is associated with a respective second probability value that is less than the threshold. The system can, responsive to determining that at least one of the plurality of selections corresponds to the first classification, select, based on a category of the grouping, one or more sessions of the first subset corresponding to the first classification in which the grouping is to be entered. The system can determine an output value for the grouping across the one or more sessions of the first subset corresponding to the first classification based on corresponding outcomes of the one or more live events and corresponding entrants for the one or more sessions of the first subset corresponding to the first classification. The system can provide, to the client device, an indication of the output value for the grouping.

In some implementations, the system can restrict assignment of the grouping to both the first subset and the second subset. In some implementations, the system can determine, for each selection of the grouping, whether the selection satisfies a first set of criteria corresponding to the first classification. In some implementations, the system can receive an indication of an input value for the grouping. In some implementations, the system can determine the output value for the grouping further based on the input value.

In some implementations, the system can assign a respective portion of the input value to the one or more sessions of the first subset in which the grouping is to be entered. In some implementations, the system can select the one or more sessions of the first subset in which the grouping is to be entered based on the input value. In some implementations, the system can generate an additional session within the first subset responsive to determining that a threshold number of groupings having at least one selection corresponding to the first classification have been received.

In some implementations, the system can maintain a data structure storing a plurality of selections in association with a respective classification for each selection of the plurality of selections. In some implementations, the system can provide a graphical user interface indicating a plurality of candidate selections from which the plurality of selections are to be selected, with each candidate selection of the plurality of candidate selections presented with an indication of the first classification or the second classification. In some implementations, the system can determine the corresponding outcomes of the one or more live events based on one or more messages received via an application programing interface.

At least one other aspect relates to a method. The method can be performed, for example, by one or more processors coupled to non-transitory memory. The method can include maintaining a plurality of sessions corresponding to one or more live events, with each session of the plurality of sessions corresponding to a respective one of a plurality of classifications, wherein each first session of a first subset of the plurality of sessions corresponds to a first classification and each second session of a second subset of the plurality of sessions corresponds to a second classification. The method can include receiving, from a client device, a request identifying a grouping comprising a plurality of selections. The method can include determining that at least one first selection of the plurality of selections corresponds to the first classification, wherein the at least one first selection of the plurality of selections is associated with a respective first probability value that is greater than a threshold and each other selection of the plurality of selections is associated with a respective second probability value that is less than the threshold. The method can include, responsive to determining that at least one of the plurality of selections corresponds to the first classification, selecting, based on a category of the grouping, one or more sessions of the first subset corresponding to the first classification in which the grouping is to be entered. The method can include determining an output value for the grouping across the one or more sessions of the first subset corresponding to the first classification based on corresponding outcomes of the one or more live events and corresponding entrants for the one or more sessions of the first subset corresponding to the first classification. The method can include providing, to the client device, an indication of the output value for the grouping.

In some implementations, the method can include restricting assignment of the grouping to both the first subset and the second subset. In some implementations, the method can include determining, for each selection of the grouping, whether the selection satisfies a first set of criteria corresponding to the first classification. In some implementations, the method can include receiving an indication of an input value for the grouping. In some implementations, the method can include determining the output value for the grouping further based on the input value.

In some implementations, the method can include assigning a respective portion of the input value to the one or more sessions of the first subset in which the grouping is to be entered. In some implementations, the method can include selecting the one or more sessions of the first subset in which the grouping is to be entered based on the input value. In some implementations, the method can include generating an additional session within the first subset responsive to determining that a threshold number of groupings having at least one selection corresponding to the first classification have been received.

In some implementations, the method can include maintaining a data structure storing a plurality of selections in association with a respective classification for each selection of the plurality of selections. In some implementations, the method can include providing a graphical user interface indicating a plurality of candidate selections from which the plurality of selections are to be selected, with each candidate selection of the plurality of candidate selections presented with an indication of the first classification or the second classification. In some implementations, the method can include determining the corresponding outcomes of the one or more live events based on one or more messages received via an application programing interface.

At least one aspect relates to a system. The system can include one or more processors coupled to non-transitory memory. The system can maintain a plurality of sessions and a plurality of candidate selections corresponding to one or more live events. The system can retrieve a plurality of probability values of a plurality of data records that respectively correspond to a plurality of candidate selections. The system can generate, using the plurality of probability values, a plurality of multiplier values respectively corresponding to the plurality of candidate selections. The system can receive, from a client device, a request identifying a network profile and a grouping comprising a set of selections selected from the plurality of candidate selections. The system can select, based on the set of selections of the grouping, a subset of the plurality of sessions in which the grouping is to be entered. The system can determine, based on one or more messages indicating one or more events that occurred in the one or more live events, a respective outcome of each session of the subset of the plurality of sessions. The system can determine an output value for the grouping based on the respective outcome of each session of the subset of the plurality of sessions and each respective multiplier value of the plurality of multiplier values corresponding to each selection of the set of selections of the grouping. The system can update the network profile according to the output value for the grouping.

In some implementations, the system can retrieve the plurality of probability values via one or more application programming interfaces. In some implementations, the system can determine, for at least one candidate selection of the plurality of candidate selections, that a corresponding data record of the plurality of data records is associated with a probability value different from a 50% probability. In some implementations, the system can generate a multiplier value of the plurality of multiplier values for the at least one candidate selection in response to determining that the corresponding data record is associated with the probability value different from the 50% probability. In some implementations, the system can generate each multiplier value of the plurality of multiplier values to be less than a predetermined multiplier value. In some implementations, the system can detect a change to a first probability value of a first data record corresponding to a first selection of the set of selections.

In some implementations, the system can update a first multiplier value of the plurality of multiplier values associated with the first selection in response to detecting the change to the first probability value of the first data record. In some implementations, the system can receive, from the client device, an indication of an input value associated with the grouping. In some implementations, the system can determine the output value for the grouping further based on the input value associated with the grouping. In some implementations, the system can determine a cumulative multiplier value for the grouping based on each respective multiplier value of the plurality of multiplier values corresponding to each selection of the set of selections of the grouping. In some implementations, the system can determine the output value for the grouping based on the cumulative multiplier value.

In some implementations, the system can maintain, in the non-transitory memory, a data structure storing each candidate selection of the plurality of candidate selections in association with a respective data record of the plurality of data records and a respective multiplier value of the plurality of multiplier values. In some implementations, the system can determine that at least one candidate selection of the plurality of candidate selections satisfies a criterion. In some implementations, the system can assign a multiplier value of the plurality of multiplier values to the at least one candidate selection based on the criterion. In some implementations, the system can receive, from one or more external data feeds, event data corresponding to the one or more live events. In some implementations, the system can determine the respective outcome of each session of the subset of the plurality of sessions based at least in part on the event data.

At least one other aspect relates to a method. The method can be performed, for example, by one or more processors coupled to non-transitory memory. The method can include maintaining a plurality of sessions and a plurality of candidate selections corresponding to one or more live events.

The method can include retrieving a plurality of probability values of a plurality of data records that respectively correspond to a plurality of candidate selections. The method can include generating, using the plurality of probability values, a plurality of multiplier values respectively corresponding to the plurality of candidate selections. The method can include receiving, from a client device, a request identifying a network profile and a grouping comprising a set of selections selected from the plurality of candidate selections. The method can include selecting, based on the set of selections of the grouping, a subset of the plurality of sessions in which the grouping is to be entered. The method can include determining, based on one or more messages indicating one or more events that occurred in the one or more live events, a respective outcome of each session of the subset of the plurality of sessions. The method can include determining an output value for the grouping based on the respective outcome of each session of the subset of the plurality of sessions and each respective multiplier value of the plurality of multiplier values corresponding to each selection of the set of selections of the grouping. The method can include updating the network profile according to the output value for the grouping.

In some implementations, the method can include retrieving the plurality of probability values via one or more application programming interfaces. In some implementations, the method can include determining, for at least one candidate selection of the plurality of candidate selections, that a corresponding data record of the plurality of data records is associated with a probability value different from a 50% probability. In some implementations, the method can include generating a multiplier value of the plurality of multiplier values for the at least one candidate selection in response to determining that the corresponding data record is associated with the probability value different from the 50% probability. In some implementations, the method can include generating each multiplier value of the plurality of multiplier values to be less than a predetermined multiplier value. In some implementations, the method can include detecting a change to a first probability value of a first data record corresponding to a first selection of the set of selections. In some implementations, the method can include updating a first multiplier value of the plurality of multiplier values associated with the first selection in response to detecting the change to the first probability value of the first data record.

In some implementations, the method can include receiving, from the client device, an indication of an input value associated with the grouping. In some implementations, the method can include determining the output value for the grouping further based on the input value associated with the grouping. In some implementations, the method can include determining a cumulative multiplier value for the grouping based on each respective multiplier value of the plurality of multiplier values corresponding to each selection of the set of selections of the grouping. In some implementations, the method can include determining the output value for the grouping based on the cumulative multiplier value.

In some implementations, the method can include maintaining, in the non-transitory memory, a data structure storing each candidate selection of the plurality of candidate selections in association with a respective data record of the plurality of data records and a respective multiplier value of the plurality of multiplier values. In some implementations, the method can include determining that at least one candidate selection of the plurality of candidate selections satisfies a criterion. In some implementations, the method can include assigning a multiplier value of the plurality of multiplier values to the at least one candidate selection based on the criterion. In some implementations, the method can include receiving, from one or more external data feeds, event data corresponding to the one or more live events. In some implementations, the method can include determining the respective outcome of each session of the subset of the plurality of sessions based at least in part on the event data.

These and other aspects and implementations are discussed in detail below. The foregoing information and the following detailed description include illustrative examples of various aspects and implementations and provide an overview or framework for understanding the nature and character of the claimed aspects and implementations. The drawings provide illustration and a further understanding of the various aspects and implementations and are incorporated in and constitute a part of this specification. Aspects can be combined, and it will be readily appreciated that features described in the context of one aspect of the invention can be combined with other aspects. Aspects can be implemented in any convenient form, for example, by appropriate computer programs, which may be carried on appropriate carrier media (computer readable media), which may be tangible carrier media (e.g., disks) or intangible carrier media (e.g., communications signals). Aspects may also be implemented using any suitable apparatus, which may take the form of programmable computers running computer programs arranged to implement the aspect. As used in the specification and in the claims, the singular form of 'a,' 'an,' and 'the' include plural referents unless the context clearly dictates otherwise.

BRIEF DESCRIPTION OF THE DRAWINGS

The accompanying drawings are not intended to be drawn to scale. Like reference numbers and designations in the various drawings indicate like elements. For purposes of clarity, not every component may be labeled in every drawing. In the drawings.

DETAILED DESCRIPTION

Below are detailed descriptions of various concepts related to, and approaches, methods, apparatuses, and systems for implementing the various techniques described herein. The various concepts introduced above and discussed in greater detail below may be implemented in any of numerous ways, as the described concepts are not limited to any particular manner of implementation. Examples of specific implementations and applications are provided primarily for illustrative purposes.

Computing and Network Environment

Figure 1A:
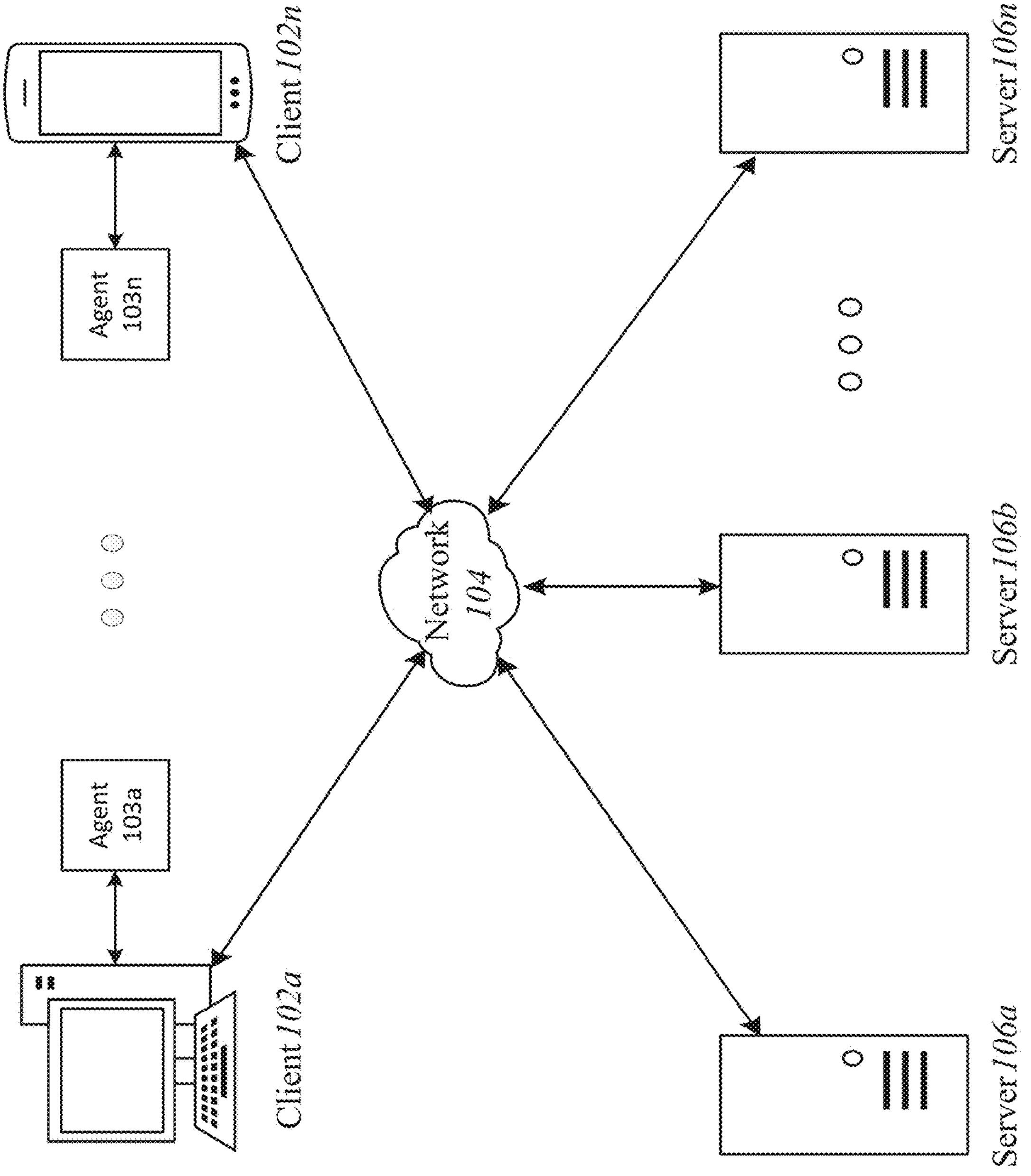
FIG. 1A is a block diagram depicting an embodiment of a network environment comprising a client device in communication with a server device, in accordance with one or more implementations.

Referring to FIG. 1A, an embodiment of a network environment is depicted for managing network sessions of network applications. In brief overview, the network environment includes one or more clients 102*a*-102*n* (also generally referred to as local machine(s) 102, client(s) 102, client node(s) 102, client machine(s) 102, client computer(s) 102, client device(s) 102, endpoint(s) 102, or endpoint node(s) 102) in communication with one or more agents 103*a*-103*n* and one or more servers 106*a*-106*n* (also generally referred to as server(s) 106, node 106, or remote machine(s) 106) via one or more networks 104. In some embodiments, a client 102 has the capacity to function as both a client node seeking access to resources provided by a server and as a server providing access to hosted resources for other clients 102*a*-102*n*.

Although FIG. 1A shows a network 104 between the clients 102 and the servers 106, the clients 102 and the servers 106 may be on the same network 104. In some embodiments, there are multiple networks 104 between the clients 102 and the servers 106. In one of these embodiments, a network 104' (not shown) may be a private network and a network 104 may be a public network. In another of these embodiments, a network 104 may be a private network and a network 104' a public network. In still another of these embodiments, networks 104 and 104' may both be private networks.

The network 104 may be connected via wired or wireless links. Wired links may include Digital Subscriber Line (DSL), coaxial cable lines, or optical fiber lines. The wireless links may include BLUETOOTH, Wi-Fi, Worldwide Interoperability for Microwave Access (WiMAX), an infrared channel, or satellite band. The wireless links may also include any cellular network standards used to communicate among mobile devices, including standards that qualify as 1G, 2G, 3G, 4G, or 5G. The network standards may qualify as one or more generation of mobile telecommunication standards by fulfilling a specification or standards such as the specifications maintained by International Telecommunication Union. The 3G standards, for example, may correspond to the International Mobile Telecommunications-2000 (IMT-2000) specification, and the 4G standards may correspond to the International Mobile Telecommunications Advanced (IMT-Advanced) specification. Examples of cellular network standards include AMPS, GSM, GPRS, UMTS, LTE, LTE Advanced, Mobile WiMAX, and WiMAX-Advanced. Cellular network standards may use various channel access methods, e.g., FDMA, TDMA, CDMA, or SDMA. In some embodiments, different types of data may be transmitted via different links and standards. In other embodiments, the same types of data may be transmitted via different links and standards.

The network 104 may be any type and/or form of network. The geographical scope of the network 104 may vary widely and the network 104 can be a body area network (BAN), a personal area network (PAN), a local-area network (LAN) (e.g., Intranet), a metropolitan area network (MAN), a wide area network (WAN), or the Internet. The topology of the network 104 may be of any form and may include, e.g., any of the following: point-to-point, bus, star, ring, mesh, or tree. The network 104 may be an overlay network which is virtual and sits on top of one or more layers of other networks 104'. The network 104 may be of any such network topology as known to those ordinarily skilled in the art capable of supporting the operations described herein. The network 104 may utilize different techniques and layers or stacks of protocols, including, e.g., the Ethernet protocol, the internet protocol suite (TCP/IP), the ATM (Asynchronous Transfer Mode) technique, the SONET (Synchronous Optical Networking) protocol, or the SDH (Synchronous Digital Hierarchy) protocol. The TCP/IP internet protocol suite may include application layer, transport layer, internet layer (including, e.g., IPv6), or the link layer. The network 104 may be a type of a broadcast network, a telecommunications network, a data communication network, or a computer network.

In some embodiments, the system may include multiple, logically grouped servers 106. In one of these embodiments, the logical group of servers may be referred to as a server farm 38 (not shown) or a machine farm 38. In another of these embodiments, the servers 106 may be geographically dispersed. In other embodiments, a machine farm 38 may be administered as a single entity. In still other embodiments, the machine farm 38 includes a plurality of machine farms 38. The servers 106 within each machine farm 38 can be heterogeneous-one or more of the servers 106 or remote machines 106 can operate according to one type of operating system platform (e.g., WINDOWS NT, manufactured by Microsoft Corp. of Redmond, Washington), while one or more of the other servers 106 can operate according to another type of operating system platform (e.g., Unix, Linux, or Mac OS X).

In one embodiment, servers 106 in the machine farm 38 may be stored in high-density rack systems, along with associated storage systems, and located in an enterprise data center. In this embodiment, consolidating the servers 106 in this way may improve system manageability, data security, the physical security of the system, and system performance by locating servers 106 and high performance storage systems on localized high performance networks 104. Centralizing the servers 106 and storage systems and coupling them with advanced system management tools allows more efficient use of server resources.

The servers 106 of each machine farm 38 do not need to be physically proximate to another server 106 in the same machine farm 38. Thus, the group of servers 106 logically grouped as a machine farm 38 may be interconnected using a wide-area network (WAN) connection or a metropolitan-area network (MAN) connection. For example, a machine farm 38 may include servers 106 physically located in different continents or different regions of a continent, country, state, city, campus, or room. Data transmission speeds between servers 106 in the machine farm 38 can be increased if the servers 106 are connected using a local-area network (LAN) connection or some form of direct connection. Additionally, a heterogeneous machine farm 38 may include one or more servers 106 operating according to a type of operating system, while one or more other servers 106 execute one or more types of hypervisors rather than operating systems. In these embodiments, hypervisors may be used to emulate virtual hardware, partition physical hardware, virtualize physical hardware, and execute virtual machines that provide access to computing environments, allowing multiple operating systems to run concurrently on a host computer. Native hypervisors may run directly on the host computer. Hypervisors may include VMware ESX/ESXi, manufactured by VMWare, Inc., of Palo Alto, California; the Xen hypervisor, an open source product whose development is overseen by Citrix Systems, Inc.; the HYPER-V hypervisors provided by Microsoft, or others. Hosted hypervisors may run within an operating system on a second software level. Examples of hosted hypervisors may include VMware Workstation and VIRTUALBOX.

Management of the machine farm 38 may be decentralized. For example, one or more servers 106 may comprise components, subsystems, and modules to support one or more management services for the machine farm 38. In one of these embodiments, one or more servers 106 provide functionality for management of dynamic data, including techniques for handling failover, data replication, and increasing the robustness of the machine farm 38. Each server 106 may communicate with a persistent store and, in some embodiments, with a dynamic store.

Server 106 may be a file server, application server, web server, proxy server, appliance, network appliance, gateway, gateway server, virtualization server, deployment server, SSL VPN server, or firewall/security system. In one embodiment, the server 106 may be referred to as a remote machine or a node. In another embodiment, a plurality of nodes 106 may be in the path between any two communicating servers.

Figure 1B:
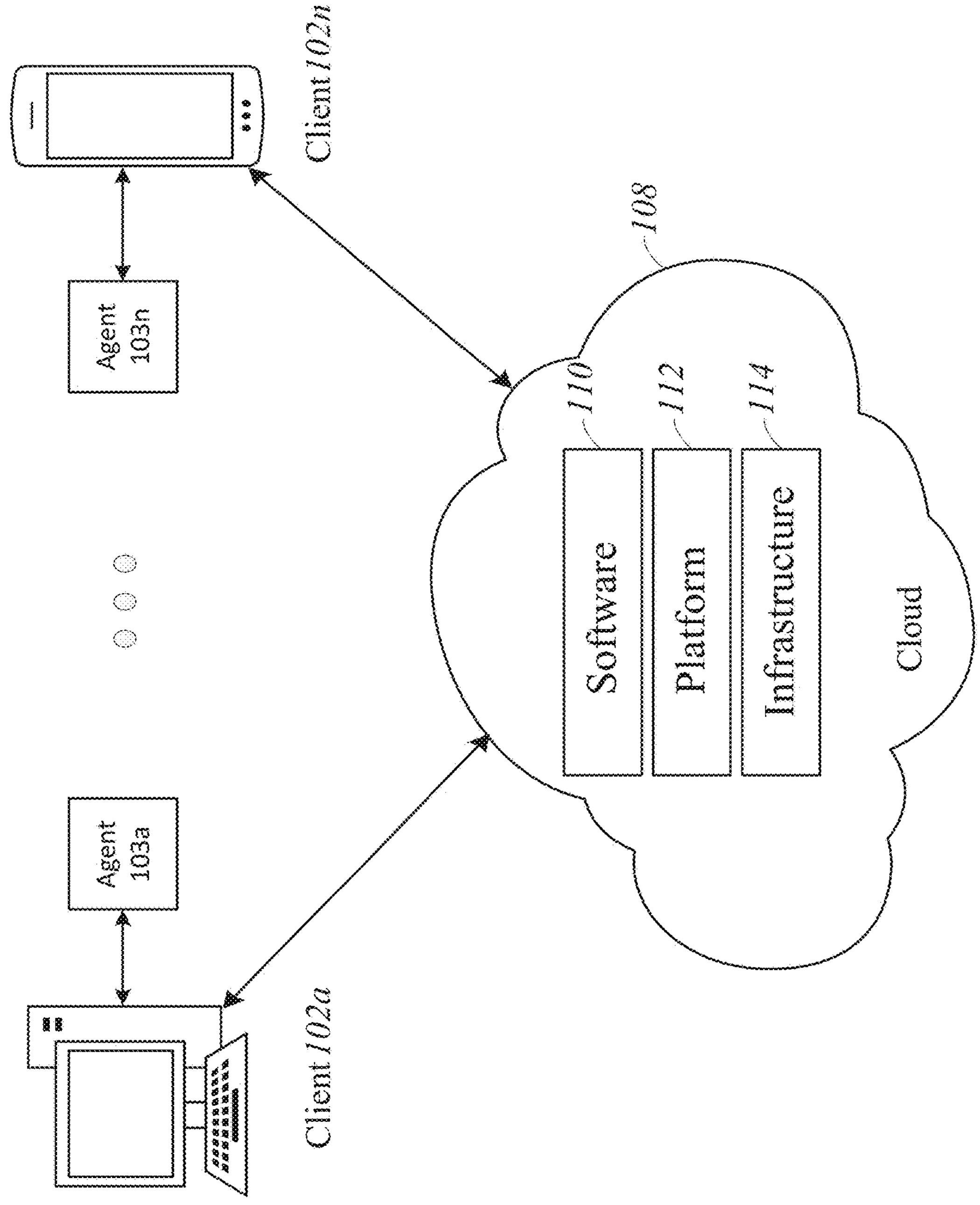
FIG. 1B is a block diagram depicting a cloud computing environment comprising a client device in communication with cloud service providers, in accordance with one or more implementations.

Referring to FIG. 1B, a cloud computing environment is depicted for managing network sessions of network applications. A cloud computing environment may provide client 102 with one or more resources provided by a network environment. The cloud computing environment may include one or more clients 102*a*-102*n*, in communication with respective agents 103*a*-103*n* and with the cloud 108 over one or more networks 104. Clients 102 may include, e.g., thick clients, thin clients, and zero clients. A thick client may provide at least some functionality even when disconnected from the cloud 108 or servers 106. A thin client or a zero client may depend on the connection to the cloud 108 or server 106 to provide functionality. A zero client may depend on the cloud 108 or other networks 104 or servers 106 to retrieve operating system data for the client device. The cloud 108 may include back end platforms, e.g., servers 106, storage, server farms, or data centers.

The cloud 108 may be public, private, or hybrid. Public clouds may include public servers 106 that are maintained by third parties to the clients 102 or the owners of the clients.

The servers 106 may be located off-site in remote geographical locations as disclosed above or otherwise. Public clouds 108 may be connected to the servers 106 over a public network 104. Private clouds 108 may include private servers 106 that are physically maintained by clients 102 or owners of clients. Private clouds 108 may be connected to the servers 106 over a private network 104. Hybrid clouds 108 may include both the private and public networks 104 and servers 106.

The cloud 108 may also include a cloud based delivery, e.g., Software as a Service (SaaS) 110, Platform as a Service (PaaS) 112, and Infrastructure as a Service (IaaS) 114. IaaS may refer to a user renting the use of infrastructure resources that are needed during a specified time period. IaaS providers may offer storage, networking, servers, or virtualization resources from large pools, allowing the users to quickly scale up by accessing more resources as needed. Examples of IaaS include AMAZON WEB SERVICES provided by Amazon.com, Inc., of Seattle, Washington; RACKSPACE CLOUD provided by Rackspace US, Inc., of San Antonio, Texas; Google Compute Engine provided by Google Inc. of Mountain View, California; or RIGHTSCALE provided by RightScale, Inc., of Santa Barbara, California. PaaS providers may offer functionality provided by IaaS, including, e.g., storage, networking, servers, or virtualization, as well as additional resources such as, e.g., the operating system, middleware, or runtime resources. Examples of PaaS include WINDOWS AZURE provided by Microsoft Corporation of Redmond, Washington; Google App Engine provided by Google Inc.; and HEROKU provided by Heroku, Inc., of San Francisco, California. SaaS providers may offer the resources that PaaS provides, including storage, networking, servers, virtualization, operating system, middleware, or runtime resources. In some embodiments, SaaS providers may offer additional resources, including, e.g., data and application resources. Examples of SaaS include GOOGLE APPS provided by Google Inc.; SALESFORCE provided by Salesforce.com Inc. of San Francisco, California; or OFFICE 365 provided by Microsoft Corporation. Examples of SaaS may also include data storage providers, e.g., DROPBOX provided by Dropbox, Inc., of San Francisco, California; Microsoft SKYDRIVE provided by Microsoft Corporation; Google Drive provided by Google Inc.; or Apple ICLOUD provided by Apple Inc. of Cupertino, California.

Clients 102 may access IaaS resources with one or more IaaS standards, including, e.g., Amazon Elastic Compute Cloud (EC2), Open Cloud Computing Interface (OCCI), Cloud Infrastructure Management Interface (CIMI), or OpenStack standards. Some IaaS standards may allow clients access to resources over HTTP and may use Representational State Transfer (REST) protocol or Simple Object Access Protocol (SOAP). Clients 102 may access PaaS resources with different PaaS interfaces. Some PaaS interfaces use HTTP packages, standard Java APIs, JavaMail API, Java Data Objects (JDO), Java Persistence API (JPA), Python APIs, web integration APIs for different programming languages, including, e.g., Rack for Ruby, WSGI for Python, or PSGI for Perl, or other APIs that may be built on REST, HTTP, XML, or other protocols. Clients 102 may access SaaS resources through the use of web-based user interfaces, provided by a web browser (e.g., GOOGLE CHROME, Microsoft INTERNET EXPLORER, or Mozilla Firefox provided by Mozilla Foundation of Mountain View, California). Clients 102 may also access SaaS resources through smartphone or tablet applications, including, e.g., Salesforce Sales Cloud, or Google Drive app. Clients 102 may also access SaaS resources through the client operating system, including, e.g., Windows file system for DROPBOX.

In some embodiments, access to IaaS, PaaS, or SaaS resources may be authenticated. For example, a server or authentication server may authenticate a user via security certificates, HTTPS, or API keys. API keys may include various encryption standards such as, e.g., Advanced Encryption Standard (AES). Data resources may be sent over Transport Layer Security (TLS) or Secure Sockets Layer (SSL).

Figure 1C:
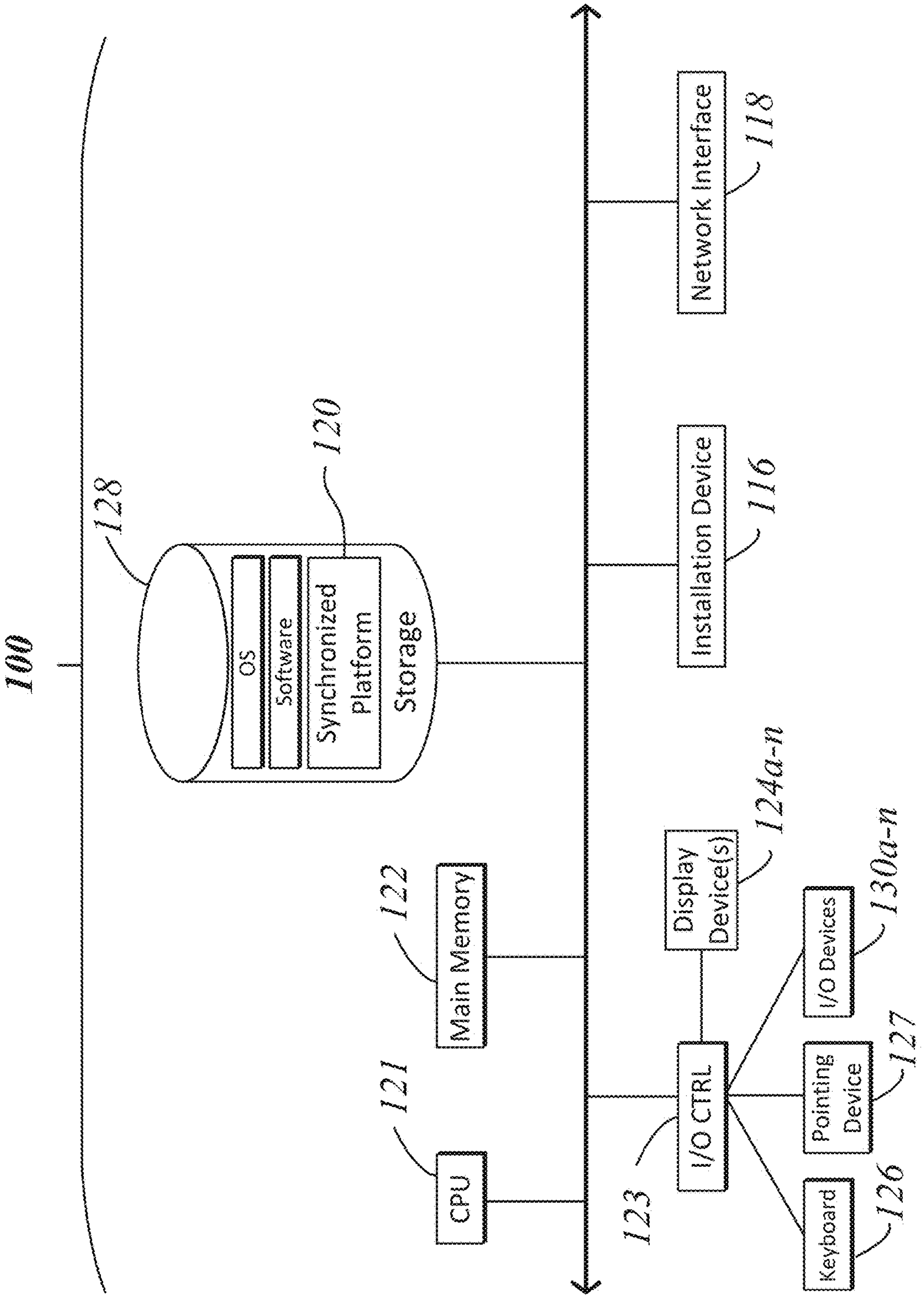
FIGS. 1C and 1D are block diagrams depicting embodiments of computing devices useful in connection with the methods and systems described herein, in accordance with one or more implementations.
Figure 1D:
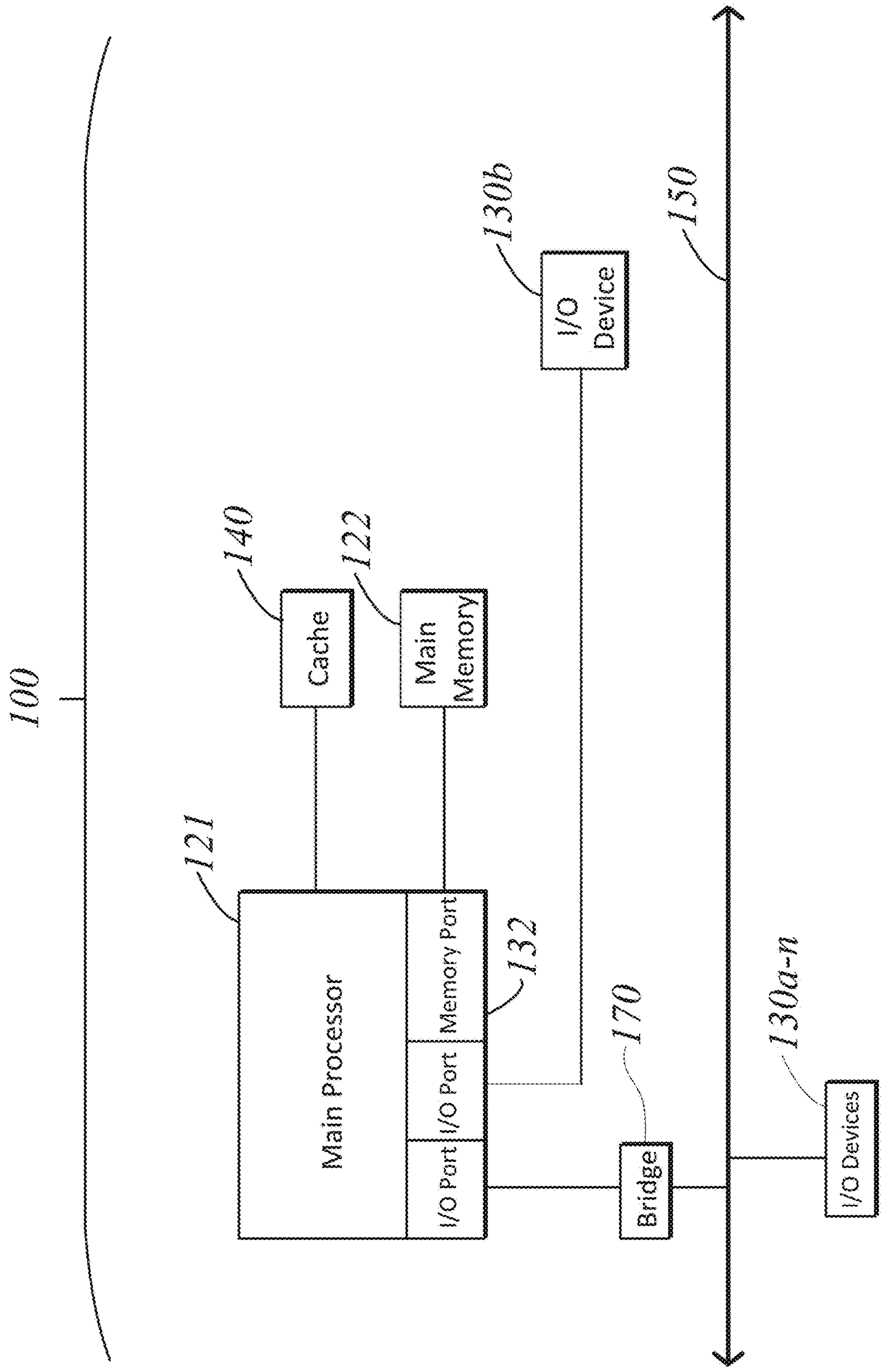

The client 102 and server 106 may be deployed as and/or executed on any type and form of computing device, e.g., a computer, network device, or appliance capable of communicating on any type and form of network and performing the operations described herein. FIGS. 1C and 1D depict block diagrams of a computing device 100 useful for practicing an embodiment of the client 102 or a server 106, for managing network sessions of network applications. As shown in FIGS. 1C and 1D, each computing device 100 includes a central processing unit 121 and a main memory unit 122. As shown in FIG. 1C, a computing device 100 may include a storage device 128, an installation device 116, a network interface 118, an I/O controller 123, display devices 124*a*-124*n*, a keyboard 126, and a pointing device 127, e.g., a mouse. The storage device 128 may include, without limitation, an operating system, software, and synchronized platform 120, which can implement any of the features of the data processing system 205 described herein below in conjunction with FIG. 2. As shown in FIG. 1D, each computing device 100 may also include additional optional elements, e.g., a memory port 132, abridge 170, one or more input/output devices 130*a*-130*n* (generally referred to using reference numeral 130), and a cache memory 140 in communication with the central processing unit 121.

The central processing unit 121 is any logic circuitry that responds to and processes instructions fetched from the main memory unit 122. In many embodiments, the central processing unit 121 is provided by a microprocessor unit, e.g., those manufactured by Intel Corporation of Mountain View, California; those manufactured by Motorola Corporation of Schaumburg, Illinois; the ARM processor and TEGRA system on a chip (SoC) manufactured by Nvidia of Santa Clara, California; the POWER7 processor manufactured by International Business Machines of White Plains, New York; or those manufactured by Advanced Micro Devices of Sunnyvale, California. The computing device 100 may be based on any of these processors, or any other processor capable of operating as described herein. The central processing unit 121 may utilize instruction level parallelism, thread level parallelism, different levels of cache, and multi-core processors. A multi-core processor may include two or more processing units on a single computing component. Examples of a multi-core processors include the AMD PHENOM IIX2, INTEL CORE i5, INTEL CORE i7, and INTEL CORE i9.

Main memory unit 122 may include one or more memory chips capable of storing data and allowing any storage location to be directly accessed by the microprocessor 121. Main memory unit 122 may be volatile and faster than storage 128 memory. Main memory units 122 may be dynamic random access memory (DRAM) or any variants, including static random access memory (SRAM), Burst SRAM or SynchBurst SRAM (BSRAM), Fast Page Mode DRAM (FPM DRAM), Enhanced DRAM (EDRAM), Extended Data Output RAM (EDO RAM), Extended Data Output DRAM (EDO DRAM), Burst Extended Data Output DRAM (BEDO DRAM), Single Data Rate Synchronous DRAM (SDR SDRAM), Double Data Rate SDRAM (DDR SDRAM), Direct Rambus DRAM (DRDRAM), or Extreme Data Rate DRAM (XDR DRAM). In some embodiments, the main memory 122 or the storage 128 may be non-volatile; e.g., non-volatile read access memory (NVRAM), flash memory non-volatile static RAM (nvSRAM), Ferroelectric RAM (FeRAM), Magnetoresistive RAM (MRAM), Phase-change memory (PRAM), conductive-bridging RAM (CBRAM), Silicon-Oxide-Nitride-Oxide-Silicon (SONOS), Resistive RAM (RRAM), Racetrack, Nano-RAM (NRAM), or Millipede memory. The main memory 122 may be based on any of the above described memory chips, or any other available memory chips capable of operating as described herein. In the embodiment shown in FIG. 1C, the processor 121 communicates with main memory 122 via a system bus 150 (described in more detail below). FIG. 1D depicts an embodiment of a computing device 100 in which the processor communicates directly with main memory 122 via a memory port 132. For example, in FIG. 1D the main memory 122 may be DRDRAM.

FIG. 1D depicts an embodiment in which the main processor 121 communicates directly with cache memory 140 via a secondary bus, sometimes referred to as a backside bus. In other embodiments, the main processor 121 communicates with cache memory 140 using the system bus 150. Cache memory 140 typically has a faster response time than main memory 122 and is typically provided by SRAM, BSRAM, or EDRAM. In the embodiment shown in FIG. 1D, the processor 121 communicates with various I/O devices 130 via a local system bus 150. Various buses may be used to connect the central processing unit 121 to any of the I/O devices 130, including a PCI bus, a PCI-X bus, or a PCI-Express bus, or a NuBus. For embodiments in which the I/O device is a video display 124, the processor 121 may use an Advanced Graphics Port (AGP) to communicate with the display 124 or the I/O controller 123 for the display 124. FIG. 1D depicts an embodiment of a computer 100 in which the main processor 121 communicates directly with I/O device 130*b* or other processors 121' via HYPERTRANSPORT, RAPIDIO, or INFINIBAND communications technology. FIG. 1D also depicts an embodiment in which local busses and direct communication are mixed: the processor 121 communicates with I/O device 130*a* using a local interconnect bus 150 while communicating with I/O device 130*b* directly.

A wide variety of I/O devices 130*a*-130*n* may be present in the computing device 100. Input devices may include keyboards, mice, trackpads, trackballs, touchpads, touch mice, multi-touch touchpads and touch mice, microphones, multi-array microphones, drawing tablets, cameras, single-lens reflex cameras (SLR), digital SLR (DSLR), CMOS sensors, accelerometers, infrared optical sensors, pressure sensors, magnetometer sensors, angular rate sensors, depth sensors, proximity sensors, ambient light sensors, gyroscopic sensors, or other sensors. Output devices may include video displays, graphical displays, speakers, headphones, inkjet printers, laser printers, and 3D printers.

Devices 130*a*-130*n* may include a combination of multiple input or output devices, including, e.g., Microsoft KINECT, Nintendo Wiimote for the WII, Nintendo WII U GAMEPAD, or Apple IPHONE. Some devices 130*a*-130*n* allow gesture recognition inputs through combining some of the inputs and outputs. Some devices 130*a*-130*n* provide for facial recognition which may be utilized as an input for different purposes including authentication and other commands. Some devices 130*a*-130*n* provides for voice recognition and inputs, including, e.g., Microsoft KINECT, SIRI for IPHONE by Apple, Google Now, or Google Voice Search.

Additional devices 130*a*-130*n* have both input and output capabilities, including, e.g., haptic feedback devices, touchscreen displays, or multi-touch displays. Touchscreen, multi-touch displays, touchpads, touch mice, or other touch sensing devices may use different technologies to sense touch, including, e.g., capacitive, surface capacitive, projected capacitive touch (PCT), in-cell capacitive, resistive, infrared, waveguide, dispersive signal touch (DST), in-cell optical, surface acoustic wave (SAW), bending wave touch (BWT), or force-based sensing technologies. Some multi-touch devices may allow two or more contact points with the surface, allowing advanced functionality, including, e.g., pinch, spread, rotate, scroll, or other gestures. Some touchscreen devices, including, e.g., Microsoft PIXELSENSE or Multi-Touch Collaboration Wall, may have larger surfaces, such as on a table-top or on a wall, and may also interact with other electronic devices. Some I/O devices 130*a*-130*n*, display devices 124*a*-124*n* or group of devices may be augmented reality devices. The I/O devices 130*a*-130*n* may be controlled by an I/O controller 123 as shown in FIG. 1C. The I/O controller 123 may control one or more I/O devices 130*a*-130*n*, such as, e.g., a keyboard 126 and a pointing device 127, e.g., a mouse or optical pen. Furthermore, an I/O device 130 may also provide storage and/or an installation medium 116 for the computing device 100. In still other embodiments, the computing device 100 may provide USB connections (not shown) to receive handheld USB storage devices. In further embodiments, an I/O device 130 may be a bridge between the system bus 150 and an external communication bus, e.g., a USB bus, a SCSI bus, a FireWire bus, an Ethernet bus, a Gigabit Ethernet bus, a Fibre Channel bus, or a Thunderbolt bus.

In some embodiments, display devices 124*a*-124*n* may be connected to I/O controller 123. Display devices may include, e.g., liquid crystal displays (LCD), thin film transistor LCD (TFT-LCD), blue phase LCD, electronic papers (e-ink) displays, flexile displays, light emitting diode displays (LED), digital light processing (DLP) displays, liquid crystal on silicon (LCOS) displays, organic light-emitting diode (OLED) displays, active-matrix organic light-emitting diode (AMOLED) displays, liquid crystal laser displays, time-multiplexed optical shutter (TMOS) displays, or 3D displays. Examples of 3D displays may use, e.g., stereoscopy, polarization filters, active shutters, or autostereoscopic. Display devices 124*a*-124*n* may also be a head-mounted display (HMD). In some embodiments, display devices 124*a*-124*n* or the corresponding I/O controllers 123 may be controlled through or have hardware support for OPENGL or DIRECTX API or other graphics libraries.

In some embodiments, the computing device 100 may include or connect to multiple display devices 124*a*-124*n*, which each may be of the same or different type and/or form. As such, any of the I/O devices 130*a*-130*n* and/or the I/O controller 123 may include any type and/or form of suitable hardware, software, or combination of hardware and software to support, enable or provide for the connection and use of multiple display devices 124*a*-124*n* by the computing device 100. For example, the computing device 100 may include any type and/or form of video adapter, video card, driver, and/or library to interface, communicate, connect, or otherwise use the display devices 124*a*-124*n*. In one embodiment, a video adapter may include multiple connectors to interface to multiple display devices 124*a*-124*n*. In other embodiments, the computing device 100 may include multiple video adapters, with each video adapter connected to one or more of the display devices 124*a*-124*n*. In some embodiments, any portion of the operating system of the computing device 100 may be configured for using multiple displays 124*a*-124*n*. In other embodiments, one or more of the display devices 124*a*-124*n* may be provided by one or more other computing devices 100*a* or 100*b* connected to the computing device 100, via the network 104. In some embodiments software may be designed and constructed to use another computer's display device as a second display device 124*a* for the computing device 100. For example, in one embodiment, an Apple iPad may connect to a computing device 100 and use the display of the device 100 as an additional display screen that may be used as an extended desktop. One ordinarily skilled in the art will recognize and appreciate the various ways and embodiments that a computing device 100 may be configured to have multiple display devices 124*a*-124*n*.

Referring again to FIG. 1C, the computing device 100 may comprise a storage device 128 (e.g., one or more hard disk drives or redundant arrays of independent disks) for storing an operating system or other related software, and for storing application software programs such as any program related to the synchronized platform 120. Examples of storage device 128 include, e.g., hard disk drive (HDD); optical drive including CD drive, DVD drive, or BLU-RAY drive; solid-state drive (SSD); USB flash drive; or any other device suitable for storing data. Some storage devices may include multiple volatile and non-volatile memories, including, e.g., solid state hybrid drives that combine hard disks with solid state cache. Some storage device 128 may be non-volatile, mutable, or read-only. Some storage device 128 may be internal and connect to the computing device 100 via a bus 150. Some storage device 128 may be external and connect to the computing device 100 via an I/O device 130 that provides an external bus. Some storage device 128 may connect to the computing device 100 via the network interface 118 over a network 104, including, e.g., the Remote Disk for MACBOOK AIR by Apple. Some client devices 102 may not require a non-volatile storage device 128 and may be thin clients or zero clients 102. Some storage device 128 may also be used as an installation device 116, and may be suitable for installing software and programs. Additionally, the operating system and the software 110 can be run from a bootable medium, for example, a bootable CD, e.g., KNOPPIX, a bootable CD for GNU/Linux that is available as a GNU/Linux distribution from knoppix.net.

Client device 100 may also install software 110 or application from an application distribution platform 112. Examples of application distribution platforms 112 include the App Store for iOS provided by Apple, Inc.; the Mac App Store provided by Apple, Inc.; GOOGLE PLAY for Android OS provided by Google Inc.; Chrome Webstore for CHROME OS provided by Google Inc.; and Amazon Appstore for Android OS and KINDLE FIRE provided by Amazon.com, Inc. An application distribution platform 112 may facilitate installation of software 110 on a client device 102. An application distribution platform 112 may include a repository of applications on a server 106 or a cloud 108, which the clients 102*a*-102*n* may access over a network 104. An application distribution platform 112 may include an application developed and provided by various developers. A user of a client device 102 may select, purchase, and/or download an application via the application distribution platform 112.

Furthermore, the computing device 100 may include a network interface 118 to interface to the network 104 through a variety of connections, including, but not limited to, standard telephone lines, LAN or WAN links (e.g., 802.11, T1, T3, Gigabit Ethernet, Infiniband), broadband connections (e.g., ISDN, Frame Relay, ATM, Gigabit Ethernet, Ethernet-over-SONET, ADSL, VDSL, BPON, GPON, fiber optical including FiOS), wireless connections, or some combination of any or all of the above. Connections can be established using a variety of communication protocols (e.g., TCP/IP, Ethernet, ARCNET, SONET, SDH, Fiber Distributed Data Interface (FDDI), IEEE 802.11a/b/g/n/ac CDMA, GSM, WiMax and direct asynchronous connections). In one embodiment, the computing device 100 communicates with other computing devices 100' via any type and/or form of gateway or tunneling protocol, e.g., Secure Socket Layer (SSL) or Transport Layer Security (TLS), or the Citrix Gateway Protocol manufactured by Citrix Systems, Inc., of Ft. Lauderdale, Florida. The network interface 118 may comprise a built-in network adapter, network interface card, PCMCIA network card, EXPRESSCARD network card, card bus network adapter, wireless network adapter, USB network adapter, modem, or any other device suitable for interfacing between the computing device 100 and any type of network capable of communication and performing the operations described herein.

A computing device 100 of the sort depicted in FIGS. 1B and 1C may operate under the control of an operating system, which controls scheduling of tasks and access to system resources. The computing device 100 can be running any operating system such as any of the versions of the MICROSOFT WINDOWS operating systems, the different releases of the Unix and Linux operating systems, any version of the MAC OS for Macintosh computers, any embedded operating system, any real-time operating system, any open source operating system, any proprietary operating system, any operating systems for mobile computing devices, or any other operating system capable of running on the computing device and performing the operations described herein. Typical operating systems include, but are not limited to, WINDOWS 2000, WINDOWS Server 2012, WINDOWS CE, WINDOWS Phone, WINDOWS XP, WINDOWS VISTA, and WINDOWS 7, WINDOWS RT, and WINDOWS 8 all of which are manufactured by Microsoft Corporation of Redmond, Washington; MAC OS and iOS, manufactured by Apple, Inc., of Cupertino, California; and Linux, a freely-available operating system, e.g., Linux Mint distribution ("distro") or Ubuntu, distributed by Canonical Ltd. of London, United Kingdom; or Unix or other Unix-like derivative operating systems; and Android, designed by Google, of Mountain View, California, among others. Some operating systems, including, e.g., the CHROME OS by Google, may be used on zero clients or thin clients, including, e.g., CHROMEBOOKS.

The computer system 100 can be any workstation, telephone, desktop computer, laptop or notebook computer, netbook, ULTRABOOK, tablet, server, handheld computer, mobile telephone, smartphone or other portable telecommunications device, media playing device, a gaming system, mobile computing device, or any other type and/or form of computing, telecommunications or media device that is capable of communication. The computer system 100 has sufficient processor power and memory capacity to perform the operations described herein. In some embodiments, the computing device 100 may have different processors, operating systems, and input devices consistent with the device. The Samsung GALAXY smartphones, e.g., operate under the control of Android operating system developed by Google, Inc. GALAXY smartphones receive input via a touch interface.

In some embodiments, the computing device 100 is a gaming system. For example, the computer system 100 may comprise a PLAYSTATION 3, a PLAYSTATION 4, PLAYSTATION 5, or PERSONAL PLAYSTATION PORTABLE (PSP), or a PLAYSTATION VITA device manufactured by the Sony Corporation of Tokyo, Japan, a NINTENDO DS, NINTENDO 3DS, NINTENDO WII, NINTENDO WII U, or a NINTENDO SWITCH device manufactured by Nintendo Co., Ltd., of Kyoto, Japan, an XBOX 360, an XBOX ONE, an XBOX ONE S, an XBOX ONE X, an XBOX SERIES S, or an XBOX SERIES X, manufactured by the Microsoft Corporation of Redmond, Washington.

In some embodiments, the computing device 100 is a digital audio player such as the Apple IPOD, IPOD Touch, and IPOD NANO lines of devices, manufactured by Apple Computer of Cupertino, California. Some digital audio players may have other functionality, including, e.g., a gaming system or any functionality made available by an application from a digital application distribution platform. For example, the IPOD Touch may access the Apple App Store. In some embodiments, the computing device 100 is a portable media player or digital audio player supporting file formats, including, but not limited to, MP3, WAV, M4A/AAC, WMA Protected AAC, AIFF, Audible audiobook, Apple Lossless audio file formats and .mov, .m4v, and .mp4 MPEG-4 (H.264/MPEG-4 AVC) video file formats.

In some embodiments, the computing device 100 is a tablet, e.g., the IPAD line of devices by Apple; GALAXY TAB family of devices by Samsung; or KINDLE FIRE, by Amazon.com, Inc., of Seattle, Washington. In other embodiments, the computing device 100 is an eBook reader, e.g., the KINDLE family of devices by Amazon.com, or NOOK family of devices by Barnes & Noble, Inc., of New York City, New York.

In some embodiments, the communications device 102 includes a combination of devices, e.g., a smartphone combined with a digital audio player or portable media player. For example, one of these embodiments is a smartphone, e.g., the IPHONE family of smartphones manufactured by Apple, Inc.; a Samsung GALAXY family of smartphones manufactured by Samsung, Inc.; or a Motorola DROID family of smartphones. In yet another embodiment, the communications device 102 is a laptop or desktop computer equipped with a web browser and a microphone and speaker system, e.g., a telephony headset. In these embodiments, the communications devices 102 are web-enabled and can receive and initiate phone calls. In some embodiments, a laptop or desktop computer is also equipped with a webcam or other video capture device that enables video chat and video call.

In some embodiments, the status of one or more machines 102, 106 in the network 104 are monitored, generally as part of network management. In one of these embodiments, the status of a machine may include an identification of load information (e.g., the number of processes on the machine, CPU and memory utilization), of port information (e.g., the number of available communication ports and the port addresses), or of session status (e.g., the duration and type of processes, and whether a process is active or idle). In another of these embodiments, this information may be identified by a plurality of metrics, and the plurality of metrics can be applied at least in part towards decisions in load distribution, network traffic management, and network failure recovery as well as any aspects of operations of the present solution described herein. Aspects of the operating environments and components described above will become apparent in the context of the systems and methods disclosed herein.

Systems and Methods for Dynamic Data Record Allocation

The disclosure relates to distributed networking environments that provide early allocation and transmission of output values within distributed computing environments. Data allocation systems in networked environments can execute operations that depend on status updates from a variety of external information feeds. Each feed can provide event data corresponding to partially complete and/or ongoing processes identified via communications on the network. The timing of data completion for different events can vary. For systems that operate on such datasets, completion of every data stream can be required before any final resource transfer occurs. Such approaches can introduce significant latency and can reduce the responsiveness of the network environment.

Conventional distributed computing environments often defer all value transmissions until the final confirmation of every contributing data event. When a subset of data events reaches completion earlier than others, no partial allocation/transmission/update is made for the completed portion. This deferred update can lead to processing delays and/or inefficient use of computational resources. In large-scale network exchanges, the waiting time between partial completion and full confirmation can create significant operational dead periods. Furthermore, system users can experience delayed feedback on interim performance of their selections. These characteristics limit throughput and responsiveness across the distributed environment.

The techniques described herein can implement early value updates within a distributed computing system. The approaches described herein can identify partial completion of events, and/or events that satisfy particular update criterion, and can generate an initial update corresponding to a portion of the total output before all data events concluding/providing information. Once the remaining data events satisfy completion criteria, a secondary calculation can be used to determine an additional update (e.g., an adjustment, etc.) that reflects the final collective state of the data events. The systems and methods described herein can apply this update after confirming total completion of the data events. By implementing these approaches, the systems and methods described herein can reduce latency providing at least partial updates ahead of full completion of network exchanges/event data. The early disbursement of confirmed values improves system responsiveness, improves overall processing allocation, and significantly reduces updates to network data in distributed computing environments.

Figure 2:
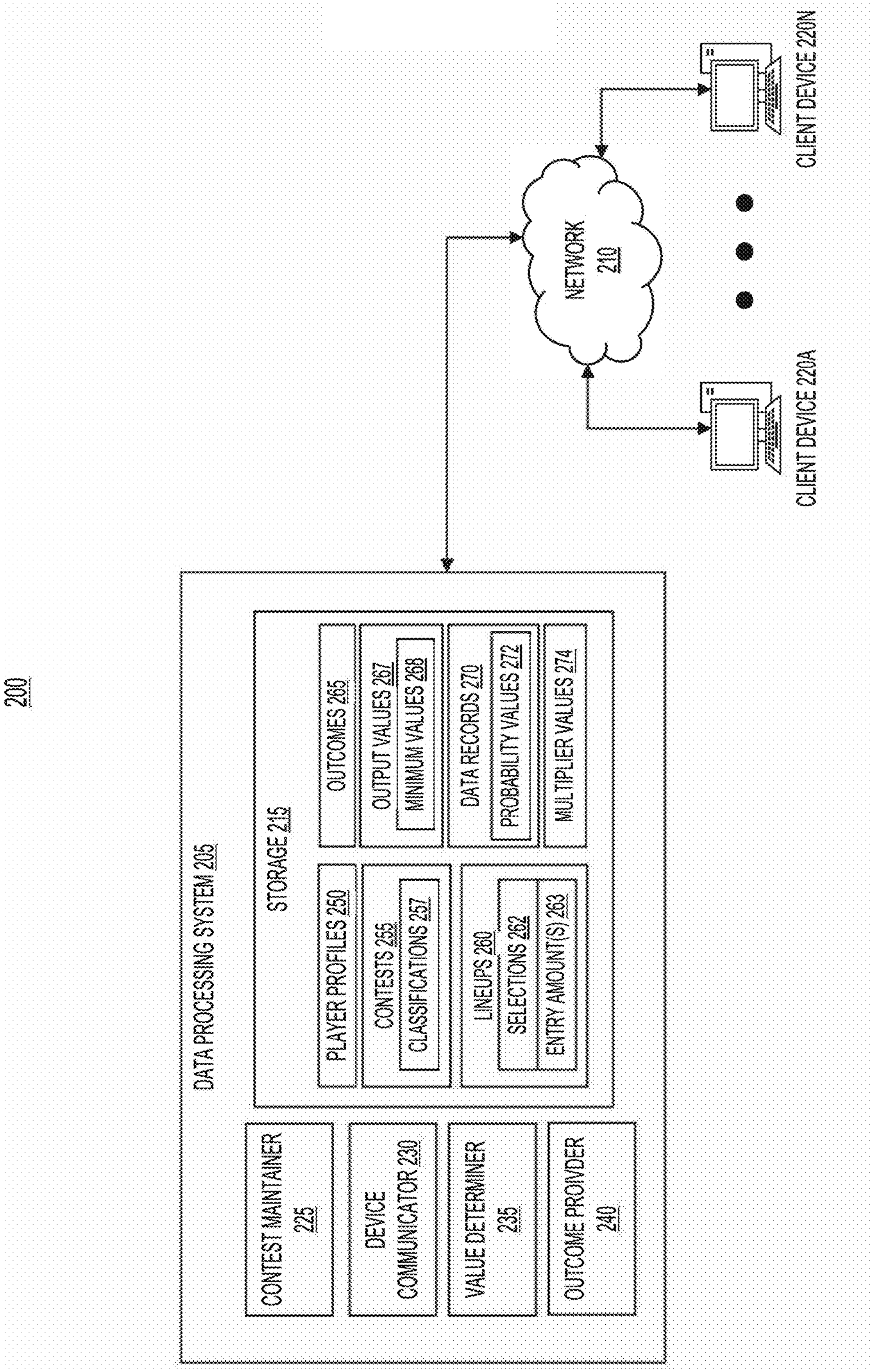
FIG. 2 is a block diagram of a data processing system and client devices for managing selections in distributed computing environments, in accordance with one or more implementations.

Referring now to FIG. 2, illustrated is a block diagram of an example system 200 for managing selections in distributed computing environments, in accordance with one or more implementations. The system 200 can include a data processing system 205, a network 210, and one or more client devices 220A-220N. The data processing system 205 can include a contest maintainer 225, a device communicator 230, a value determiner 235, an outcome provider 240, and a storage 215. The storage 215 can include one or more player profiles 250 (sometimes referred to herein as "network profiles"), one or more contests 255, one or more classifications 257, one or more lineups 260 (sometimes referred to herein as "grouping(s)" or "grouping(s) 260"), one or more selections 262 (sometimes referred to as "pick(s)" or "pick(s) 262"), one or more entry amounts 263 (sometimes referred to herein as "input value(s)" or "input values 263"), one or more outcomes 265, one or more output values 267, one or more minimum values 268, one or more data records 270, one or more probability values 272, and one or more multiplier values 274.

The system 200 can be used to manage selections in distributed computing environments. The data processing system 205 can perform player profile 250 update operations by determining, based on outcomes of various contests 255 in which lineups 260 have been entered, that all selections 262 have a corresponding outcome before completion of other live events and/or before settling all contests 255. The value determiner 235 can generate an initial payout amount (e.g., a minimum value 268) based on the entry amounts 263 and the outcomes of the corresponding selections 262. The outcome provider 240 can update the corresponding player profiles 250 based on the minimum values 268 before final peer-based settlements (e.g., when all related live events and/or contests 255 have completed). The contest maintainer 225 can continue monitoring contests 255 until all outcomes 265 are finalized, at which point additional output values 267 can be used to update the player profiles 250 to complete full settlement across all contests 255 in which the player has entered the lineup(s).

The system 200 can include the data processing system 205. The data processing system 205 can include at least one processor and a memory (e.g., a processing circuit). The memory can store processor-executable instructions that, when executed by processor(s), cause the processor(s) to perform one or more of the operations described herein. The processor(s) may include a general-purpose processor (e.g., a central processing unit (CPU), etc.), an application-specific integrated circuit (ASIC), a graphics processing unit (GPU), a tensor processing unit (TPU), a field-programmable gate array (FPGA), the like, or combinations thereof. The memory may include, but is not limited to, electronic, optical, magnetic, or any other storage or transmission device capable of providing the processor with program instructions. The memory may further include a floppy disk, CD-ROM, DVD, magnetic disk, memory chip, ASIC, FPGA, read-only memory (ROM), random-access memory (RAM), electrically erasable programmable ROM (EEPROM), erasable programmable ROM (EPROM), flash memory, optical media, and/or any other suitable memory from which the processor(s) can read instructions and/or data. The instructions may include code from any suitable computer programming language. The data processing system 205 can include one or more computing devices or servers that can perform various functions as described herein. The data processing system 205 can include any or all of the components and perform any or all of the functions of any computing system described herein.

The system 200 can include the network 210. The network 210 can include computer networks such as local, wide, metro, or other area networks. The network 210 can include intranets, cellular networks, satellite networks, other computer networks such as voice or data mobile phone communication networks, and/or combinations thereof. The data processing system 205 of the system 200 can communicate via the network 210, for instance with client devices 220A-220N. The network 210 may be any form of computer network that can relay information between the data processing system 205, client devices 220A-220N, and/or one or more information sources, such as web servers or external databases/storage systems, among others.

In some implementations, the network 210 may include the Internet and/or other types of data networks. The network 210 may also include any number of computing devices (e.g., computers, servers, routers, network switches, etc.) that are configured to receive and/or transmit data within and/or via the network 210. The network 210 may further include any number of hardwired and/or wireless connections. Any or all of the computing devices described herein (e.g., the data processing system 205 and client devices 220A-220N, etc.) may communicate wirelessly (e.g., via WiFi, cellular, radio, etc.) with a transceiver that is hardwired (e.g., via a fiber optic cable, a CAT5 cable, etc.) to other computing devices in the network 210. Any or all of the computing devices described herein may also communicate wirelessly with the computing devices of the network 210 via a proxy device (e.g., a router, network switch, or gateway).

The system 200 can include one or more client devices 220A-220N. Each client device 220 can include at least one processor and a memory (e.g., a processing circuit). The memory can store processor-executable instructions that, when executed by processor(s), cause the processor(s) to perform one or more of the operations described herein. The processor(s) may include a general-purpose processor (e.g., a CPU, etc.), an ASIC, a GPU, a TPU, an FPGA, the like, or combinations thereof. The memory may include, but is not limited to, electronic, optical, magnetic, or any other storage or transmission device capable of providing the processor with program instructions. The memory may further include a floppy disk, CD-ROM, DVD, magnetic disk, memory chip, ASIC, FPGA, ROM, RAM, EEPROM, EPROM, flash memory, optical media, and/or any other suitable memory from which the processor(s) can read instructions and/or data. The instructions may include code from any suitable computer programming language. Each client device 220 can include one or more computing devices that can perform various functions as described herein. Each client device 220 can include any or all of the components and perform any or all of the functions of any computing system described herein.

Each client device 220 can include, but is not limited to, a mobile device (e.g., a smartphone, tablet, etc.), a television device (e.g., smart television, set-top box, et.), a personal computing device (e.g., a desktop, a laptop, etc.) or another type of computing device. Each client device 220 can be implemented using hardware or a combination of software and hardware. Each client device 220 can include a display or display portion. The display can include a display portion of a television, a display portion of a computing device, or another type of interactive display (e.g., a touchscreen, a display, etc.) and one or more input/output (I/O) devices (e.g., a mouse, a keyboard, digital keypad). The display can include one or more portions, for example, to display various graphical user interfaces (e.g., graphical user interfaces 300A, 300B, 300C of FIGS. 3A-3C, etc.), as described herein. The display can include a touch screen displaying an application, such as the gaming applications described herein. The display can include a border region (e.g., side border, top border, bottom border).

In some implementations, the display can include a touch screen display, which can display graphical content. The display can receive interactions from a player. The interactions can result in interaction data, which can be stored and transmitted by the processing circuitry of the client device 220. The interaction data can include, for example, interaction coordinates, an interaction type (e.g., click, swipe, scroll, tap, etc.), and an indication of an actionable object with which the interaction occurred. Each client device 220 can include an input device that enables a player to interact with and/or select one or more actionable objects as described herein. For example, a touchscreen display can enable interaction with one or more visual indications provided through the display of each mobile (or client) device 220, and responsive to an interaction (e.g., select, click-on, touch, hover), the client device 220 can generate an indication identifying the interaction, the selection, or an indication to of a command, among others. The touchscreen display can depict graphical elements representing an action query and generate an indication of the action chosen by the player. In some implementations, interactions received at the client device 220 can cause the client device 220 and/or the application executing thereon to transmit one or more requests as described in further detail herein.

Each client device 220 can include a device identifier, which can be specific to each respective client device 220. The device identifier can include a script, code, label, or marker that identifies a particular client device 220. In some implementations, the device identifier can include a string or plurality of numbers, letters, characters or any combination numbers, letters, and characters. In some implementations, each client device 220 can have a unique device identifier. Each client device 220 can include a client application, which can be a gaming application that communicates with the data processing system 205 to play games, as described herein. The client application can include an application executing on each client device 220 or provided to the client device 220 by the data processing system 205.

The application can include a web application, a server application, a resource, a desktop, or a file. In some implementations, the application can include a local application (e.g., local to a client device 220), hosted application, Software as a Service (SaaS) application, virtual application, mobile application, and other forms of content. In some implementations, the application can include or correspond to applications provided by remote servers or third-party servers. In some implementations, the application can access the player profiles 250, any information stored via the storage 215, and/or any other information maintained/stored at the client device 220. The application can generate one or more actionable objects, such as the actionable objects (e.g., interactive user interface elements) described herein below in connection with FIGS. 3A-3C, to a user (sometimes referred to herein as a "player") through a client device 220. Such actionable objects can include player-selectable hyperlinks, buttons, graphics, videos, images, or any other type of user interface element that generate a signal that is processed by the application executing on the respective client device 220.

In some implementations, one or more client devices 220 can establish one or more network communication sessions with the data processing system 205. In some implementations, the one or more network communication sessions can each include a channel or connection between the data processing system 205 and the one or more client devices 220. The network sessions can include the execution of a virtual application, in which one or more client devices 220 can interact via communications with the data processing system 205 according to protocol of the virtual application. The protocol of the virtual application can include, but is not limited to, rules and/or instructions associated with the virtual application (e.g., an interactive network application, an interactive game, etc.). The network session may be used to perform any of the operations described herein.

In some implementations, the one or more network communication sessions can be or include one or more application sessions (e.g., of the virtual application), an execution session, a desktop session, a hosted desktop session, a terminal services session, a browser session, a remote desktop session, a URL session and/or a remote application session, among others. Each network communication session can include encrypted and/or secure sessions, which can include an encrypted file, encrypted data or traffic. Each client device 220 can use the network communication session established with the data processing system 205 to carry out any of the functionalities described herein. For example, the application executing on each client device 220 can perform any of the client-side operations described herein, including displaying any of the user interfaces shown in FIGS. 3A-3C, or any other types of user interfaces described herein.

Each of the client devices 220 can be computing devices configured to communicate via the network 210 to access information resources, such as web pages via a web browser, or application resources via a native application executing on a client device 220. When accessing information resources (e.g., instructions/assets for displaying/presenting, modifying, or otherwise navigating graphical user interface (s), etc.) the client device 220 can execute instructions (e.g., embedded in the native applications, in the information resources, etc.) that cause the client devices 220 to display various application interfaces, such as the user interfaces described herein below in conjunction with FIGS. 3A-3C. The application interfaces can be, for example, application interfaces that present different types of image-based search results, or other types of interactive graphical user interfaces. In general, the graphical user interfaces may include various different types of interactive or non-interactive assets (e.g., images, video, animations, graphics, audio, etc.) that is presented to a user via the input/output interfaces of a client device 220.

In response to interactions with user interface elements, or in response to automatic processes described herein, the client devices 220 can transmit requests which may include any of the information described herein, to the data processing system 205. Such requests can include, for example, a request to perform a particular operation and/or a request to access information, among other operations. The request can be transmitted as or may include a hypertext transfer protocol (HTTP or HTTPS) request message, a file transfer protocol message, an email message, a text message, or any other type of message that can be transmitted via the network 210.

The data processing system 205 can include the storage 215. The data processing system 205 can include or be in communication with the storage 215. The storage 215 can be a computer-readable memory that can store or maintain any of the information described herein. The storage 215 can maintain one or more data structures, which may contain, index, or otherwise store each of the values, pluralities, sets, variables, vectors, numbers, or thresholds described herein. The storage 215 can be accessed using one or more memory addresses, index values, or identifiers of any item, structure, or region maintained in the storage 215. The storage 215 can be accessed by the components of the data processing system 205, or any other computing device described herein, via the network 210. In some implementations, the storage 215 can be internal to the data processing system 205. In some implementations, the storage 215 can exist externally to the data processing system 205 and may be accessed via a network (e.g., the network 210). For example, the storage 215 may be distributed across many different computer systems (e.g., a cloud computing system) or storage elements and may be accessed via the network or a suitable computer bus interface.

The data processing system 205 can store, in one or more regions of the memory of the data processing system 205, or in the storage 215, the results of any or all computations, determinations, selections, identifications, generations, constructions, or calculations in one or more data structures indexed or identified with appropriate values. Any or all values stored in the storage 215 may be accessed by any computing device described herein, such as the data processing system 205, to perform any of the functionalities or functions described herein. In implementations where the storage 215 forms a part of a cloud computing system, the storage 215 can be a distributed storage medium in a cloud computing system and can be accessed by any of the components of the data processing system 205 or any other computing devices described herein.

The storage 215 can include one or more player profiles 250 associated with users (referred to herein as "players"). Player profiles 250 may sometimes be referred to herein as "network profiles" or "network profiles 250." A player profile 250 of a player can be a user profile that includes information about the player and information about one or more of the client devices 220 used to access the data processing system 205 using the player profile 250. For example, identifiers of the player profile 250 can be used to access the functionality of the data processing system 205 (e.g., by logging into the data processing system 205 via one or more web-based interfaces). The identifiers can include a username, a password, an e-mail address, a phone number, a personal identification number (PIN), a secret code-word, device identifiers for use in a two-factor authentication technique, among others.

The player profile 250 can store information about currently entered lineups 260 (sometimes referred to herein as "groupings" or "groupings 260", current contests 255 (sometimes referred to herein as "session(s)" or "session(s) 255"), historic contests 255, live events, and selections 262 that are performed by the player via the data processing system 205. The player profile 250 can store a credit balance, which may be selected/requested for use in connection with entry amounts 263 for lineups 260 and/or corresponding selections 262. The player profile 250 can store information about a client device 220 used to access the data processing system 205 such as an IP address, a MAC address, a GUID, a player profile name (e.g., the name of a user of the client device 220, etc.), and a device name, among others. In some implementations, the player profile 250 can be created by the data processing system 205 in response to a player profile creation request transmitted by a client device 220. The player profile creation request can include any of the player profile information described herein.

In some implementations, a client device 220 accessing the data processing system 205 may not be associated with a player profile 250. In such implementations, the data processing system 205 can automatically create a player profile 250 using an identifier of the client device 220 provided by the client device 220. The player profile 250 can store a credit balance or contest entry information (e.g., contests entered that have not yet started, contests entered that have started, outcomes associated with current or historic contests 255, lineup selections 262 for the contests 255, timestamps associated with said lineups 260 and/or contests 255, a client device identifier of a client device 220 that was used to submit a lineup 20, the number of contests 255 entered using a lineup 260 associated with the player profile 250, the number of lineups 260 entered into various contests 255, etc.). The player profile 250 can store and update one or more counter values based on one or more lineups generated via communications with the data processing system 205 or an outcome of a contest.

The player profile 250 can store indications of placed wagers, including wager status information associated with each wager. In some implementations, the player profile 250 can maintain associations between placed wagers and corresponding lineups 260 (and corresponding selections 262) that represent the wager opportunities selected by the player. The wager status information can include details such as whether a wager is active, settled, or pending, the outcome of completed wagers, and any payouts or losses associated with settled wagers. The player profile 250 can store timestamps indicating when each wager was placed, modified, or settled, allowing for a chronological record of a player's wagering activity. In some implementations, the player profile 250 can include references to specific events, teams, or athletes associated with each placed wager, facilitating efficient retrieval and display of relevant wager information to the player via the client device 220.

In some implementations, the player profile 250 can maintain outcome data associated with the lineups 260 and/or the selections 262 thereof entered into one or more contests 255 and can indicate intermediate and final payout values derived from such outcomes. The player profile 250 can include and/or be associated with a state of the lineups 260, selections 262, and/or entry amounts 263 thereof. The player profile 250 can include and/or be associated with the minimum values 268 corresponding to guaranteed payout values for one or more lineups 260 (e.g., a set of selections 262) prior to completion of all contests 255 and/or live events associated with the lineups 260, and in some implementations can include output values 267 representing finalized payout amounts after all event outcomes are determined. In some implementations, the player profile 250 can additionally maintain/store outcome data corresponding to each lineup 260 entered across multiple contests 255, including outcome indicators reflecting the state and timing of each result determination received from the data processing system 205. For example, the player profile 250 can record an intermediate status of a lineup 260 such as pending, partially settled, or fully settled, based on whether all associated selections 262 have corresponding outcomes available in the storage 215. The player profile 250 can therefore concurrently store the initial payout state and the final payout state for each lineup 260 to facilitate determination of incremental award amounts or adjustments upon resolution of the corresponding live events.

The player profiles 250 can store information related to any of the operations described herein, including representations of one or more lineups 260 in the form of ordered lists of corresponding selections 262. In some implementations, each lineup 260 can include a plurality of selections 262 corresponding to selections 262 (sometimes referred to herein as "picks") made by the player, such as indications of statistical outcomes (e.g., odds) and/or multiplier values 274 associated with one or more selections 262. For example, a lineup 260 can include a set of selections 262 representing over/under selections on player performance metrics, point totals, and/or assists per game, among other possible selections 262 described herein. The player profiles 250 can maintain historical records of previously entered lineups 260. In some implementations, the player profiles 250 can store additional metadata associated with each selection 262, such as the corresponding event identifier, selection timestamp, outcomes 265, output values 267, and/or multiplier values 274 derived from corresponding probability values 272 of related data records 270. The player profiles 250 can further store and/or be associated with information describing contests 255 in which the player has participated, including entry amounts 263 (which may be automatically subdivided among participating contests), as described herein.

The data processing system 205 can store/maintain one or more contests 255, for example, in one or more data structures of the storage 215. Contests 255 may sometimes be referred to herein as "session(s)" or "sessions 255." Each contest 255 can be or any game, competition, fantasy draft, and/or other such event that enables one or more players to compete against each other with a player-submitted lineup 260 of entries (e.g., selections 262) based on live events. Contests 255 can be generated by the data processing system 205, by a player via a client device 220, via operator input to the data processing system 205, and/or by an external computing system. Contests 255 can be based around, and can correspond to, one or more live events, candidate selections 262, and/or lineups 260. Live events can include, for example, one or more hockey games, football games, basketball games, golf games, baseball games, martial arts/combat sports matches, automotive or similar races, soccer games, and/or video games (e.g., multiplier video games, etc.), among others. In some implementations, contests 255 can correspond to one or more or sub-events and/or other conditional events of such live events.

In one non-limiting example, sub-events/conditional events of a football game can include which athlete will score the first touchdown, which team will score the first goal, which team will commit more fouls, which athlete will score the second touchdown, which team will win the game, or which team will have a greater score at halftime. Furthering this example, the conditions/events of the live event may further include rushing yards recorded by an athlete during a football game, points scored by one or more athletes or teams during a sporting event, and/or any other measurable event or condition that can occur during a live sporting competition. In some implementations, other events can also be used as live events. Live events may correspond to any event currently being played (e.g., in progress) or events that are yet to occur (e.g., upcoming, not-yet-started events, etc.). Additional sub-events for the aforementioned live events can also be processed as part of a contest 255.

A contest 255 can include and/or specify operational rules and/or contest logic that may be a function of the duration, sub-events, and/or outcome of any type of live event. In some non-limiting examples, some outcomes may include results of a specific period, quarter, or half of a football game, the number of passes thrown or received by athletes in the football game, and/or any other measurable sub-events of the live event. A contest 255 can be selected by a player via the device communicator 230 of the data processing system 205 (e.g., via corresponding requests). In some implementations, lineups can be automatically allocated to one or more contests 255 as described herein. Contests 255 can be updated periodically (e.g., daily, weekly, according to a predetermined schedule of live events, etc.). In some implementations, the contest maintainer 225 can perform updates to the contests 255. Available contests 255 can refer to contests visible to or accessible for the various techniques described herein. A contest 255 can be made unavailable due to at least one of a time limit expiring, a sub-event within the live event occurring, the live event ending, the contest being already entered by the player, a conflicting contest already being entered, or a threshold number of participants being reached for the contest 255. In some implementations, contests 255 can be selectively available to particular players. For example, a contest 255 can be made available only to players who possess a virtual entrance ticket, promotional code, credit allowance, or right to enter, or to players who have selected a lineup 260 having a number or type of entries that meet one or more contest rules governing eligible entries.

In some implementations, contests 255 where a lineup 260 of a player has been entered may be made visible to the player. In some implementations, the specific contests 255 in which a lineup 260 has been entered may be obfuscated to the player. For example, a lineup 260 and/or selections 262 thereof may be automatically entered into one or more contests 255, and the player may view only general statistics about the contests 255 (e.g., number of contests entered, status of the contests 255, etc.). In some implementations, each contest 255 can operate as a peer-to-peer contest in which multiple players submit respective lineups 260 that are compared against one another based on corresponding live event outcomes. In some implementations, respective lineups 260 submitted by players may be automatically assigned to one or more contests 255, as described herein.

Each player can submit an entry amount 263 associated with a lineup 260, and the total of the entry amounts 263 from all participants can form a shared contest pool from which payout amounts are determined for the respective contest 255. For example, when lineups 260 of multiple players that include overlapping or different selections 262 associated with the same live events, the outcomes of those live events can be used to compute relative standings among participants, and award amounts (e.g., output values 267) can be determined based on the number of satisfied selections 262 (e.g., where the selections 262 match corresponding outcomes 265 of live events) of each lineup 260. In some implementations, the payout structure of the contests 255 can include fixed minimum payout tiers and variable additional awards derived from the aggregate entry pool. Such peer-to-peer operation allows every player's lineups 260 and selections 262 to influence the distribution of available prizes among the contemporaneous entrants of the same contest 255. Lineups 260 may be allocated to multiple contests 255, with a respective portion of the entry amounts 263 divided among the contests 255 in which the lineups 260 are entered.

The contests 255 can correspond to one or more classifications 257. The classifications 257 can define different categories of contests 255 maintained by the data processing system 205. The classifications 257 may correspond to and/or may be defined as a function of attributes such as contest type, promotional status, jurisdictional eligibility, and/or market segmentation values, among others. In some implementations, the classifications 257 can include a first classification representing standard contests, a second classification representing promotional contests, and/or a third classification representing restricted contests associated with jurisdictional constraints. For example, contests 255 under the promotional classification can be allocated/assigned/entered using lineups 260 containing one or more selections 262 identified as promotional selections 262. Furthering this example, contests 255 of the standard classification can be allocated/assigned/entered using lineups 260 that do not necessarily include any promotional selections 262. In another example, contests 255 of the restricted/jurisdictional classification be limited to lineups 260 corresponding to certain sports types and/or permitted market attributes (e.g., geographical locations, time periods, etc.). The classification 257 for each contest 255 and can be stored as an identifier/attribute in association with the contest 255, and may be used to determine contest eligibility and/or lineup 260 allocation. In some implementations, the classification 257 can be used to determine which pools (e.g., subsets, etc.) of contests 255 are available for a given lineup 260, as described in further detail herein.

The storage 215 can store/maintain one or more lineups 260, which may be stored in association with one or more player profiles 250. Lineups 260 may sometimes be referred to herein as "grouping(s)" or "groupings 260." Each lineup 260 can be a structured data record that defines one or more selections 262 entered by a player using a client device 220. To generate a lineup 260, a client device 220 (operated by a player) can transmit to the data processing system 205 a request identifying the selections 262 chosen from a plurality of candidate selections 262 that correspond to active and/or scheduled live events. Each selection 262 can be represented as a data element that includes an event identifier, a side indicator, a numerical line, or condition. In some implementations, selections 262 can be associated with a corresponding multiplier value 274 derived from a probability value 272, as described in further detail herein. The data processing system 205 can receive this information and use the selections 262 to generate a data structure that identifies the selections 262 as belonging to a single lineup 260 (e.g., associated with a lineup identifier). In some implementations, the storage 215 can maintain a record association between the lineup 260 and the respective contests 255 that use the lineup 260 for determining outcome values 267 or minimum values 268, as described in further detail herein.

In some implementations, the lineup 260 be associated with one or more entry amounts 263 that define the value submitted by the player for entry (e.g., automatic entry) into one or more contests 255. Entry amounts 263 may sometimes be referred to herein as "input values" or "input values 263." The entry amount 263 can be transmitted by the client device 220 in the request including the selections 262, or sequentially after confirmation of the selections 262 to be included in the lineup 260, in some implementations. The player may specify an entry amount 263 using interactive elements displayed on the client device 220, for example, via one or more graphical user interfaces. The data processing system 205 can receive the entry amounts 263 and associate them with the corresponding lineup 260 in the storage 215. Each stored lineup 260 can include references to its originating player profile 250, constituent selections 262, and/or entry amounts 263.

The lineups 260 can include one or more selections 262. Selections 262 may sometimes be referred to herein as "picks" or "picks 262." Each selection 262 can represent an individual conditional event associated with a corresponding live event and can be defined by one or more parameters such as an event identifier, athlete identifier, team identifier, a performance metric, and/or an indicator of directionality (e.g., over, under, greater than, or less than a specified threshold). In some implementations, each selection 262 can be received by the data processing system 205 from the client device 220 as part of a lineup 260 submission message. In some non-limiting examples, a selection 262 can correspond to a particular player statistic, such as total points, rebounds, and/or rushing yards, among others. In some implementations, a selection 262 can further be associated with metadata identifying type of selection (e.g., promotional, normal, etc.), a sport type, and/or a market attribute to be satisfied for contest allocation within contests 255.

The storage 215 can store/maintain one or more outcomes 265 of contests 255, selections 262, and/or live events which can be used to determine output values 267 and/or minimum values 268. The outcomes 265 can include results of live events and/or conditional events thereof that correspond to the selections 262 entered by players in the contests 255. In some implementations, each outcome 265 can include indicators specifying one or more settled states such as win, loss, or void, relative to each selection 262 and its corresponding live event. For example, when a player selection 262 corresponds to a predicted statistic of a particular athlete, the outcome 265 can store the actual measured value of that statistic from the live event and indicate whether the condition specified by the selection 262 was satisfied. In some implementations, the outcomes 265 can associate such selection-level determinations with contest-level result data representing aggregated performance across multiple players and lineups 260 entered into contests 255, including, for example, distribution amounts allocated across payout tiers for different numbers of correct selections 262. In some implementations, each outcome 265 can include both event-specific results and/or weighted contest-level data used by the data processing system 205 to compute output values 267 and/or minimum values 268 for one or more player profiles 250 as described herein. In some implementations, the outcomes 265 can be updated as live events complete and/or change in state, such that each contest 255 can reflect incremental completion states (e.g., as conditional events for various selections 262 are satisfied or determined not to be satisfied) prior to final settlement.

The storage 215 can store/maintain one or more output values 267 and minimum values 268. In some implementations, the minimum values 268 can represent minimum payout values corresponding to different numbers of correct selections 262 of a lineup 260 that are determined based on the entry amount 263 associated with that lineup 260. For example, the minimum values 268 can include a set of numeric values linked to payout tiers that define guaranteed outcomes when a predetermined subset of the selections 262 are correct, such as minimum awards for 3 of 5, 4 of 5, or all 5 of 5 correct selections 262 in a given contest. The output values 267 can include values that represent finalized or settled payout amounts corresponding to various winning tiers for one or more contests 255 after the corresponding outcomes 265 of the live events have been recorded. For example, the output values 267 can reflect actual payout values derived from peer-to-peer distributions computed upon contest settlement for lineups 260 having differing numbers of correct selections 262, where those values can exceed the minimum values 268 when entry conditions and multiplier values 274 result in a higher tier award state.

The contest maintainer 225 can maintain the plurality of contests 255 corresponding to various live events. The contest maintainer 225 can maintain, add, remove, update, or otherwise modify one or more of the contests 255 as described herein. The contests 255 can be updated in real time, near real time, or offline (e.g., out of band with respect to creation of lineups 260, etc.) prior to a scheduled live event. The contest maintainer 225 can update or modify entrance conditions of a contest. For example, the contest maintainer 225 can add, modify, remove, or change the quantity, rules, number, and/or types of seats associated with a contest 255 (e.g., in response to operator input, according to predetermined rules indicating when contests 255 are to be updated/created/removed, etc.). The contest maintainer 225 can update one or more contests 255 in response to a request from a client device 220, a periodic update (e.g., daily or weekly), a software update from an external computing device, input from an operator of the data processing system 205, an update from the data processing system 205 or one of its components (e.g., the device communicator 230, the value determiner 235, the outcome provider 240, among others), and/or a change in a live event (e.g., a sports game being canceled or postponed, an athlete being injured, or a sports game progressing to overtime), among others.

The contest maintainer 225 can maintain, update, or modify contests 255 available for entry by a player. For example, the contest maintainer 225 can determine that an entry fee submitted by a player satisfies an entry fee requirement for one or more contests 255. The contest maintainer 225 can determine that a lineup generated by a player for entrance into a contest does not satisfy one or more rules for valid lineups of that contest. In some implementations, the contest maintainer 225 can make a contest unavailable to a player. For example, the contest maintainer 225 can make a contest unavailable due to the elapse of a defined period of time, such as upon expiration of the contest (e.g., the elapse of a period of time associated with an opportunity to participate) or upon commencement of the contest. Due to the peer-to-peer nature of the contests 255, the contest maintainer 225 may make a contest unavailable. For example, seats of a particular contest may be full (e.g., 100 of 100 seats are occupied by lineups generated by other players operating respective sessions). In some implementations, a lineup 260 selected by a player can be automatically selected for entry into a contest 255 and can be provided by the contest maintainer 225 a threshold period of time in which to confirm entrance of the lineup to the contest. Upon expiration of the threshold confirmation period, the contest maintainer 225 may release one or more seats initially selected by the player to allow other players of the peer-to-peer contest system to enter the contest.

The device communicator 230 can receive, from a client device 220 associated with a player profile 250, a request identifying and/or to generate a lineup 260 having a plurality of selections 262. The device communicator 230 can further receive, from the client device 220, an indication of an entry amount 263 (e.g., a first amount) associated with the lineup 260, which may be part of the same request and/or a separate request. In some implementations, the client device 220 can access a set of available candidate selections 262 for potential lineups 260 by communicating with the data processing system 205 via one or more network transmissions. For example, the data processing system 205 can provide data packets that cause presentation, at a display of the client device 220, of available selections 262 categorized according to sport type, performance metric, or event identifier, among others. The transmitted data can include interface-configurable filtering criteria such as statistical range, competition state, or selection category, allowing the user to select among the candidate selections 262. In some implementations, the data processing system 205 can include in the transmitted data an indicator identifying a selection 262 as belonging to a specific type such as a normal selection, a promotional selection, and/or another classification corresponding to different categories. The device communicator 230 can receive, in response to such transmission, player input data reflecting that one or more of the provided available selections 262 that have been selected for inclusion in and/or to generate a lineup 260, and can store corresponding identifiers in association with the corresponding player profile 250 of the player for further operations described herein.

In some implementations, the player can make one or more selections 262 using a graphical user interface presented by the client device 220 (e.g., similar to the graphical user interface 300A of FIG. 3A) that displays selectable interactive elements that each representing an eligible outcome within a live event and/or conditional event thereof. For example, the client device 220 can display a user interface element for each available candidate selection 262 that includes a selectable icon, event descriptor, or numerical condition corresponding to a live event parameter. Upon interaction with the interface element, the client device 220 can generate a message containing the identifiers of player-selected selections 262, and the device communicator 230 can receive the message via the network to generate a request to create a lineup 260 that includes the player-selected selections 262. In some implementations, the message can further include metadata such as event identifiers, a requested entry amount 263, and/or a timestamp. The data processing system 205 can confirm generation of the lineup 260 and transmit confirmation data to the client device 220 for display.

The value determiner 235 can automatically assign/select each lineup 260 containing the selections 262 to a subset of the one or more available contests 255, for example, based on the entry amount 263 received from the client device 220. The value determiner 235 can identify eligible contests 255 maintained by the contest maintainer 225 and divide the entry amount 263 into a number of discrete entries, such as individual dollar/credit/point-denominated entries. Each of the entries can be allocated sequentially into separate contests 255 in order of contest availability. In some implementations, the value determiner 235 can determine that a contest 255 is available when it includes one or more open entry positions and the player profile 250 has not previously entered the same lineup 260 in that contest 255. For example, when a player submits a ten-dollar entry corresponding to a lineup 260 containing six selections 262, the value determiner 235 can divide that ten-dollar entry into ten one-dollar contest entries and allocate those entries to ten different eligible contests 255 until no further seats remain for that lineup 260. The data processing system 205 can transmit confirmation data to the client device 220 once the assignment process is complete so that the player can preview which contests 255 the lineup 260 is entered into.

In some implementations, the value determiner 235 can perform the automatic assignment in a prioritized order to balance distribution across all active contests 255. The value determiner 235 can first allocate the lineup 260 into contests 255 in which the player profile 250 has no prior entries, followed by contests 255 in which the player profile 250 has other lineups 260 but not the current lineup 260 being entered, and finally into contests 255 in which the player profile 250 already has at least one entry corresponding to the same lineup 260. For example, if a group of contests 255 currently includes available seats that are partially filled, the value determiner 235 can use this prioritization order to fill each remaining seat evenly across contests 255. Doing so can limit concentration of identical selections 262 in a single contest 255.

The value determiner 235 can initiate or close contests 255 based on contest state conditions associated with seat availability and/or live event timing. In some implementations, the value determiner 235 can determine that a contest 255 reaches a full state when the number of occupied seats equals the total number of positions defined for that contest 255, and can cause the contest maintainer 225 to mark the contest 255 as closed to further entries. In some implementations, the value determiner 235 can initiate activation/execution of a contest 255 when a live event corresponding to one or more selections 262 of lineups 260 entered into that contest 255 begins and/or when a designated start time threshold for the contest 255 is satisfied. For example, the value determiner 235 can detect a scheduled start time provided through an external data feed and/or maintained schedule of live events and trigger an instruction that transitions an eligible contest 255 from an open state to a closed/active state. In another example, the value determiner 235 can determine that a contest 255 has remained open for a minimum predetermined duration or reached a threshold fill percentage and initiate the contest 255 accordingly. In some implementations, the value determiner 235 can further synchronize the closing of all related contests 255 within a common contest group once all associated live events linked to the selections 262 have commenced, thereby preventing further modification or entry into those contests 255.

The device communicator 230 can receive, from one or more external data sources, outcomes 265 corresponding to live events and/or conditional events thereof that relate to the selections 262 of lineups 260 entered into active contests. In some implementations, the device communicator 230 can receive the outcomes 265 through one or more APIs that provide event messages from external computing systems associated with sportsbook data feeds, statistics provider systems, and/or devices located at or proximate to the live event. For example, the device communicator 230 can subscribe to one or more feeds corresponding to a particular live event and can receive event messages that include updates to game status, statistical metrics, and/or completion indicators for the live event and/or conditional events associated therewith. In some implementations, the device communicator 230 can receive messages from field devices (e.g., similar to client devices 220) associated with the live event, such as on-site sensors, game-tracking servers, and/or event timing systems that generate messages identifying specific occurrences and/or metric values. Each received message can be parsed to extract event identifiers, timestamps, and/or result indicators used to update the outcomes 265 for live events, selections 262, and/or lineups 260 as described herein. The operation of the device communicator 230 in receiving such messages may occur continuously or according to predefined polling intervals to maintain up-to-date status of live events.

In some implementations, the value determiner 235 can use outcome 265 data for live events and/or conditional events thereof to determine whether a number of the selections 262 of a particular lineup 260 are correct or incorrect. The value determiner 235 can process outcome 265 data received through the device communicator 230 and compare the corresponding live statistics, metric thresholds, or indicator values of the live events with the condition parameters specified by each selection 262 of the lineup 260. In some implementations, the value determiner 235 can mark (e.g., update a status of, etc.) a selection 262 as correct when a performance metric of the associated live event satisfies the selection 262 (e.g., matches the state/condition the player had predicted via the selection 262) and mark it as incorrect when the performance metric fails to satisfy that condition (e.g., fails to match the state/condition the player had predicted via the selection 262). For example, when a selection 262 specifies that a particular athlete must exceed 25.5 points, the value determiner 235 can use the score updates included in the outcome 265 data to verify whether that total has been reached. The value determiner 235 can update the status of each selection 262 in real-time as the underlying metrics change, using the most recent outcome 265 data supplied by live data feeds and/or event messages. Each status change can be stored as part of the active calculation of lineup 260 correctness prior to determining payout values or subsequent distribution of results.

In some implementations, the value determiner 235 can associate each lineup 260 with one or more predetermined minimum values 268 that represent an award payout and/or multiplier based on the number of correct selections 262 (e.g., selections that are satisfied, marked as correct, etc.). For example, the value determiner 235 can identify a base payout tier in the storage 215 corresponding to the number of correct selections 262 currently satisfied and link that payout tier to the applicable minimum value 268. As additional outcome 265 updates are processed and selection statuses are updated, the value determiner 235 can dynamically update which predetermined minimum value 268 corresponds to the lineup 260 by re-evaluating the number of correct selections 262 of each lineup 260 and updating the effective guaranteed value (e.g., the selected minimum value 268) associated with the player profile 250.

In some implementations, different quantities of correct selections 262 (e.g., with each different number of correct selections 262 being a different correctness level for the selections 262/lineup 260, different award conditions) can correspond to different predetermined minimum values 268 (e.g., first award amounts) such that each different correctness level corresponds to a respective minimum value 268. For example, when three out of five selections 262 are correct, the applicable minimum value 268 may be a first nominal payout defined as a flat value stored in the storage 215, whereas when all five selections 262 are correct, the minimum value 268 may reference a greater payout amount stored separately.

In some implementations, the minimum value 268 may represent a fixed value (e.g., an award value) that does not vary with the entry amount 263 associated with the lineup 260, while in other implementations, the minimum value 268 may represent a value determined according to the use of a corresponding predetermined multiplier that is applied to the entry amount 263 of the lineup 260. In some implementations, the value determiner 235 can determine the minimum value 268 based at least in part on a multiplier value and the entry amount 263. For example, different numbers of correct selections 262 within the lineup 260 can correspond to different multiplier values that scale the resulting minimum value 268 according to the entry amount 263, such that a larger quantity of correct selections 262 may correspond to a greater multiplier and therefore generate a greater minimum value 268 for the lineup 260, while a smaller quantity of correct selections 262 may correspond to a smaller multiplier value that generates a relatively smaller minimum value 268. The value determiner 235 can determine the number of correct selections 262 in real time or near real time and prior to completion of the live events to which the selections 262/lineups 260 correspond.

The value determiner 235 can determine, based on the plurality of selections 262 of the lineup 260 and the subset of the plurality of live events corresponding to the plurality of selections 262, that a first condition (e.g., that a particular number of selections 262 is correct) of a plurality of conditions (e.g., each possible winning number of correct selections 262) of a lineup 260 is satisfied prior to completion of all of the live events that correspond to those selections 262. In some implementations, the value determiner 235 can evaluate multiple conditional thresholds corresponding to different winning tiers for each active lineup 260 and can determine which of the conditions are currently satisfied by comparing each selection 262 to the outcome 265 data stored in the storage 215. To do so, the value determiner 235 can determine the number of correct selections 262 in each active lineup 260 as outcome 265 data is obtained. For example, the value determiner 235 can determine whether three, four, or all five selections 262 within a lineup 260 are marked as correct based on live event data, and can identify the set of applicable conditions correlating to those correctness levels. The value determiner 235 can update the minimum value 268 associated with the lineup 260 whenever the number of correct selections 262 changes, such as when an additional selection 262 becomes resolved in the outcome 265 data. In some implementations, the value determiner 235 can generate incremental updates to the minimum value 268 in real time as additional live event data becomes available.

The outcome provider 240 can update the player profile 250 according to the minimum value 268 determined based on responsive to determining that the first condition (e.g., the number of correct selections 262 that satisfy a winning condition) of the lineup 260 has been satisfied. The outcome provider 240 can update a balance field and/or corresponding credit amount of the player profile 250 to apply the minimum value 268 as a credit associated with the lineup 260 once one of the winning conditions is detected. In some implementations, such crediting can occur prior to completion of all contests 255 to which the lineup 260 is entered, allowing partial payouts while other contests 255 remain unsettled. In some implementations, the update can be provided before final completion of the live events corresponding to the selections 262 of the lineup 260, when a sufficient subset of those live events has produced outcome data confirming satisfaction of a possible winning condition (e.g., a predetermined number of correct selections 262 that is associated with a minimum value 268). The outcome provider 240 can generate a message or notification that is transmitted to the client device 220 that can indicate the winning condition has been met and that the minimum payout (e.g., minimum value 268) has been credited. For example, the client device 220 can display, via a graphical user interface, a message such as "Guaranteed payout credited" associated with the lineup 260, and the credited amount corresponding to the minimum value 268 can update dynamically if the data processing system 205 later recalculates an increased minimum value 268 based on additional correct selections 262 received from ongoing live event updates.

In some implementations, the outcome provider 240 can update the player profile 250 based on the minimum value 268 prior to determination of the output values 267. In such implementations, the output values 267 can represent the final payout amounts determined from all peer-to-peer contests 255 in which a particular lineup 260 has been entered, and may be calculated only after every contest 255 associated with the lineup 260 has been fully settled. For example, when one or more contests 255 remain active or pending during live events, the outcome provider 240 can still update the player profile 250 according to the guaranteed minimum values 268 corresponding to the confirmed subset of correct selections, while deferring calculation of the output values 267 until completion of all related contests 255. This arrangement allows intermediate crediting of the player profile 250 while one or more contests 255 await final settlement.

The value determiner 235 can monitor outcome 265 data for live events associated with one or more contests 255 to determine ongoing changes in event state and conditional result information. The value determiner 235 can obtain updates to the outcome 265 data from various data feeds/event message sources to update to the state of related contests 255. The value determiner 235 can update the status of the contests 255 as in-progress, pending, or completed according to the cumulative settled states of all selections 262 associated with that contest 255. When a threshold all possible selections 262 of a contest 255 have settled (e.g., have been determined as satisfied or unsatisfied), the value determiner 235 can update to the state of the contest 255 to indicate that the contest has completed/settled.

To do so, the value determiner 235 can determine that all conditional events of every selection 262 entered into a contest 255 have been settled or have occurred within the context of the live events to which those selections 262 relate, and can set the contest 255 status to completed. In some implementations, the value determiner 235 can determine completion based on live event completion indicators. For example, upon receiving a message that all live events linked to the contest 255 have finished, the value determiner 235 can update the status of the contest 255 to indicate the contest 255 has completed, as all related gameplay has concluded. In some implementations, the value determiner 235 can determine the output values 267 for each lineup 260 responsive to determining that all of the plurality of live events relating to that lineup 260 have completed.

The value determiner 235 can determine, for each active lineup 260, the output values 267 (e.g., final payout awards according to peer-to-peer settling) for the lineup 260 based on the respective outcome 265 of each contest 255 of the subset of the plurality of contests 255 in which the lineup 260 has been entered. In some implementations, the value determiner 235 can identify the final performance results of each lineup 260 in relation to all other lineups entered into the same contest 255 (e.g., for all contests 255 associated with that lineup 260). The value determiner 235 can determine, based on the total of all entry amounts 263 collected for a contest 255, a total available pool value for the contest 255, and can divide that value among performance tiers defined by configuration rules associated with that contest 255. This process can be repeated for each contest 255 in which the lineup 260 has been entered to determine the final output value 267 for lineup 260 (e.g., the sum of all award amounts assigned from all contests 255 in which the lineup 260 was entered).

For example, the value determiner 235 can apply a set of percentage weights (e.g., predetermined based on tier, etc.) to partition the remaining pool of each contest 255 into different sub-pools corresponding to different numbers of correct selections 262 (e.g., three out of six correct, four out of six correct, five out of six correct, six out of six correct, etc.). The value determiner 235 can determine the number of qualifying lineups 260 within each tier (e.g., each number of correct selections 262) by evaluating the outcomes 265 recorded for all selections 262 associated with every lineup 260 in the contest 255. For each tier that includes qualifying lineups 260, the value determiner 235 can calculate an individual portion by dividing the sub-pool value for that tier by the number of qualifying lineups 260 for that tier. In some implementations, if a tier does not include any qualifying lineups 260, the value determiner 235 can merge that tier's unallocated sub-pool value into another tier based on predefined contest rules/settings. The result of these calculations can be stored as the output values 267 and can identify/include the final payout amount associated with each lineup 260 for that contest 255. The output values 267 generated for each contest 255 in which a lineup 260 was entered can be summed to determine the final output value 267 for that lineup 260.

The outcome provider 240 can use the output values 267 to credit respective player profiles 250 based on differences between the minimum values 268 and corresponding contest award amounts associated with lineups 260. In some implementations, the outcome provider 240 can compare the output values 267, which represent final contest award amounts derived from peer-to-peer distributions of each contest 255 in which a lineup 260 was entered. As described herein, the minimum values 268 were previously credited as guaranteed payouts. When the output values 267 exceed the corresponding minimum values 268, the outcome provider 240 can determine the differential amount as an incremental credit value. For example, if a lineup 260 was previously credited with a minimum payout of twenty credits and the final output value 267 indicates a total payout of thirty credits, the outcome provider 240 can generate an additional credit of ten credits and apply that differential amount to the player profile 250. In some implementations, the outcome provider 240 can apply the credit operation by updating a balance field or reward record within each player profile 250 corresponding to the finalized lineup 260, thereby ensuring that the cumulative credited amount equals the total determined from the contest award values reflected by the output values 267.

In some implementations, the outcome provider 240 can determine that the total award amount for the lineup 260 does not exceed the minimum value 268. In some implementations, the outcome provider 240 can determine that the output values 267 are zero in response to determining that the total award amount for the lineup 260 does not exceed the minimum value 268. For example, when the outcome provider 240 determines that a peer-to-peer payout derived from contest pool calculations is less than the minimum value 268 previously credited to the player profile 250 for a corresponding lineup 260, no additional value is to be credited to the player profile 250. To implement such techniques, the outcome provider 240 can compare the peer-to-peer output values 267 amounts determined from each contest 255 in which a lineup 260 is entered with the minimum value 268 awarded for the same lineup 260. When the peer-to-peer payout is smaller than the minimum value 268, the outcome provider 240 can maintain the credited balance unchanged and restrict any further crediting of an award amount for that lineup 260.

Figure 3A:
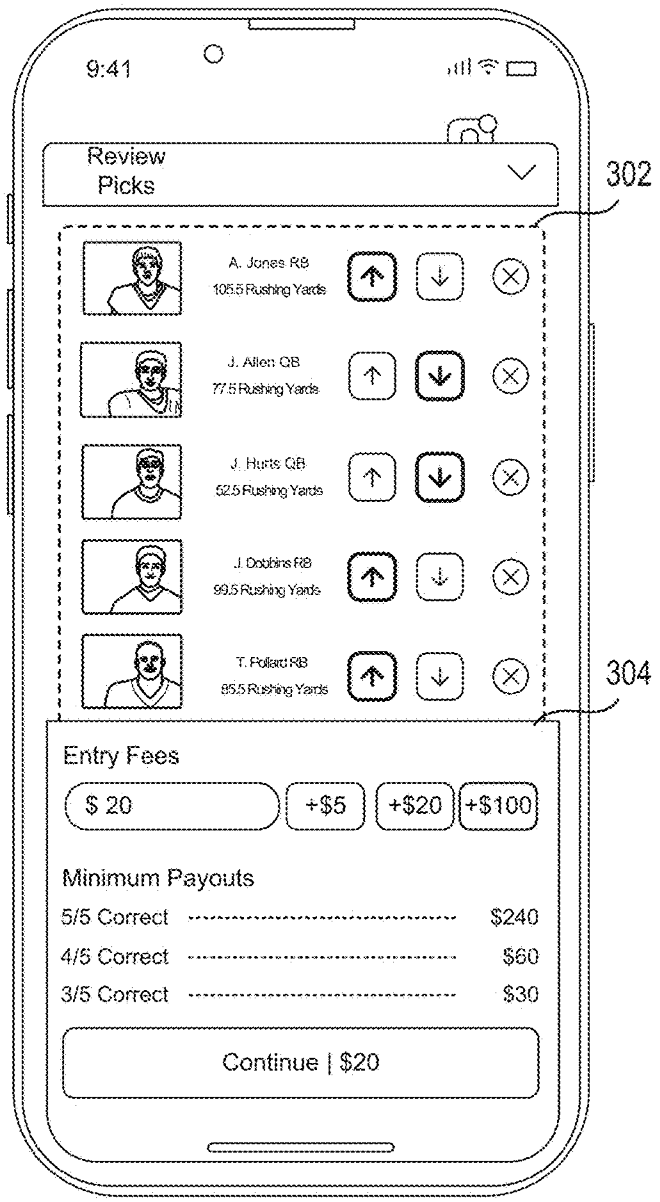
FIG. 3A illustrates a graphical user interface including example selections in a distributed computing environment, in accordance with one or more implementations.

Referring now to FIG. 3A in the context of the components described in connection with FIG. 2, illustrated is a graphical user interface 300A for providing selections in a distributed computing environment, in accordance with one or more implementations. The graphical user interface 300A can include a first region 302 and a second region 304, each of which may be presented via a client device (e.g., a client device 220) in communication with a data processing system (e.g., the data processing system 105). In some implementations, the graphical user interface 300A may be presented via a native application executing on the client device. In some implementations, the graphical user interface 300A may be a web-based interface (e.g., a web page or set of web pages associated with the data processing system 105) accessed via a browser application executing on the client device.

The graphical user interface 300A can be used to provide selections in a distributed computing environment. The first region 302 can present a list of selections (e.g., selections 262) made by a user to create a lineup (e.g., a lineup 260), with each graphical element representing a selection 262, a corresponding identifier, and selectable indicator (e.g., over, under, or similar outcome conditions). In some implementations, the first region 302 can include user-selectable controls that allow modification or removal of any displayed selection prior to confirmation of the lineup. For example, the first region 302 can display a plurality of candidate selections with associated icons to represent each conditional event and can receive user input indicating confirmation or adjustment of those events. The second region 304 can include one or more entry amount fields associated with the lineup and may present the entry fee that defines the stake value for the contest entry. In some implementations, the second region 304 can include quick entry controls such as incremental add buttons or pre-set denomination inputs to adjust the entry amount. The second region 304 can further display a payout summary that includes minimum payout values determined based on the entry fee and the number of correct selections within the lineup. For example, the second region 304 can list payout tiers for different correctness levels, such as three of five, four of five, or five of five correct, with corresponding guaranteed payout amounts. Any number of selections may be made for a lineup, with each possible number of selections including its own set of winning conditions (e.g., minimum payouts for predetermined tiers/numbers of correct selections). The second region 304 includes a "Continue" button that, when interacted with, causes the client device to communicate with the data processing system to generate and automatically enter the lineup into one or more contests (e.g., contests 255).

Figure 3B:
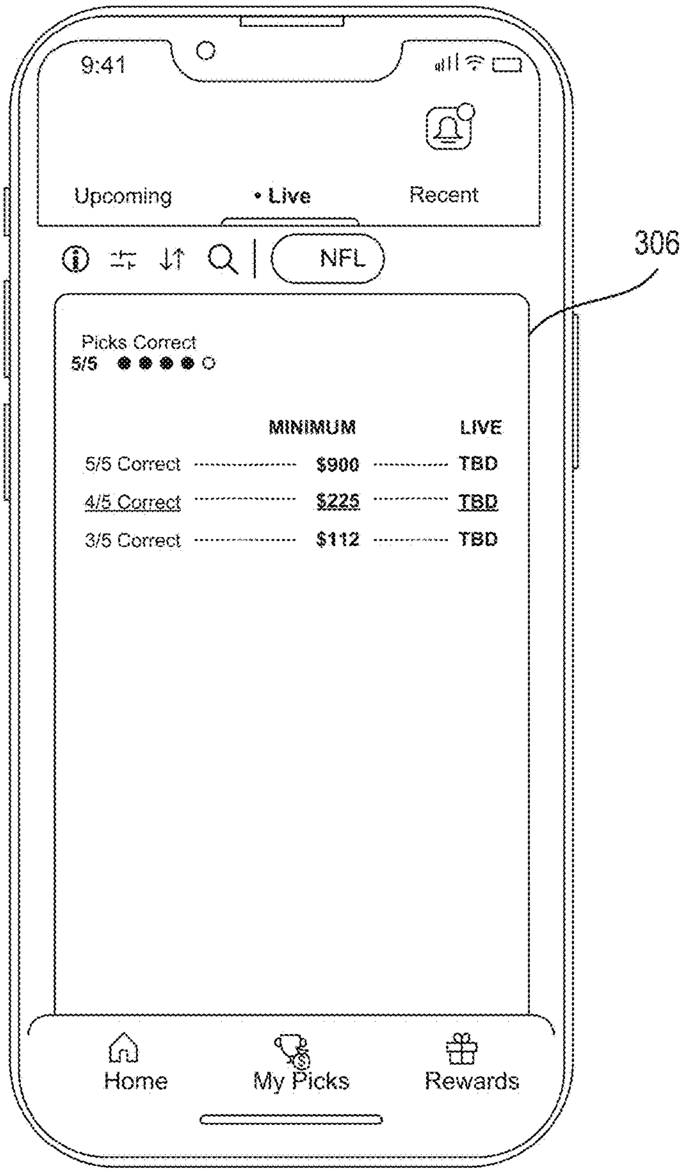
FIG. 3B illustrates a graphical user interface showing pending outcomes of selections determined via a distributed computing environment, in accordance with one or more implementations.

Referring now to FIG. 3B in the context of the components described in connection with FIG. 2, illustrated is a graphical user interface 300B showing pending outcomes of selections determined via a distributed computing environment, in accordance with one or more implementations. The graphical user interface 300B can include a pending outcome region 306. The graphical user interface 300B may be presented via a client device (e.g., a client device 220) in communication with a data processing system (e.g., the data processing system 105). In some implementations, the graphical user interface 300B may be presented via a native application executing on the client device. In some implementations, the graphical user interface 300B may be a web-based interface (e.g., a web page or set of web pages associated with the data processing system 105) accessed via a browser application executing on the client device.

The graphical user interface 300B can be used to show pending outcomes of selections (e.g., selections 262) of a lineup (e.g., a lineup 260) determined via a distributed computing environment. The pending outcome region 306 can include indicators showing the current status of the lineup, such as the number of selections that are correct, while one or more contests (e.g., contests 255) associated with the lineup remain in progress and/or before the corresponding live events are fully completed or settled. In some implementations, the graphical user interface 300B can display, for each qualifying tier/level of correctness, a corresponding minimum payout value that represents a currently guaranteed payout level for the lineup at that state of progress. For example, when four of five selections are correct at a live stage of competition, the graphical user interface 300B can display the minimum payout amount associated with the 4/5-correct tier, while maintaining the live payout value in a "to be determined" (TBD) state within a column labeled LIVE (or similar graphical user interface element) as contests have not yet been fully settled. In some implementations, the graphical user interface 300B can dynamically revise the displayed number of correct selections and the associated minimum payout values as additional live event outcomes are received from a data processing system, thereby allowing the user to view an evolving representation of potential winnings prior to completion of all contests and live events.

Figure 3C:
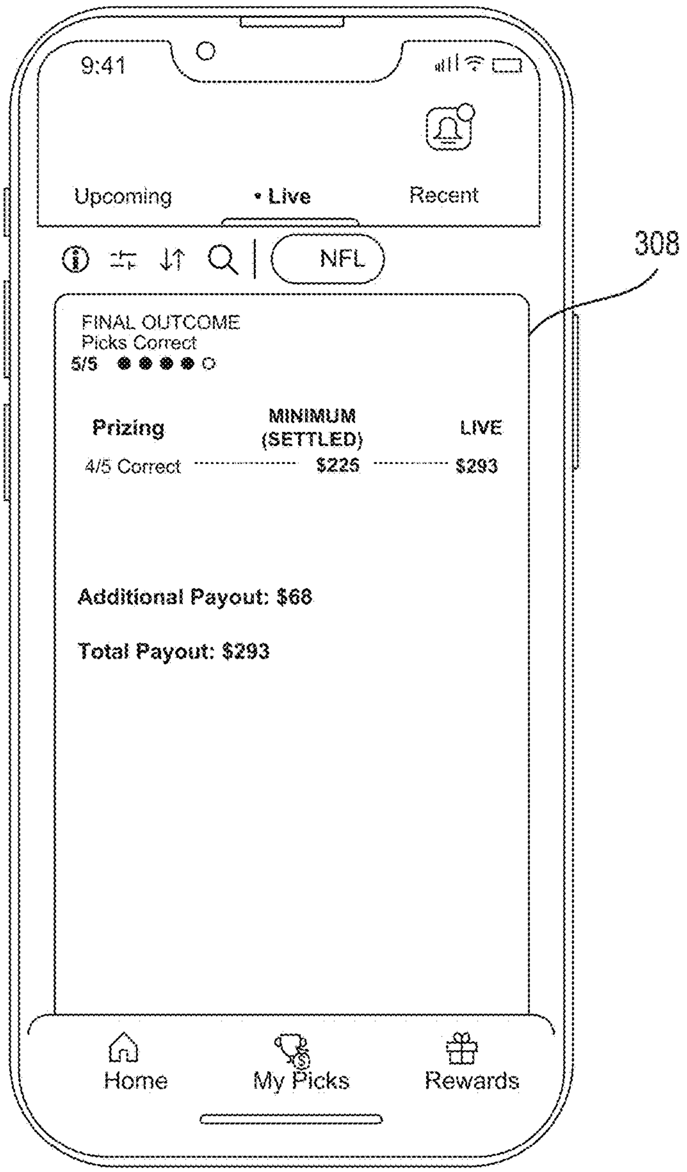
FIG. 3C illustrates graphical user interface showing final outcomes of selections determined via a distributed computing environment, in accordance with one or more implementations.

Referring now to FIG. 3C, illustrated is a graphical user interface 300C showing final outcomes of selections determined via a distributed computing environment, in accordance with one or more implementations. The graphical user interface 300C can include a results region 308. The graphical user interface 300C may be presented via a client device (e.g., a client device 220) in communication with a data processing system (e.g., the data processing system 105). In some implementations, the graphical user interface 300C may be presented via a native application executing on the client device. In some implementations, the graphical user interface 300C may be a web-based interface (e.g., a web page or set of web pages associated with the data processing system 105) accessed via a browser application executing on the client device.

The graphical user interface 300C can be used to show final outcomes of selections (e.g., selections 262) of a lineup (e.g., lineup 260) determined via a distributed computing environment. The graphical user interface 300C can include the results region 308, which can present the status of the lineup after the corresponding contests (e.g., contests 255 in which the lineup was entered) have settled and/or after the associated live events have completed. In some implementations, the results region 308 can display a summary indicating the number of selections that are correct, such as four of five or five of five correct, and can identify the corresponding minimum payout amount that had been previously determined for that correctness level/tier. For example, the results region 308 can display a value representing the guaranteed minimum payout amount for a four-of-five-correct condition along with the amount won across all contests that have been completed. In some implementations, the results region 308 can include separate indicators for the amount previously credited as the minimum payout, the amount awarded through peer-based contest calculations, and a difference value representing the incremental payout adjustment applied after final settlement. For example, the results region 308 can list a line showing the minimum (settled) payout, a second line showing the additional payout credited as a result of finalized contest outcomes, and a third line showing a total payout amount that reflects the sum of the minimum and final amounts. The graphical user interface 300C can therefore provide a consolidated view of final contest results and cumulative earnings for the lineup once all corresponding live events have reached completion.

Figure 3D:
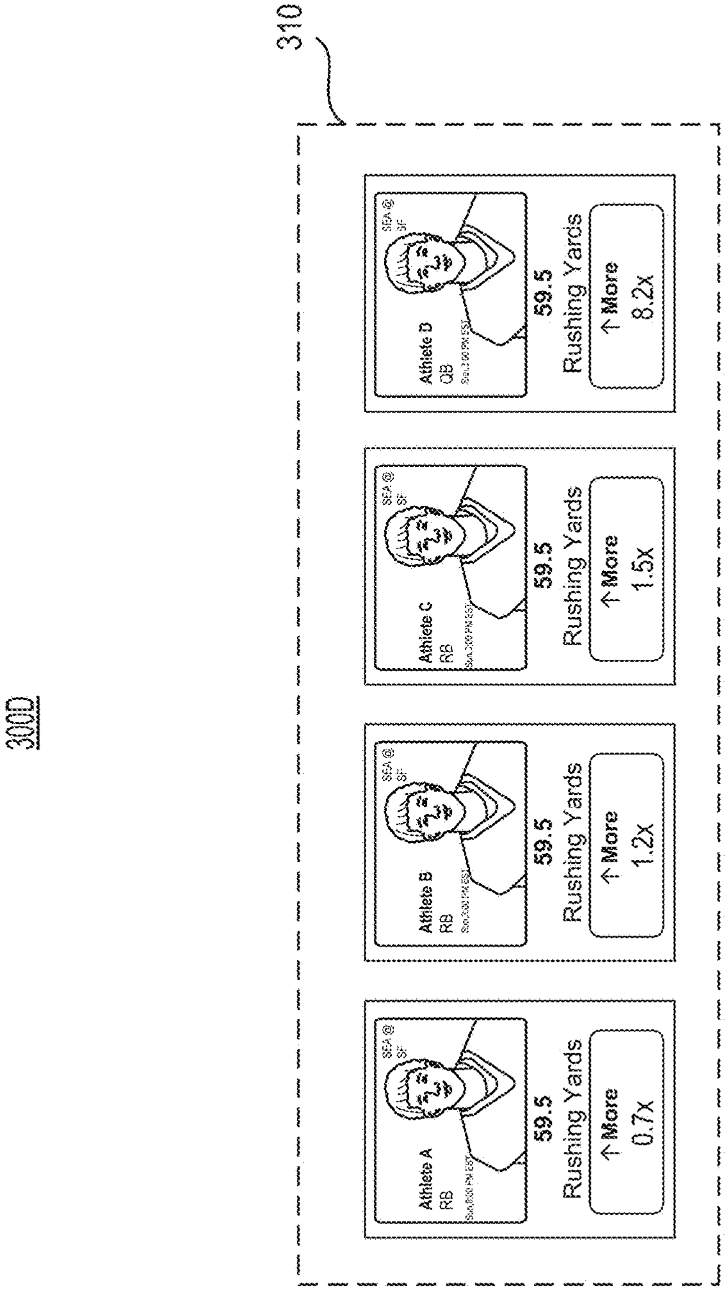
FIG. 3D illustrates a graphical user interface showing example candidate selections and associated multiplier values determined according to probability values, in accordance with one or more implementations.

Referring now to FIG. 3D in the context of the components described in connection with FIG. 2, illustrated is a graphical user interface 300D showing example candidate selections (e.g., candidate selections 262) and associated multiplier values (e.g., multiplier values 274) in a distributed computing environment, in accordance with one or more implementations. The graphical user interface 300D can include a candidate selection region 310, which may be presented via a client device (e.g., client device 220) in communication with a data processing system (e.g., data processing system 105). In some implementations, graphical user interface 300D can be presented via a native application executing on the client device, or as a web-based interface (e.g., a set of web pages associated with the data processing system 105) accessed through a browser application on the client device.

The candidate selection region 310 can present a list of candidate selections (e.g., candidate selections 262) available for inclusion in a lineup (e.g., one or more lineups 260). Each of the candidate selections is displayed with a corresponding multiplier value (e.g., multiplier values 274 of FIG. 2) that represents the potential payout factor applied if the selection is correct. In some implementations, each graphical element within region 310 can include a description or identifier for the candidate selection, a visual indicator or icon for the selection condition (in this example, over), and a labeled multiplier value adjacent to the candidate selection. As shown, each graphical element of the region 310 can include user-selectable controls (e.g., shown here as "over" or "up-arrow" buttons) to add corresponding selections to a lineup.

In this example, the graphical element for "Athlete A" corresponds to a 0.7× multiplier, the graphical element for "Athlete B" corresponds to a 1.2× multiplier, the graphical element for "Athlete C" corresponds to a 1.5× multiplier, and the graphical element for "Athlete D" corresponds to a 8.5× multiplier. The multiplier values may be determined according to any of the techniques described herein. In some implementations, if a multiplier value is updated, the graphical region 310 and/or the graphical elements thereof may be dynamically updated (e.g., in response to a message/signal/indication from the data processing system, e.g., including the updated multiplier value) to present the updated multiplier value. In some implementations, the updated multiplier values may be displayed in real-time or near real-time.

Figure 3E:
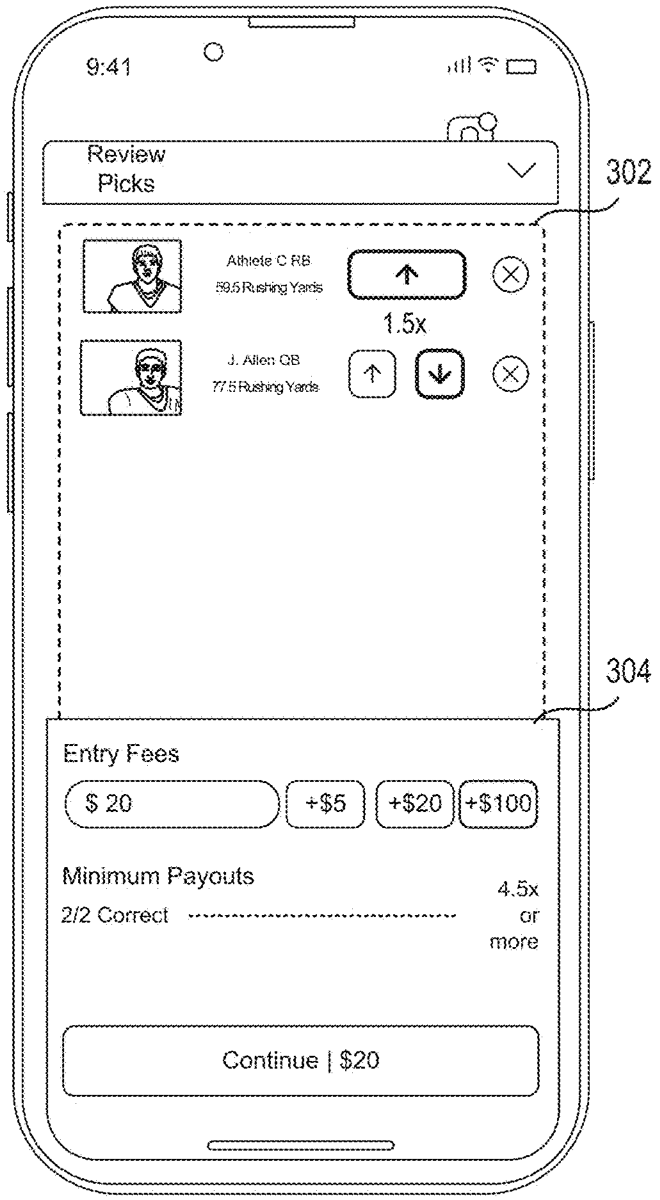
FIG. 3E illustrates a graphical user interface showing selections of a potential lineup with associated multiplier values determined according to probability values, in accordance with one or more implementations.

Referring now to FIG. 3E in the context of the components described in connection with FIG. 2, illustrated is a graphical user interface 300E showing example selections (e.g., selections 262) for a potential lineup (e.g., a lineup 260) in a distributed computing environment, in accordance with one or more implementations. The graphical user interface 300E includes the first region 302 and the second region 304 (e.g., similar to the regions 302 and 304 of FIG. 3A), which may be presented via a client device (e.g., a client device 220) in communication with a data processing system (e.g., the data processing system 105). In some implementations, the graphical user interface 300E may be presented via a native application executing on the client device, or as a web-based interface accessed via a browser.

The first region 302 displays a list of selections made by the player to create a lineup, and in this example, specifically includes a candidate selection corresponding to Athlete C (as shown in FIG. 3D) with a multiplier value of 1.5×. Additionally, region 302 includes a second selection such as "under 77.5 rushing yards," both of which are visually represented with their corresponding identifiers and selectable indicators, allowing for further modification and/or removal prior to lineup confirmation. The second region 304 of graphical user interface 300E presents entry amount controls/interactive elements and a payout summary associated with the current lineup formed from the selections shown in the region 302. In the illustrated example, the region 304 indicates a minimum multiplier payout of 4.5× the entry amount if both selections displayed in region 302 are correct, providing the user with immediate feedback on the potential minimum guaranteed payout tier for the lineup. As described herein, the region 304 can include interactive elements for adjusting the entry amount and can present displays payout tier(s) for the lineup.

Figure 4:
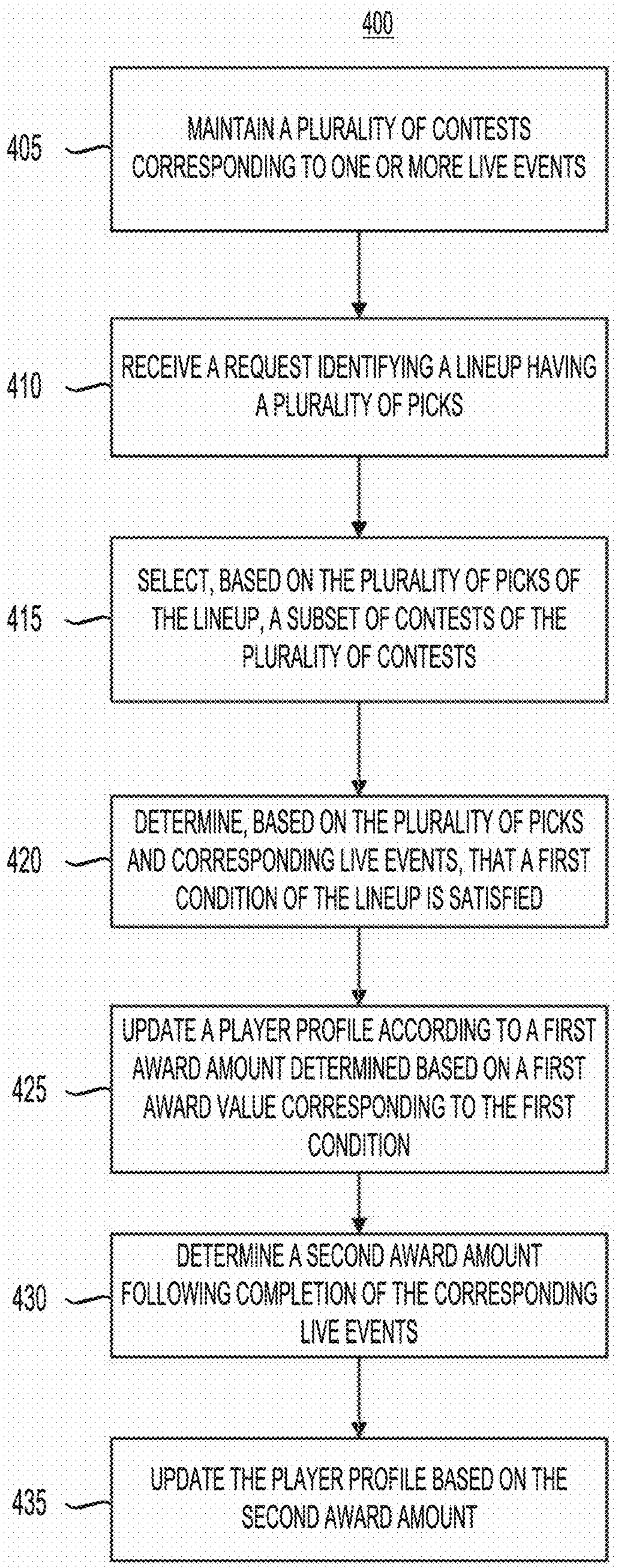
FIG. 4 is a flowchart of an example method for managing selections in distributed computing environments, in accordance with one or more implementations.

Referring now to FIG. 4, illustrated is a method 400 for managing selections in distributed computing environments. The method 400 may be performed, for example, by the data processing system 205 of FIG. 2, any of the client devices 220 of FIG. 2, and/or a combination of the client devices 220 and the data processing system 205 of FIG. 2. Any computing device described herein may perform any step of the method 400. For the purposes of the following description, the operations/STEPs of the method are described as being performed by a "data processing system" (e.g., the data processing system 205). Certain operations may be omitted or additional operations may be performed with respect to the method 400. In brief overview of the method 400, the method 400 can include maintaining a plurality of contests corresponding to one or more live events (STEP 405), receiving a request identifying a lineup having a plurality of picks (STEP 410), selecting, based on the plurality of picks of the lineup, a subset of contests of the plurality of contests (STEP 415), determining, based on the plurality of picks and corresponding live events, that a first condition of the lineup is satisfied (STEP 420), updating a player profile according to a first award amount determined based on a first award value corresponding to the first condition (STEP 425), determining a second award amount following completion of the corresponding live events (STEP 430), and updating the player profile based on the second award amount (STEP 435).

The method 400, at STEP 405, can include maintaining a plurality of contests (e.g., contests 255) corresponding to one or more live events. To do so, any of the operations of the contest maintainer 225 of FIG. 2 can be performed. The data processing system can maintain/store/update/remove/generate one or more contests that may be stored in association with identifiers of scheduled or active live events. The contests can be updated to indicate and/or be associated with outcome data (e.g., outcomes 265, etc.). Each contest can identify a set of entrant lineups that correspond to player profiles, as described herein. In some implementations, the data processing system can update each contest based on schedules indicating live event start times and/or contest start times, and can update the contests based on information from data feeds that provide event data for one or more live events. As described herein, the data processing system may automatically allocate lineups to contests and determine outcomes of those contests based on the selections (e.g., the selections 262) of the lineups identified as entrants to the contests. Lineups may be entered into multiple contests, and entry fees associated with those lineups may be divided among the contests in which the contests are entered.

The method 400, at STEP 410, can include receiving a request identifying a lineup having a plurality of selections. To do so, any of the operations of the device communicator 230 of FIG. 2 can be performed. The data processing system can receive the request from a client device and extract identifiers specifying each selection in the lineup. The data processing system can receive, within the same transmission or a corresponding secondary message, an indication of a first amount associated with the lineup to define an entry amount. In some implementations, the data processing system can associate the lineup with the player profile used to access the data processing system to provide the request. For example, the data processing system can parse the received request to identify each selection identifier (e.g., a respective outcome for a conditional event, etc.), the corresponding live event association(s), and/or any attributes associated with the selection, as described herein. The data processing system can generate and/or store the lineup and entry amount in association with a timestamp, as described herein.

The method 400, at STEP 415, can include selecting, based on the plurality of selections of the lineup, a subset of contests of the plurality of contests. The data processing system can use the entry amount associated with the lineup to automatically assign the lineup to one or more eligible contests maintained in memory. In some implementations, the data processing system can evaluate available contests to identify those that are open and with unfilled entry positions. For example, the data processing system can access a listing of open contests that correspond to the same live event identifiers as the selections contained in the lineup and can allocate the entry amount across those contests based on contest availability attributes. In some implementations, the data processing system can divide the entry amount into increments and allocate each increment evenly (or in some implementations, unevenly) into different contests in which the lineup is entered, as described herein. In some implementations, the automatic assignment process can prioritize contests having the fewest current entries or those marked as open and awaiting activation before the opening of the corresponding live events. The selection of the subset of contests can be performed automatically, for example, in response to receiving the request to generate/store the lineup/selections.

The method 400, at STEP 420, can include determining, based on the plurality of selections and corresponding live events, that a first condition of the lineup is satisfied. To do so, any of the operations of the value determiner 235 of FIG. 2 can be performed. For example, for each active lineup, the data processing system can monitor the state of live events associated with the selections thereof to determine whether any of the selections have been satisfied (e.g., are determined to be correct selections). The data processing system can receive and/or determine outcome data for live events and/or conditional events thereof from/based on messages from one or more data sources corresponding to the live events and compare the received data to parameters defining each selection to determine outcome data for each selection in active lineups. In some implementations, the data processing system can determine that the first condition is satisfied based on a predetermined number (e.g., four, five, six, etc.) of the plurality of selections of the lineup being satisfied (e.g., determined as being correct). For example, the data processing system can track which individual selections are settled as correct according to identified outcome data and determine that a first condition corresponding to a specific correctness level (e.g., four of six selections correct, etc.) has been reached before completion of all live events and/or before all contests in which the lineup has been entered have settled. The data processing system can determine the number of satisfied selections dynamically, as described herein, and can update a counter and/or data record indicating partial satisfaction of the lineup. By storing the cumulative count of correct picks, the data processing system can evaluate whether the first condition threshold is exceeded prior to the conclusion of unfinished live events and/or prior to settling all contests in which the lineup is entered.

The method 400, at STEP 425, can include updating a player profile according to a first award amount determined based on a first award value corresponding to the first condition. To do so, any of the operations of the value determiner 235 of FIG. 2 can be performed. In some implementations, the data processing system can determine the first award amount based at least in part on the entry amount associated with the lineup and a multiplier derived from one or more picks in the lineup. In some implementations, the data processing system can determine the multiplier as a function of the number of selections satisfied prior to completion of all live events and/or prior to settling of all contests in which the lineup has been entered, and can apply that multiplier to the entry amount for the lineup to calculate a the first award amount. The data processing system can use this multiplier and the entry amount to generate the first award amount that satisfies the guaranteed payout tier. The data processing system can store the resulting award value in the player profile and credit the corresponding player balance before determining any secondary awards. In some implementations, the first award amount may be one of a plurality of predetermined amounts that respectively correspond to different numbers of correct selections, rather than a multiplier. In such implementations, the first award amount may be a predetermined amount selected based on the number of correct selections in the lineup.

The method 400, at STEP 430, can include determining a second award amount for the lineup following completion of the corresponding live events and/or settling of the contests in which the lineup was entered. To do so, any of the operations of the value determiner 235 of FIG. 2 can be performed. The data processing system can determine, based on event data and/or contest state data, that all of the plurality of live events have completed and/or all contests in which the lineup has been entered have settled. The data processing system can determine the number of correct selections in the lineup, as described herein. In some implementations, the data processing system can determine respective outcomes for each contest by evaluating the final set of outcome data associated with all settled live events and calculating contest results across all participating lineups in a peer-to-peer arrangement. For example, the data processing system can identify all lineup entries within a completed contest and compare the number of correct selections for each lineup to determine relative ranking among lineup entries. The data processing system can calculate a total contest pool value representing the aggregation of entry amounts from all participants and apply predetermined payout weights corresponding to performance tiers (e.g., different percentages of the pool designated for lineups achieving different numbers of correct selections). In some implementations, the data processing system can divide the allocated portion of the pool for each tier by the number of lineups qualifying for that tier to determine an individual payout amount per qualifying lineup. The data processing system can select the second award amount for the lineup by summing payout amounts from every contest in which the lineup was entered, and can store the resulting total as the outcome for that lineup. In some implementations, the data processing system can compare the second award amount to the first award amount and, when the second award amount exceeds the first award amount, calculate a difference value representing an additional award amount. The second award amount can also be set to zero when the total award amount does not exceed the first award amount, as described herein.

The method 400, at STEP 435, can include updating the player profile based on the second award amount. To do so, any of the operations of the outcome provider 240 of FIG. 2 can be performed. The data processing system can update the player profile by adding any additional award amount equal to the difference between the second award amount and the first award amount once all outcome data for the lineup has been finalized. In some implementations, the data processing system can perform the update as an adjustment to the stored credit value for the player profile after processing all contests linked to that lineup. In some implementations, the first award amount, the second award amount, and/or a combination thereof can be provided to the client device for display via a notification, via one or more elements of a graphical user interface, and/or via one or more messages. In some implementations, a data record indicating the first award amount, the second award amount, and/or a combination thereof can be stored in association with an identifier of the lineup and in association with an identifier of the player profile associated with the lineup.

At least one aspect relates to a system. The system can maintain a plurality of contests corresponding to a plurality of live events. The system can receive, from a client device associated with a player profile, a request identifying a lineup comprising a plurality of picks, the lineup corresponding to a plurality of conditions respectively associated with a plurality of award values. The system can select, based on the plurality of picks of the lineup, a subset of contests of the plurality of contests in which the lineup is to be entered. The system can determine, based on the plurality of picks of the lineup and a subset of the plurality of live events corresponding to the plurality of picks, that a first condition of a plurality of conditions of the lineup is satisfied prior to completion of all of the plurality of live events. The system can update a player profile according to a first award amount determined based on a first award value of a plurality of award values corresponding to the first condition responsive to determining that the first condition of the lineup has been satisfied. The system can determine, based on a respective outcome of each contest of the subset of the plurality of contests following the completion of all of the plurality of live events, a second award amount for the lineup. The system can update the player profile according to the second award amount.

In some implementations, the system can determine that the first condition of the lineup is satisfied based on a predetermined number of the plurality of picks being satisfied. In some implementations, the system can determine a number of the plurality of picks that are satisfied prior to completion of all of the plurality of live events. In some implementations, the system can determine the first award amount based on the number of the plurality of picks that are satisfied prior to completion of all of the plurality of live events. In some implementations, the system can receive, from the client device, an indication of a first amount associated with the lineup. In some implementations, the system can determine the first award amount based at least in part on a multiplier and the entry amount.

In some implementations, the system can determine the multiplier as a function of a number of the plurality of picks that are satisfied. In some implementations, the system can receive, from one or more external data sources, outcome data corresponding to the subset of the plurality of live events. In some implementations, the system can determine that the first condition is satisfied based at least in part on the outcome data indicating that the plurality of picks satisfy a predetermined level of correctness. In some implementations, the system can determine, based on the outcome data, that all of the plurality of live events have been completed. In some implementations, the system can determine the second award amount for the lineup responsive to determining that all of the plurality of live events have completed. In some implementations, the system can determine that the second award amount exceeds the first award amount. In some implementations, the system can update the player profile based on an additional award amount equal to a difference between the second award amount and the first award amount.

In some implementations, updating the player profile according to the first award amount comprises updating the player profile based on the first award amount prior to determining the second award amount. In some implementations, the system can determine that a total award amount for the lineup does not exceed the first award amount. In some implementations, the system can determine that the second award amount is zero in response to determining that the total award amount for the lineup does not exceed the first award amount.

At least one other aspect relates to a method. The method can be performed, for example, by one or more processors coupled to non-transitory memory. The method can include maintaining a plurality of contests corresponding to a plurality of live events. The method can include receiving, from a client device associated with a player profile, a request identifying a lineup comprising a plurality of picks, the lineup corresponding to a plurality of conditions respectively associated with a plurality of award values. The method can include selecting, based on the plurality of picks of the lineup, a subset of contests of the plurality of contests in which the lineup is to be entered. The method can include determining, based on the plurality of picks of the lineup and a subset of the plurality of live events corresponding to the plurality of picks, that a first condition of a plurality of conditions of the lineup is satisfied prior to completion of all of the plurality of live events. The method can include updating a player profile according to a first award amount determined based on a first award value of a plurality of award values corresponding to the first condition responsive to determining that the first condition of the lineup has been satisfied. The method can include determining, based on a respective outcome of each contest of the subset of the plurality of contests following the completion of all of the plurality of live events, a second award amount for the lineup. The method can include updating the player profile according to the second award amount.

In some implementations, the method can include determining that the first condition of the lineup is satisfied based on a predetermined number of the plurality of picks being satisfied. In some implementations, the method can include determining a number of the plurality of picks that are satisfied prior to completion of all of the plurality of live events. In some implementations, the method can include determining the first award amount based on the number of the plurality of picks that are satisfied prior to completion of all of the plurality of live events. In some implementations, the method can include receiving, from the client device, an indication of a first amount associated with the lineup. In some implementations, the method can include determining the first award amount based at least in part on a multiplier and the entry amount.

In some implementations, the method can include determining the multiplier as a function of a number of the plurality of picks that are satisfied. In some implementations, the method can include receiving, from one or more external data sources, outcome data corresponding to the subset of the plurality of live events. In some implementations, the method can include determining that the first condition is satisfied based at least in part on the outcome data indicating that the plurality of picks satisfy a predetermined level of correctness. In some implementations, the method can include determining, based on the outcome data, that all of the plurality of live events have been completed.

In some implementations, the method can include determining the second award amount for the lineup responsive to determining that all of the plurality of live events have completed.

In some implementations, the method can include determining that the second award amount exceeds the first award amount. In some implementations, the method can include updating the player profile based on an additional award amount equal to a difference between the second award amount and the first award amount. In some implementations, updating the player profile according to the first award amount comprises updating the player profile based on the first award amount prior to determining the second award amount. In some implementations, the method can include determining that a total award amount for the lineup does not exceed the first award amount. In some implementations, the method can include determining that the second award amount is zero in response to determining that the total award amount for the lineup does not exceed the first award amount.

Systems and Methods for Allocating Data Records According to Classification in a Distributed Computing Environment At least one other aspect of the present disclosure relates to distributed computing environments that enable facilitate the allocation of data records into different processing categories according to their classifications. Conventional distributed processing systems often distribute all data record types through the same processing techniques regardless of their classifications/attributes. When data records carry characteristics that alter eligibility and/or processing outcomes, such routing/processing can distort weighting of record outcomes within the distributed computing environment. Such limitations reduce fairness, transparency, and computational predictability within distributed computing environments.

The techniques described herein can implement a segmentation process that separates data records according to attribute-defined classifications before participation in network operations. The systems and methods described herein can identify the classification of each data record and assign the record to one or more subsets of active processing pools/segments that correspond to different sets of computing devices. The segmentation process can use a mapping data structure that defines associations between data record types and pools/associated computing devices. By applying such segmented allocation processes, the techniques described herein can preserve separation between different data record types. This results in improved data integrity, predictable network operations, and compliance alignment across distributed categories. Such approaches also reduce latency and improve computational accuracy for different categories of data records.

Referring back to FIG. 2, the data processing system 205 can execute operations to allocate data records (e.g., lineups 260, contests 255, etc.) according to different classifications 257. The data processing system 205 can assign each contest 255 or lineup 260 to a classification 257 based on one or more attributes such as contest type, selection 262 type, or jurisdictional flag maintained in association with the underlying data record. In some implementations, the data processing system 205 can use a mapping data structure that defines which classifications are eligible for which processing pools, allowing the contest maintainer 225 to isolate entries associated with different classifications before allocating them to corresponding contests 255. For example, a lineup 260 containing one or more promotional selections 262 may be directed only to contests marked as a promotional classification, while a lineup 260 containing no such selections 262 may be directed to contests marked as standard classification. In some implementations, the value determiner 235 can reference the classification 257 of a contest 255 to ensure that multipliers or payout calculations applied to corresponding lineups 260 use the appropriate rule set for that category. The classification-based allocation process can therefore regulate how each contest 255 is populated and processed according to operational and regulatory constraints stored in the storage 215.

As described herein, each of the contests 255 can be stored in association with a corresponding classification. The classifications 257 can define different categories of contests 255 maintained by the data processing system 205. The classifications 257 may correspond to and/or may be defined as a function of attributes such as contest type, promotional status, jurisdictional eligibility, and/or market segmentation values, among others. In some implementations, the classifications 257 can include a first classification representing standard contests, a second classification representing promotional contests, and/or a third classification representing restricted contests associated with jurisdictional constraints. For example, contests 255 under the promotional classification can be allocated/assigned/entered using lineups 260 containing one or more selections 262 identified as promotional selections 262. Furthering this example, contests 255 of the standard classification can be allocated/assigned/entered using lineups 260 that do not necessarily include any promotional selections 262. In another example, contests 255 of the restricted/jurisdictional classification be limited to lineups 260 corresponding to certain sports types and/or permitted market attributes (e.g., geographical locations, time periods, etc.). The classification 257 for each contest 255 and can be stored as an identifier/attribute in association with the contest 255, and may be used to determine contest eligibility and/or lineup 260 allocation. In some implementations, the classification 257 can be used to determine which pools (e.g., subsets, etc.) of contests 255 are available for a given lineup 260, as described in further detail herein.

As described herein, the storage 215 can maintain candidate selections 262, which can represent conditional events that players can select as part of lineups 260. Each candidate selection 262 can be stored in association with a set of attributes, which may associate such candidate selections 262 with different categories/classifications 257 of contests 255. In some implementations, a player may select one or more candidate selections 262 from a displayed list presented at a client device and generate a lineup 260 that includes those selected candidate selections 262, as described herein. For example, a player may select candidate selections 262 associated with a first/standard classification and at least one additional candidate selections 262 associated with a second/promotional classification. When such candidate selections 262 are combined within a lineup 260, the data processing system 205 can associate that lineup 260 with one or more pools (e.g., subsets) of contests 255 that have classifications 257 corresponding to the attributes (e.g., standard/promotional, etc.) of the selected candidate selections 262. In some implementations, lineups 260 containing selections 262 marked (e.g., having attributes set to indicate, etc.) as promotional can be entered into contest 255 pools identified with a promotional classification 257, while lineups 260 including only standard candidate selections 262 can be entered into contest 255 pools identified with a standard classification 257. For example, a candidate selection 262 corresponding to a boosted-odds event may cause the lineup 260 to be assigned/entered into a first subset of the contests 255 that are part of a promotional contest pool, whereas a lineup 260 having selections 262 corresponding to a normal market event may cause the lineup 260 to be entered into a second subset of the contests 255 that are part of a standard contest pool. Candidate selections 262 described herein may be specified via operator input to the data processing system 205 and/or generated based on messages and/or data records 270 as described in further detail herein.

The contest maintainer 225 can maintain a plurality of contests 255 corresponding to one or more live events and a respective one of a plurality of classifications 257. The contest maintainer 225 can maintain active state data for each contest 255 stored in association with its classification 257, including identifiers for scheduled live events, entry limits, participant counts, and timing data defining contest activation or expiration. In some implementations, the contest maintainer 225 can periodically evaluate contest status using data received from the data processing system 205 to determine whether a contest 255 remains open for entries or has transitioned to an active or completed state. For example, the contest maintainer 225 can retrieve timestamps and entry records from the storage 215 and update the state of each contest 255 when the corresponding live event begins, concludes, or reaches a defined threshold of entries. Each contest 255 maintained in association with a classification 257 can therefore be individually addressable by the contest maintainer 225 to perform updates to contest conditions, entry processing, or finalization of outcome data in coordination with other components of the data processing system 205.

In some implementations, an operator of the data processing system 205 can assign each contest 255 to one of the classifications 257 (e.g., based on configuration settings, etc.). For example, an operator of the data processing system 205 may provide input/command messages/instructions to generate contests 255 having a specific classification 257. In some implementations, the contest maintainer 225 may automatically generate contests 255 of a classification 257, for example, when a number of filled, active contests 255 of the classification 257 exceeds a threshold number. In some implementations, each contest 255 can be indexed within the storage 215 using a pool identifier assigned according to the classification 257, such that the contest maintainer 225 to identify and access all contests belonging to a given classification group (e.g., to enter lineups 260, etc.). For example, contests 255 identified with the same classification 257 may share a common pool identifier value that can be used by the data processing system 205 to locate all contests that correspond to that classification 257 when allocating lineups 260 and/or performing outcome 265 calculations. Such groups may sometimes be referred to herein as "subsets" of contests, with each subset corresponding to a respective classification 257.

As described herein, the device communicator 230 can receive requests from client devices 220 generate lineups 260. Such requests may identify certain candidate selections 262 that are associated with attributes associated with respective classifications 257. The client devices 220 can present interactive lists of candidate selections 262 from which a player can generate the lineup 260. Each candidate selection 262 can be presented as a selectable graphical element within a graphical user interface of the client device 220, such as a tile, a button, or a field that displays an event identifier and corresponding condition. In some implementations, the client device 220 can obtain the list of available candidate selections 262 from the data processing system 205 maintained in the storage 215. For example, the client device 220 can display a scrollable list of candidate selections 262 corresponding to different player statistics, point thresholds, and/or event conditions, such that players can choose selections 262 for inclusion into a single lineup 260 representation.

In some implementations, candidate selections 262 that correspond to different contest 255 pools (e.g., those that correspond to different classifications 257, promotional selections 262, boosted multiplier selections 262, etc.) can be visually indicated by one or more graphical elements at the client device 220. For example, the client device 220 can display a shaded background, a color overlay, and/or an icon/graphical element adjacent to the graphical element of a promotional selection 262 to indicate its association with restricted or promotional contests 255. Upon confirming the selections 262 of the lineup 260 through a confirmation element/button, the client device 220 can transmit a request to the device communicator 230 that includes identifiers of the selections 262 selected by the player, together with any associated metadata such as entry amount, timestamp, and/or classification/category/criteria attributes for subsequent storage and processing at the data processing system 205.

The value determiner 235 can determine that at least one first selection 262 of the plurality of selections 262 corresponds to the first classification. In some implementations, the value determiner 235 can access data of a submitted lineup 260 and retrieve/access/identify attributes maintained for each selection 262 included in that lineup 260. The value determiner 235 can identify any category attributes within the stored data for the selection 262, such as indicators specifying that the selection 262 represents a promotional contest entry, an incentivized pick, and/or another type of restricted entry applicable only to designated pools of contests 255. For example, the category attribute of a selection 262 may include a classification 257 field that associates the selection 262 to a promotional pool or limited-access contest 255 group (e.g., a subset of contests 255 having a specific classification 257, etc.), such that the value determiner 235 can determine that at least one selection 262 of the lineup 260 corresponds to a first classification 257 that governs contest allocation for the lineup 260. In some implementations, the lineup 260 corresponding to the classification 257 of the pool of contests 255 can indicate the lineup 260 satisfies one or more criteria associated with the first classification 257 (e.g., the promotional classification 257).

In one example, the value determiner 235 can determine that at least one selection 262 corresponds to a specific (e.g., a first, a promotional, etc.) classification 257 in based on determining that the at least one selection 262 is associated with a respective first probability value 272 that is greater than a threshold. In some implementations, the determination can be based on probability values derived from sportsbook data feeds (e.g., data records 270), internal calculations, and/or implied odds representing the likelihood that the selection 262 will satisfy its condition. For example, a selection 262 corresponding to an event outcome that is likely to occur, such as a favored player scoring at least one point or a team exceeding a minimal threshold, can yield a probability value 272 above the defined threshold. The value determiner 235 can determine that such a selection 262 has a high-probability status, thereby categorizing it as corresponding to the first classification 257 that influences assignment of the lineup 260 to a corresponding subset of contests 255. The threshold may be stored in as part of configuration settings and may be specified via an operator of the data processing system 205.

The value determiner 235 can determine that at least one (e.g., a single one, any of, each of, etc.) other selection 262 of the plurality of selections 262 is associated with a respective second probability value that is less than the threshold. In some implementations, the value determiner 235 can identify that not all selections 262 within a given lineup 260 necessarily correspond to promotional or high-probability categories, which can indicate mixed categories of selections 262 within a lineup 260. For example, one selection 262 may have a high-probability value 272 designation while another selection 262 may possess a lower probability value 272, such as those representing long-shot outcomes or neutral statistical conditions. The data processing system 205 can, based on the presence of at least one qualifying first selection 262, determine that the entire lineup 260 should be entered into the contest pool associated with the first classification 257 (e.g., a promotional classification 257, etc.), even though other selections 262 of the lineup 260 may have second probability values below the threshold.

As described herein, the value determiner 235 can automatically assign a submitted lineup 260 to open contests 255. The value determiner 235 can automatically assign the lineup 260 to contests 255 that have a classification 257 that matches the category of the lineup 260. For example, if a lineup 260 includes a promotional selection 262 or some other type of selection that corresponds to a specific classification 257 of contests 255, the value determiner 235 may assign/enter the lineup 260 into the contests 255 that are associated with that specific classification 255. The value determiner 235 can select, responsive to determining that at least one of a plurality of selections 262 of the lineup 260 corresponds to the first classification 257 (e.g., one or more contests 255 corresponding to the first classification 257) in which the lineup is to be entered.

In some implementations, the value determiner 235 can automatically assign/enter/select the lineup 260 to the subset of contests 255 that belong to the first (e.g., promotional, identified, etc.) classification 257. The value determiner 235 can identify open contests 255 (e.g., a subset of contests 255) maintained by the contest maintainer 225 that correspond to the first classification 257 and can select one or more of those contests 255 as valid destinations for the lineup 260. For example, when at least one selection 262 in the lineup 260 is identified as corresponding to the first classification 257, the value determiner 235 can access a pool identifier associated with contests 255 of the first classification 257, identify a list of eligible contests 255, and allocate the lineup 260 across those contests 255 based on entry amount 263 or availability conditions stored in the storage 215, according to the techniques described herein. In some implementations, the automatic assignment process performed by the value determiner 235 can cause the lineup 260 to be allocated only to contests 255 having the same classification 257, thereby restricting assignment/selection/entry of the lineup 260 into contests 255 of different classifications 257.

In some implementations, the value determiner 235 can select the one or more contests 255 of the first subset in which the lineup is to be entered based on an entry amount 263 for the lineup 260. The value determiner 235 can divide the entry amount 263 into different portions that correspond to different contest 255 entries within the first subset of contests 255, and can allocate each portion to a different contest 255 that has available entry capacity, as described herein. In some implementations, the value determiner 235 can determine a denomination size for each portion, such as a fixed credit, token, or currency value (e.g., one dollar, one credit, etc.), that aligns with a minimum/configured permissible entry amount defined for each contest 255 of the first subset. For example, when the entry amount 263 represents a ten-credit entry, the value determiner 235 can divide the ten-credit value into ten individual credit portions and assign each portion to ten separate contests 255 within the first subset in order of update timestamp and/or remaining open seats, as described herein. The allocation data can be stored in association with the lineup 260 and/or each selected contest 255 such that each allocated portion of the entry amount 263 is associated with a corresponding contest 255 identifier of the first subset.

In some implementations, the contest maintainer 225 can generate an additional contest 255 having the first classification 257 responsive to determining that a threshold number of lineups 260 having at least one selection 262 corresponding to the first classification 257 have been received. In some implementations, the contest maintainer 225 can determine that no open (e.g., those with available seats, etc.) contests 255 currently exist for the first classification 257 and can dynamically generate an additional contest 255 to expand the contest pool associated with that classification 257. For example, when all available contests 255 for the first classification 257 have transitioned to an active state and/or have reached maximum seat capacity, the contest maintainer 225 can automatically instantiate a new contest 255 having the same contest parameters, classification identifier, and/or entry rules as prior contests 255 of the same classification 257. Once the new contest 255 is generated, the value determiner 235 can assign one or more pending lineups 260 that correspond to the first classification 257 to the newly created contest 255 for entry allocation. In some implementations, the contest maintainer 225 can further assign an index/identifier to the generated contest 255 to group it with existing active contests 255 of the same classification 257.

The value determiner 235 can determine an output value 267 for the lineup 260 across one or more contests 255 of the subset corresponding to the first (e.g., promotional, special, selected/identified, etc.) classification 257 based on corresponding outcomes 265 of the one or more live events and/or corresponding entrants (e.g., other lineups 260 entered into the contests 255). The value determiner 235 can determine the outcome values 265 of each selection 262 based on event data received for the corresponding live events (e.g., received via one or more APIs, one or more messages, etc.), as described herein. In some implementations, the value determiner 235 can compare statistical measures and/or event indicators from the received data with the condition parameters for each selection 262 to determine whether the selection 262 is satisfied or unsatisfied. For example, the value determiner 235 can compare an athlete statistic, such as a total number of yards gained or points scored, with the threshold defined in the selection 262 to determine a success or failure condition. Each outcome value 265 can be stored in association with the corresponding selection 262 and can indicate whether the selection was correctly predicted. In some implementations, the value determiner 235 can aggregate the outcome values 265 for all selections 262 of a lineup 260 to establish a correctness level (e.g., number of selections 262 that are correct) that informs subsequent payout calculations and determines current settlement status for the contests 255 in which the lineup 260 is entered.

The value determiner 235 can use the outcome values 265 to settle all contests 255 that contain the lineup 260 and to generate updated output values 267 and/or minimum values 268 associated with the lineup 260. In some implementations, the value determiner 235 can combine all outcome values 265 across entrants (e.g., other lineups 260) within each contest 255 to rank the lineups 260 and compute payout distributions among the corresponding entrants, as described herein. For example, the value determiner 235 can determine an output value 267 proportional to the number of correct selections 262 within the lineup 260 when compared against outcomes 265 of other entrants of the same contest 255. In some implementations, the value determiner 235 can update minimum values 268 to reflect guaranteed payout tiers that are determined based on the number of satisfied selections 262 in the lineup 260, as described herein. The computed output values 267 and/or minimum values 268 can be maintained in the storage 215 for use by the outcome provider 240 to update player profiles 250 once all contests 255 related to the lineup 260 have been settled, as described herein.

In some implementations, the value determiner 235 can determine the output value 267 for the lineup 260 further based on an entry amount 263 for the lineup 260. The value determiner 235 can use the entry amount 263 as a parameter in the calculation of the output value 267. For example, the value determiner 235 can multiply the entry amount 263 by a contest-specific conversion coefficient that maps the entry amount 263 to at least a minimum value 268 for the lineup 260 (which may be selected based on the number of correct selections 262 in the lineup 260). The value determiner 235 can repeat this process for each lineup 260 in each related contest 255, according to the techniques described herein. For example, the value determiner 235 can determine minimum values 268 and output values 267 for each lineup 260 that includes selections 262 relating to the same live events.

The outcome provider 240 can update the player profile 250 associated with the lineup 260 according to the output value 267 determined for the lineup 260. In some implementations, the outcome provider 240 can apply the output value 267 as a modification to a stored credit balance/value field and/or an account parameter maintained in association with the player profile 250. For example, the outcome provider 240 can increase a numeric credit balance value of the player profile 250 by an amount corresponding to the output value 267 and/or the minimum value 268. In some implementations, the outcome provider 240 can determine which portion of the output value 267 represents an incremental adjustment beyond a previously credited minimum value 268 and can apply that incremental adjustment to the player profile 250 to generate an updated total payout state, as described herein. For example, when the finalized contest 255 results yield a higher total award than the minimum value 268 for the lineup 260, the outcome provider 240 can calculate the difference between the total output value 267 and the previously credited amount and can use the difference to update the credit balance of the player profile 250. The outcome provider 240 can maintain data identifying that the player profile 250 has been credited according to the output value 267. The lineup 260 may be updated to indicate that the outcome of the lineup 260 has been credited.

The outcome provider 240 can provide/transmit the output value 267 for the lineup 260 to the corresponding client device 220. In some implementations, the outcome provider 240 can generate display instructions/display data that includes the output value 267 and/or a corresponding minimum value 268 associated with the same lineup 260 to facilitate display of settled and/or pending payout information. For example, the outcome provider 240 can transmit a data message including identifiers of the lineup 260 and data representing the credited output value 267 and the minimum value 268. The client device 220 can use the received indication to update a corresponding graphical user interface element (e.g., a results panel, summary region, etc.). In some implementations, the outcome provider 240 can provide the data as an HTTP/HTTPS response, an API callback, and/or another type of network message between the data processing system 205 and the client device 220. The transmission can include a timestamp, a currency unit, and/or other value units indicating how the output value 267 and/or the minimum value 268 relate to the entry amount 263 of the lineup 260.

In some implementations, the outcome provider 240 can provide information describing the corresponding entrants (e.g., other lineups 260) for the one or more contests 255 in which the lineup 260 was entered. In some implementations, the outcome provider 240 can generate an indication of the total number of lineups 260 that satisfy different correctness levels within those contests 255. For example, the outcome provider 240 can determine that a first subset of lineups 260 includes a set of selections 262 for which all selections 262 are correct, a second subset of lineups 260 includes selections 262 for which all but one selection 262 are correct, and a third subset of lineups 260 includes selections 262 for which fewer than a threshold number are correct. The outcome provider 240 can store those counts and/or ratios in association with the corresponding contest 255 identifiers and can provide that data to the client device 220 as part of a network message. In some implementations, the outcome provider 240 can include, within such provided data, a mapping between each correctness level and a number and/or percentage of entrants falling within that level. Such information may be presented by the client device 220 via one or more graphical user interfaces. For example, the client device 220 can use the received data to present a table and/or chart showing how many entrants achieved five of five, four of five, or three of five correct selections 262 among all lineups 260 within the same subset of contests 255.

Figure 5:
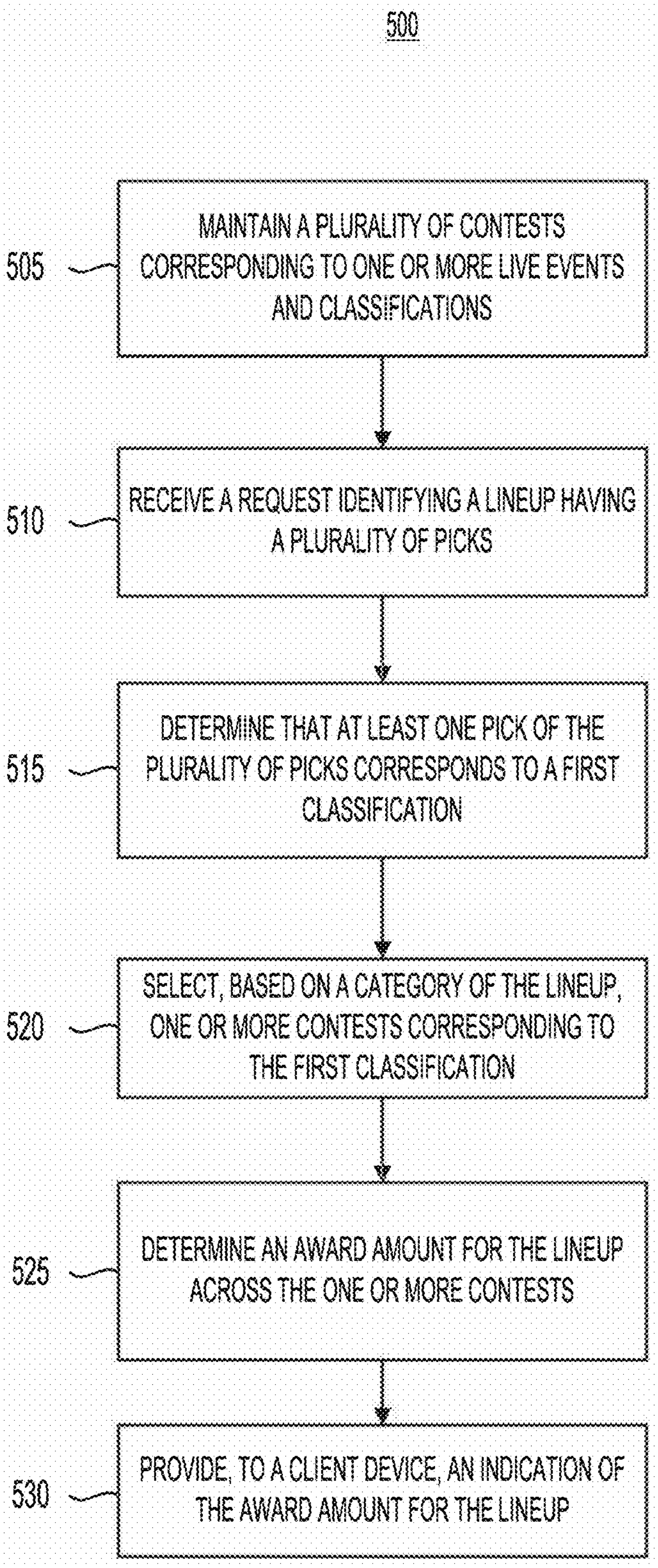
FIG. 5 is a flowchart of an example method for allocating data records according to classifications in a distributed computing environment, in accordance with one or more implementations.

Referring now to FIG. 5, illustrated is a flowchart of an example method 500 for allocating data records according to classifications in a distributed computing environment. The method 500 may be performed, for example, by the data processing system 205 of FIG. 2, any of the client devices 220 of FIG. 2, and/or a combination of the client devices 220 and the data processing system 205 of FIG. 2. Any computing device described herein may perform any step of the method 500. For the purposes of the following description, the operations/STEPs of the method 500 are described as being performed by a "data processing system" (e.g., the data processing system 205). Certain operations may be omitted and/or additional operations may be performed with respect to the method 500. In brief overview of the method 500, the method 500 can include maintaining contests for live events and classifications (STEP 505), receiving a lineup request having multiple picks (STEP 510), determining that at least one pick corresponds to a first classification (STEP 515), selecting one or more contests corresponding to the first classification (STEP 520), determining an award amount for the lineup across contests (STEP 525), and providing an indication of the award amount to a client device (STEP 530).

The method 500, at STEP 505, can include maintaining contests (e.g., the contests 255) for live events. The contests can have corresponding classifications (e.g., classifications 257). To do so, any of the operations of the contest maintainer 225 of FIG. 2 can be performed. The data processing system can maintain a plurality of contests corresponding to various live events, each contest being stored in association with a classification identifier that designates its membership in one or more groups (e.g., subsets) of contests. Such contests may be associated with live events (e.g., sporting events, etc.) and may include one or more entrant lineups (e.g., lineups 260) having one or more selections (e.g., selections 262). Such lineups may be automatically assigned to such contests based on attributes of those lineups (e.g., as having one or more promotional/criterion satisfying/identified categories, etc.). For example, in some implementations, one or more lineups may be automatically assigned to/entered into one or more subsets of contests having corresponding classifications, as described herein.

The method 500, at STEP 510, can include receiving a lineup (e.g., a lineup 260) request having multiple selections (e.g., selections 262). To do so, any of the operations of the device communicator 230 of FIG. 2 can be performed. The data processing system can receive, from a client device (e.g., a client device 220), one or more messages identifying a lineup containing multiple selections selected from a displayed set of candidate selections. In some implementations, the data processing system can provide a graphical user interface and/or data to populate a graphical user interface that presents one or more candidate selections to the client device. In some implementations, each candidate selection can be displayed with an indication of whether it corresponds to the first classification or a second classification. For example, the graphical user interface can present visual icons/indicators that specify whether each selection belongs to a promotional and/or standard contest category, among other categories/attributes. The data processing system can receive an indication of an entry amount transmitted in association with the lineup request and can store the entry amount together with identifiers of the selected candidate selections and/or their respective classifications/categories/attributes.

The method 500, at STEP 515, can include determining that at least one selection corresponds to a first classification (e.g., a classification 257). To do so, any of the operations of the value determiner 235 of FIG. 2 can be performed. In some implementations, the first classification may be a specific classification that is to limit entry/assignment of the lineup 260 into a subset of contests 255 that correspond to/are associated with the first classification. The data processing system can apply a first set of criteria to each selection of the lineup to determine whether the selection corresponds to the first classification. Such criteria can include, but are not limited to, numeric thresholds for probability values (e.g., probability values 272, multiplier values 274, etc.), promotional status attributes (e.g., an indication of whether the selection is a promotional selection, etc.), jurisdictional/geographical restriction attributes, and/or other attributes stored in association with each candidate selection. In some implementations, the data processing system can determine that a selection satisfies the first set of criteria when a corresponding probability value associated with the selection (e.g., derived from sportsbook feeds, stored in association with the candidate selection, etc.) exceeds a stored threshold (e.g., a threshold specified via an operator, stored in configuration settings, etc.) corresponding to a high-probability outcome. For example, the data processing system can classify a selection associated with an implied probability greater than seventy percent as belonging to the first classification, while those having lower probabilities may remain unclassified or assigned to another (e.g., a second, normal, etc.) classification.

The method 500, at STEP 520, can include selecting one or more contests (e.g., a corresponding subset of the contests 255, etc.) corresponding to the first classification. To do so, any of the operations of the value determiner 235 of FIG. 2 can be performed. The data processing system can automatically identify open contests corresponding to the first classification and can select at least a subset of those contests for entry using the lineup. In some implementations, the data processing system can select the contests based on the entry amount associated with the lineup, such that the total entry value influences a number of contests selected for entry by the lineup. For example, the data processing system can assign individual portions of the entry amount to discrete contests in the first subset, where each portion can be equal to a base entry unit (e.g., one dollar, one credit value, a predetermined/configured number of credits, etc.). In some implementations, if all contests corresponding to the first classification reach maximum capacity (e.g., have no available entry seats), the data processing system can generate an additional contest having the same configuration parameters and/or classification attributes as the first subset of contests to continue accepting lineups of the same category. In some implementations, no additional contests may be generated, and the data processing system can provide an error to the client device indicating that the lineup cannot be properly allocated/entered among available contests.

The method 500, at STEP 525, can include determining an output value (e.g., an output value 267, which may include a minimum value 268) for the lineup based on the outcomes (e.g., outcome data 265) of the subset of the contests in which the lineup was entered. To do so, any of the operations of the value determiner 235 can be performed. The data processing system can determine the output value by evaluating outcomes of the live events to which the lineup's selections correspond and by applying payout formulas defined for the contests entered. In some implementations, the data processing system can perform this determination based on outcome data received from event data feeds and/or network messages that provide event updates (e.g., via one or more API messages, etc.). For example, the data processing system can use results transmitted in the received messages to determine completion of live events and/or to verify whether each selection condition was satisfied or unsatisfied. The data processing system can calculate an aggregate output value (e.g., the output value 267) for the lineup by combining the contribution from each contest in which the lineup was entered, with each contribution weighted by the portion of the entry amount allocated to the corresponding contest, as described herein. The data processing system can store the determined output value in association with the lineup identifier for subsequent updates to the player profile, as described herein.

The method 500, at STEP 530, can include providing an indication of the output value to a client device. The data processing system can the player profile (e.g., a credit balance, etc.) according to the output value for the lineup. To do so, any of the operations of the value determiner 235 and/or the output provider 240 of FIG. 2 can be performed. The data processing system can generate an electronic message that includes the determined output value and/or any other related data such as the entry amount and/or classification type used in the determination. In some implementations, the data processing system can update the graphical user interface presented on the client device to display the output value in numerical and textual form within an interface panel corresponding to the player profile. For example, the data processing system can cause the client device to present a summary/results region showing the total settled amount and the applicable classification label under which the lineup was processed. The communication of the output value can occur in real time or near real time following the calculation and/or completion of all relevant contests and/or live events, as described herein.

At least one aspect relates to a system. The system can include one or more processors coupled to non-transitory memory. The system can maintain a plurality of contests corresponding to one or more live events, each contest of the plurality of contests corresponding to a respective one of a plurality of classifications, wherein each first contest of a first subset of the plurality of contests corresponds to a first classification and each second contest of a second subset of the plurality of contests corresponds to a second classification. The system can receive, from a client device, a request identifying a lineup comprising a plurality of picks. The system can determine that at least one first pick of the plurality of picks corresponds to the first classification, wherein the at least one first pick of the plurality of picks is associated with a respective first probability value that is greater than a threshold and each other pick of the plurality of picks is associated with a respective second probability value that is less than the threshold. The system can, responsive to determining that at least one of the plurality of picks corresponds to the first classification, select, based on a category of the lineup, one or more contests of the first subset corresponding to the first classification in which the lineup is to be entered. The system can determine an award amount for the lineup across the one or more contests of the first subset corresponding to the first classification based on corresponding outcomes of the one or more live events and corresponding entrants for the one or more contests of the first subset corresponding to the first classification. The system can provide, to the client device, an indication of the award amount for the lineup.

In some implementations, the system can restrict assignment of the lineup to both the first subset and the second subset. In some implementations, the system can determine, for each pick of the lineup, whether the pick satisfies a first set of criteria corresponding to the first classification. In some implementations, the system can receive an indication of an entry amount for the lineup. In some implementations, the system can determine the award amount for the lineup further based on the entry amount. In some implementations, the system can assign a respective portion of the entry amount to the one or more contests of the first subset in which the lineup is to be entered. In some implementations, the system can select the one or more contests of the first subset in which the lineup is to be entered based on the entry amount.

In some implementations, the system can generate an additional contest within the first subset responsive to determining that a threshold number of lineups having at least one pick corresponding to the first classification have been received. In some implementations, the system can maintain a data structure storing a plurality of picks in association with a respective classification for each pick of the plurality of picks. In some implementations, the system can provide a graphical user interface indicating a plurality of candidate picks from which the plurality of picks are to be selected, each candidate pick of the plurality of candidate picks presented with an indication of the first classification or the second classification. In some implementations, the system can determine the corresponding outcomes of the one or more live events based on one or more messages received via an application programming interface (API).

At least one other aspect relates to a method. The method can be performed, for example, by one or more processors coupled to non-transitory memory. The method can include maintaining a plurality of contests corresponding to one or more live events, each contest of the plurality of contests corresponding to a respective one of a plurality of classifications, wherein each first contest of a first subset of the plurality of contests corresponds to a first classification and each second contest of a second subset of the plurality of contests corresponds to a second classification. The method can include receiving, from a client device, a request identifying a lineup comprising a plurality of picks. The method can include determining that at least one first pick of the plurality of picks corresponds to the first classification, wherein the at least one first pick of the plurality of picks is associated with a respective first probability value that is greater than a threshold and each other pick of the plurality of picks is associated with a respective second probability value that is less than the threshold. The method can include, responsive to determining that at least one of the plurality of picks corresponds to the first classification, selecting, based on a category of the lineup, one or more contests of the first subset corresponding to the first classification in which the lineup is to be entered. The method can include determining an award amount for the lineup across the one or more contests of the first subset corresponding to the first classification based on corresponding outcomes of the one or more live events and corresponding entrants for the one or more contests of the first subset corresponding to the first classification. The method can include providing to the client device an indication of the award amount for the lineup.

In some implementations, the method can include restricting assignment of the lineup to both the first subset and the second subset. In some implementations, the method can include determining, for each pick of the lineup, whether the pick satisfies a first set of criteria corresponding to the first classification. In some implementations, the method can include receiving an indication of an entry amount for the lineup. In some implementations, the method can include determining the award amount for the lineup further based on the entry amount. In some implementations, the method can include assigning a respective portion of the entry amount to the one or more contests of the first subset in which the lineup is to be entered. In some implementations, the method can include selecting the one or more contests of the first subset in which the lineup is to be entered based on the entry amount.

In some implementations, the method can include generating an additional contest within the first subset responsive to determining that a threshold number of lineups having at least one pick corresponding to the first classification have been received. In some implementations, the method can include maintaining a data structure storing a plurality of picks in association with a respective classification for each pick of the plurality of picks. In some implementations, the method can include providing a graphical user interface indicating a plurality of candidate picks from which the plurality of picks are to be selected, each candidate pick of the plurality of candidate picks presented with an indication of the first classification or the second classification. In some implementations, the method can include determining the corresponding outcomes of the one or more live events based on one or more messages received via an application programming interface (API).

Systems and Methods for Updating Network Data Records for Peer-to-Peer Network Operations At least one other aspect of the present disclosure relates to distributed computing environments that process probabilistic network interactions across multiple different types of data records. Distributed computing systems may use non-binary datasets in which each record carries an associated probability and/or similar value derived from one or more events. Event data indicating the outcomes/state of such events can indicate metrics for events that occur in real time. Because individual events may not represent equal likelihoods, network applications that process such datasets can implement probabilistic normalization before subsequent computation.

Traditional allocation processes often assume binary reliability distributions such as true or false, success or failure, and/or similar evenly weighted states. When inputs are encountered that exhibit a non-binary probability distribution, existing processing logic can over-allocate, under-allocate, and/or otherwise distort weighting calculations during network processing. This imbalance can increase computational errors across datasets and/or restrict data records associated with such non-binary events from processing altogether.

To address these shortcomings, the techniques described herein can convert probability values into multiplier values that correspond to scaling within distributed network operations. The systems and methods described herein can obtain probability values from one or more event data record sources, can apply one or more transformation functions to generate one or more multiplier values, and can use such multiplier values in processing data records in distributed computing environments. During processing, the generated multiplier values can be applied within the distributed environment to control proportional weighting among non-binary conditional events (e.g., selections/candidate selections as described herein). By applying the described probability-to-multiplier conversion process, the systems and methods described herein can process non-binary datasets that would otherwise be impossible using conventional approaches. The resulting effect can improve processing accuracy of non-binary datasets and can provide improved, low-latency performance when processing such datasets in distributed computing environments.

Referring back to FIG. 2, the data processing system 205 can execute operations to generate candidate selections with corresponding multiplier values 274 determined based on different probability values 272 of corresponding data records 270. The data processing system 205 can convert non-binary market data (e.g., probability values 272) for data records 270 (e.g., wager opportunities) into corresponding multiplier values 274 for candidate selections 262 (e.g., picks that may be made for one or more lineups as described herein). In some implementations, the data processing system 205 can apply a linear, nonlinear, and/or logarithmic mapping function to transform each derived probability value 272 into a scaled multiplier value 274 that correlates with the likelihood of the underlying event outcome. Such multiplier values 274 may be associated with corresponding candidate selections 262, as described in further detail herein. For example, outcome probability values 272 above a stored equilibrium threshold can yield multiplier values 274 that represent higher-likelihood (e.g., greater than a 50/50 chance) selections 262, while outcome probability values 272 below the threshold can yield multiplier values 274 greater than one to represent lower-likelihood (e.g., lower than a 50/50 chance) selections 262. The data processing system 205 can use the resulting multiplier values 274 to determine scaling factors for output values 267, as described herein.

As shown in FIG. 2, the storage 215 can include one or more data records 270. Data records 270 may sometimes be referred to herein as "wager opportunities," "wager scenarios," "wager opportunities 270," and/or "wager scenarios 270." The data records 270 can represent wager opportunities and/or wager scenarios (e.g., corresponding to sportsbook markets) having one or more associated data record parameters. In some implementations, the data records 270 can identify wager opportunities available for selection (e.g., active wager opportunities) which may be used to generate corresponding candidate selections 262 that may be included in lineups 260 according to the techniques described herein. Each data record 270 can define a wager opportunity corresponding to one or more live events (e.g., a sporting event currently being played, or an upcoming sporting event that has not yet started, etc.). The data records 270 can store or otherwise be associated with data record parameters, which can include information indicating the associated live event (s), the type of wager opportunity, and/or the potential outcomes that a player may later select. For example, a data record 270 can define a wager opportunity on a football game between Team A and Team B, specifying that selectable outcomes correspond to either Team A winning or Team B winning. In another example, a data record 270 can identify a football game and include data record parameters defining multiple selectable outcomes, such as a total points over/under value or a specific player performance threshold. The data record parameters can further include line identifiers, event times, current odds, or betting lines (e.g., probability values 272), and/or any conditions applicable to the wager opportunity. In some implementations, the data record parameters can specify the wager opportunity type, such as a moneyline, point spread, over/under, parlay, proposition, or futures market, among others. In some implementations, the data records 270 can include multiple wager opportunities, such as a set of related events for tournament brackets or grouped conditional outcomes (e.g., multi-leg parlays or other compound markets).

The data records 270 can be stored within the storage 215 according to any suitable format or schema. In some implementations, the data records 270 can be indexed according to a wager opportunity identifier, an event identifier, or other attributes of the wager opportunity. In some implementations, the data records 270 can be organized by live event, sport type, league, and/or competition. The data processing system 205 can maintain historical data records 270 corresponding to completed wager opportunities to preserve reference to prior market states and, in some implementations, can store indicators identifying the current status of each wager opportunity (e.g., open, closed, suspended, settled, etc.). The data records 270 can be accessed by any of the components of the data processing system 205 to perform operations such as retrieving eligible wager opportunities, displaying live or upcoming events, updating odds and lines, and/or determining payout multipliers 274 associated with candidate selections 262, among others.

The storage 215 can include one or more probability values 272 that are associated with the data records 270 and can be stored as part of the corresponding data record parameters. In some implementations, each probability value 272 can represent the implied likelihood of a possible outcome for a wager opportunity/wager scenario. For example, the probability value 272 can be derived from sportsbook odds provided in decimal, fractional, and/or American notation and can be converted into an implied probability metric. In some implementations, the data record parameters for the wager opportunities can further include a range of attributes specifying permissible stake limits, line values, and/or payout caps associated with each outcome. The data record parameters can include timestamps identifying when the wager opportunity was last updated, when the associated event is scheduled to begin, and when the underlying probability values 272 were refreshed. In some implementations, the data record parameters can include status indicators showing whether the wager opportunity is active, inactive, and/or pending an odds/probability value 272 update. The data processing system 205 can use the data record parameters, including the probability values 272, to convert sportsbook data into multiplier values 274 for use in payout calculations for selections 262 as described in further detail herein.

The storage 215 can include one or more multiplier values 274. In some implementations, the multiplier values 274 can be respectively associated with candidate selections 262 that correspond to wager opportunities or market conditions having implied probabilities different from an approximately equal probability (e.g., non-50/50 outcomes, etc.). In one example, the multiplier values 274 can be and/or include scalar factors that modify guaranteed or baseline payout amounts (e.g., minimum values 268) based on the relative likelihood of the underlying selection 262 outcome. For example, the data processing system 205 can use a multiplier value 274 corresponding to a selection with an implied probability lower than fifty percent to increase a minimum value 268 relative to a lineup 260 that only includes 50/50 probability selections 262, whereas a multiplier value 274 corresponding to a selection with an implied probability higher than fifty percent can proportionally reduce the same minimum value 268, as described in further detail herein. In some implementations, the multiplier values 274 can be combined multiplicatively across multiple selections 262 of lineup 260, as described in further detail herein, to determine a composite and/or cumulative multiplier applied to the entry amount 263 to generate the minimum values 268 that represent guaranteed award amounts for partially and/or fully correct lineups 260 according to the techniques described herein.

In some implementations, the multiplier values 274 can further be used by the data processing system 205 to calculate standings points that represent contest ranking positions and/or peer-to-peer weighting among entrant lineups 260 including such candidate selections 262. For example, and as described in further detail herein, the data processing system 205 (and/or any of the components thereof) can determine, for each lineup 260 (e.g., during payout determination operations), an effective multiplier derived from the product of the multiplier values 274 of its constituent selections 262 and can apply (e.g., multiply) that effective multiplier to the base entry points assigned to the lineup 260 to generate a standings points total. The results of such calculations can generate a greater number of standings points for lineups including selections 262 associated with lower-probability outcomes and fewer standings points for lineups including selections 262 associated with higher-probability outcomes, as described in further detail herein. In some implementations, such standings point totals can be used to determine the proportional share of a peer-to-peer payout pool of corresponding contests 255 for each lineup 260 of the contests 255.

Referring to the operations of the data processing system 205, the contest maintainer 225 can maintain contests 255 and candidate selections 262 corresponding to one or more live events. The contest maintainer 225 can maintain identifiers, classifications, and timing parameters for each contest 255 stored in the storage 215 and can update each contest 255 to reflect live event progress, entry state, or completion state. In some implementations, the contest maintainer 225 can determine whether a contest 255 has reached a defined fill threshold or activation condition based on the number of entered lineups 260 or the scheduled start times of corresponding live events. For example, the contest maintainer 225 can identify that a contest 255 with a specified maximum number of entrants has reached full capacity and can update the contest 255 to a closed or active state, preventing additional entries. In some implementations, the contest maintainer 225 can remove or archive contests 255 associated with completed live events and can generate new contests 255 corresponding to upcoming events based on schedules retrieved from external data feeds.

In some implementations, the contest maintainer 225 can maintain candidate selections 262 in association with live event identifiers and data record attributes stored in the storage 215. Each candidate selection 262 can include a reference to an underlying event condition, such as player performance metrics or team outcomes, which can be added to different contests 255 as available options for lineup entries. For example, the contest maintainer 225 can associate each candidate selection 262 with a contest 255 that corresponds to a common sport type, competition date, or jurisdictional classification, such that all related selections 262 are accessible during lineup generation. The contest maintainer 225 can update candidate selections 262 when live event feeds indicate that conditions have changed, such as line adjustments, player availability, or market suspension. In some implementations, the contest maintainer 225 can deactivate candidate selections 262 when a corresponding live event has started or when a category flag in the data record 270 indicates that the selection 262 is expired or voided, thereby preserving valid active selections for contest entries across the data processing system 205.

The contest maintainer 225 may be executed to generate and/or assign multiplier values 274 to candidate selections 262. In some implementations, the multiplier values 274 may be generated in response to a request from an operator of the data processing system 205 and/or via one or more network messages identifying a request to generate candidate selections 262 from existing data records 270. The contest maintainer 225 can generate the candidate selections 262 by accessing data records 270 that represent existing wager opportunities maintained in the storage 215 and creating corresponding candidate selections 262 having parameters corresponding to the data record attributes, such as event identifiers, line values, and/or conditional outcomes. In some implementations, each candidate selection 262 can include at least two selectable outcomes associated with the underlying data record 270, such as an over or under condition, a win or loss condition, and/or a yes or no condition, among other possible selectable outcomes of conditional event(s). For example, the contest maintainer 225 can use a data record 270 that stores a wager opportunity associated with a particular live event and generate two candidate selections 262 respectively corresponding to the different selectable outcomes (e.g., outcomes of conditional event(s), etc.) represented by that wager opportunity. Each generated candidate selection 262 can be generated include/ represent the same identifying attributes, metadata, and/or timing information as the existing wager opportunity from which it was derived. Candidate selections 262 may be generated in such a manner in response to a request from one or more computing devices (e.g., operated by operators associated with the data processing system 205) and/or via operator input to the data processing system 205.

In some implementations, the contest maintainer 225 can determine that at least one candidate selection 262 of the plurality of candidate selections 262 satisfies a criterion. In some implementations, the contest maintainer 225 can determine, for at least one candidate selection 262 of the plurality of candidate selections 262, that a corresponding data record 270 of the plurality of data records 270 is associated with a probability value 272 different from a 50 percent probability value 272. For example, the contest maintainer 225 can determine that a created candidate selection 262 corresponds to a market having an implied likelihood that deviates from a balanced or "50/50" condition, as represented by the probability value 272 associated with the corresponding data record 270. The contest maintainer 225 can use this determination to identify that the candidate selection 262 corresponds to a non-binary market and can classify the candidate selection 262 for subsequent multiplier 274 generation. In some implementations, such determination can occur during retrieval of sportsbook feed data when each data record 270 includes at least one probability value 272 that is materially greater or less than 0.5.

In some implementations, the contest maintainer 225 can retrieve/obtain/access probability values 272 of a plurality of data records 270 that respectively correspond to such candidate selections 262. The contest maintainer 225 can access the probability values 272 stored in association with each data record 270 to provide the probability inputs required for generation of corresponding multiplier values 274. In some implementations, the probability values 272 can be retrieved/obtained/accessed from one or more external sportsbook data feeds/repositories/servers through at least one API that provides current line and/or price data associated with active wager opportunities (e.g., data records 270). For example, the contest maintainer 225 can issue a call to a sportsbook endpoint (e.g., via one or more APIs, etc.) to obtain the latest probability values 272 expressed as decimal and/or fractional odds. In some implementations, the contest maintainer 225 can convert them into normalized percentages before storing or referencing them within the storage 215.

The retrieved/accessed/obtained probability values 272 can then be used by the contest maintainer 225 and/or other components of the data processing system 205 to generate the multiplier values 274 that define payout scaling for the corresponding candidate selections 262. In some implementations, each access operation can associate the probability value 272 to its corresponding candidate selection 262 identifier, such that subsequent multiplier calculations use the correct mapping between the data record 270 and the associated candidate selection 262 for processing. In some implementations, the contest maintainer 225 can retrieve/obtain/access the probability values 272 via one or more APIs, which may correspond to sportsbook endpoints and/or repositories that store/maintain up-to-date probability values 272 for corresponding data records 270.

The contest maintainer 225 can generate, using a probability value 272, a multiplier value 274 that corresponds to a related candidate selection 262. To do so, the contest maintainer 225 can apply a mathematical transformation that uses the probability value 272 as an input variable within a mapping function to generate the multiplier value 274. In some implementations, the probability value 272 can represent an implied likelihood derived from the probability value 272 (e.g., sportsbook odds, etc.) for a outcome corresponding selectable outcome for the candidate selection. In some implementations, the transformation applied by the contest maintainer 225 can be inversely proportional to such likelihoods/probability values 272, such that lower probability values 272 result in generation of greater resulting multiplier values 274 and greater probability values 272 result in generation of corresponding lower multiplier values 274.

In one example, the contest maintainer 225 can include in the transformation one or more configurable coefficients that can be retrieved/associated with the attributes of the data record 270 and/or candidate selection. Such coefficients may be specified/created/modified by one or more operators of the data processing system 205. The contest maintainer 225 may access such coefficients from stored parameters and that define relative sensitivity and/or scaling for probability value 272 ranges across different live event types/categories and/or market categories. For example, the contest maintainer 225 can include coefficients that modify the steepness of the multiplier value 274 response to probability value 272 changes for markets in basketball outcomes differently than those applied for standard over-under markets in football outcomes. In some implementations, the contest maintainer 225 can apply additional coefficients that adjust aggregate multiplier distributions across all candidate selections 262 according to target payout ratios and/or operator-defined calibration settings stored in the storage 215. The generation of each multiplier value 274 can be a function of a set of input parameters that can include the probability value 272, configurable coefficients, live event type identifiers, market type identifiers, and/or payout baseline parameters associated with pay-table data structures specifying expected return ranges for multi-selection 262 lineups 260.

In some implementations, the contest maintainer 225 can associate the multiplier value 274 to a corresponding candidate selection 262 based on the candidate selection 262 corresponding to a non-binary market. The contest maintainer 225 can determine that the candidate selection 262 is derived from a data record 270 whose implied probability value 272 differs from an approximately even outcome probability and can flag the candidate selection 262 as belonging to a non-binary classification for multiplier 274 assignment. In some implementations, the contest maintainer 225 can incorporate the generated multiplier value 274 into a data structure, such that the multiplier value 274 is to operate as a scaling factor applied to baseline payout tiers (e.g., output values 267) or guaranteed award amounts (e.g., minimum values 268). For example, the contest maintainer 225 can apply the generated multiplier value 274 as a selection-specific coefficient within a lineup 260 to determine a minimum value 268 for the lineup 260, as described in further detail herein.

In some implementations, the contest maintainer 225 can maintain one or more data structures storing each candidate selection 262 in association with the data record 270 from which the candidate selection 262 was derived. the data structure may further associate the candidate selection and/or the data record 270 with the respective multiplier value 274 generated for the candidate selection 262. In some implementations, each data structure can include associated identifiers that associate the candidate selection 262 with an identifier of the corresponding data record 270 and/or the data record parameters thereof. For example, the contest maintainer 225 can create a relational table that associates a candidate selection 262 with attributes of a data record 270 such as event identifiers, line values, and/or probability values 272, and associate such data with the multiplier value 274 generated for the candidate selection 262. In some implementations, the stored associations can be updated dynamically in response to real-time market updates so that the multiplier values 274, as described in further detail herein.

In some implementations, the contest maintainer 225 can generate each multiplier value 274 to be less than a predetermined multiplier value 274. In some implementations, the multiplier value 274 may be generated to be less than a predetermined limit that can be stored as a constraint parameter specifying a ceiling value for multiplier value 274 calculations. For example, the predetermined limit may be configurable via operator input to the data processing system 205, and the contest maintainer 225 can apply the stored parameter when generating each multiplier value 274 to constrain the resulting values within the maximum permitted range for the corresponding candidate selections 262.

In some implementations, the contest maintainer 225 can detect a change to a probability value 272 of a data record 270 that was used to generate/derive a candidate selection 262. The contest maintainer 225 can monitor the probability values 272 stored in association with active data records 270 by periodically retrieving/accessing/obtaining current line, price data, and/or probability values 272 from one or more sportsbook feeds/repositories/data sources and/or other computing systems that maintain such data. In some implementations, the contest maintainer 225 can compare a retrieved/derived probability value 272 for a data record 270 with a previously stored probability value 272 maintained in the storage 215 to determine whether the difference between the two values exceeds a predefined threshold (e.g., configured via operator input to the data processing system 205) associated with that data record 270. For example, the contest maintainer 225 can identify a change when the updated probability value 272 indicates a shift in implied odds for an underlying wager opportunity/scenario that alters the relative probability distribution across available outcomes of the associated live event beyond a predetermined threshold amount. In some implementations, the contest maintainer 225 can detect changes based on message events and/or timestamps stored in the retrieved sportsbook data. In one example, an updated timestamp for a corresponding line/price entry can indicate that an update has occurred to the underlying probability value 272. The detection of such changes can cause the contest maintainer 225 to flag the corresponding data record 270 for subsequent processing so that the multiplier values 274 of dependent candidate selections 262 can be recalculated.

In some implementations, the contest maintainer 225 can update a multiplier value 274 associated with the a candidate selection 262 in response to detecting the change to the probability value 272 of the data record 270 used to derive that candidate selection 262. In some implementations, the contest maintainer 225 can re-calculate the multiplier value 274 by retrieving/obtaining/accessing the updated probability value 272 of the data record 270 and by applying the same transformation function previously used to map the previously obtained probability value 272 to the multiplier value 274. For example, the contest maintainer 225 can apply a logarithmic and/or non-linear mapping function that inversely correlates the multiplier value 274 to the updated probability value 272 so that greater probability values 272 result in generation of lesser multiplier values 274 and lesser probability values 272 result in generation of greater multiplier values 274. In some implementations, the contest maintainer 225 can use one or more configuration settings/parameters that define a ceiling threshold and/or slope coefficient for the mapping function, and can re-apply such coefficients/thresholds to generate a new multiplier value 274 that is to replace the prior multiplier value 274 for the candidate selection 262. In some implementations, the contest maintainer 225 can store the re-calculated multiplier value 274 in association with the candidate selection 262 as an updated record for subsequent use by the data processing system 205 and/or the components thereof.

The device communicator 230 can receive, from a client device 220, a request identifying a player profile 250 and a lineup 260 that includes a set of selections 262 selected from available candidate selections 262. In some implementations, the device communicator 230 can receive, from the client device 220, an indication of an entry amount 263 associated with the lineup 260. As described herein, the device communicator 230 can perform these operations by establishing a communication session with the client device 220 to exchange request data that includes identifiers of the player profile 250 and player-selected candidate selections 262 for the lineup 260. In some implementations, the device communicator 230 can receive the request data via a previously established communication session. In some implementations, the device communicator 230 can parse/process received request message data to extract selection 262 identifiers corresponding to the chosen candidate selections 262 and verify that the identifiers represent active candidate selections 262. For example, the device communicator 230 can receive data packets transmitted over the network 210 that include both the entry amount 263 and the list of selections 262 generated by the client device 220 during a lineup creation process. The device communicator 230 can transmit acknowledgment messages to confirm receipt of the data and can provide confirmation data to the client device 220 indicating that the lineup 260 and the entry amount 263 have been successfully transmitted to the data processing system 205 for subsequent allocation and processing operations.

The value determiner 235 can select, based on a set of selections 262 of a lineup 260, a subset of the contests 255 in which the lineup 260 is to be entered. For example, the value determiner 235 can identify available contests 255 stored in the storage 215 and evaluate whether each contest 255 includes open entry positions suitable for entry by the lineup 260. In some implementations, the value determiner 235 can determine that a contest 255 is eligible when its status indicator shows an open state and when the lineup 260 meets internal entry conditions (e.g., the number of required selections 262, active event identifiers, etc.). For example, the value determiner 235 can allocate the lineup 260 the first open contests 255 that correspond to the same and/or overlapping live events associated with the selections 262 of the lineup 260. The number of contests 255 selected for entry can depend on one or more stored conditions such as available capacity or total entry amount associated with the lineup 260, as described herein. The value determiner 235 can store allocation data associating the lineup 260 to each selected contest 255 of the subset once the selection is complete.

In some implementations, the value determiner 235 can perform the entry process by updating each selected contest 255. In doing so, the value determiner 235 can register the lineup 260 as an active entrant and can update the seat count and/or occupancy value of the corresponding contest 255. In some implementations, the value determiner 235 can access the entry amount 263 associated with the lineup 260 and divide the entry amount 263 into different portions corresponding to unit entry values accepted by the selected contests 255. For example, the value determiner 235 can divide a ten-dollar entry amount 263 into ten single-dollar entry portions and can use each portion to occupy an open entry position within ten selected contests 255. The value determiner 235 can identify a set of eligible contests 255 maintained for the same live event group and can allocate each portion of the entry amount 263 to a corresponding contest 255 based on seat availability and/or contest status, as described herein. In some implementations, the value determiner 235 can select contests 255 according to classifications 257 and attributes of the selections 262 of the lineup 260, as described herein. In some implementations, the value determiner 235 can perform a sequential and/or round-robin allocation process to distribute the divided portions evenly among selected contests 255 until the entry amount 263 has been fully assigned. For example, the value determiner 235 can identify three contests 255 associated with the same live event group and can execute three separate entry instructions specifying the lineup 260 identifier, an assigned portion of the entry amount 263 for each contest 255, and/or any corresponding contest 255 identifiers to be used for registration, as described herein. This process may be repeated for each lineup 260 received by the data processing system 205 to allocate lineups 260 to various available contests 255.

As described herein, the value determiner 235 can monitor live event data to determine outcomes 265 of the selections 262 in one or more lineups 260. The value determiner 235 can process event data in real time or near real time to evaluate the state of each live event corresponding to the selections 262 in a lineup 260. In some implementations, the value determiner 235 can receive, from one or more data feeds and/or data sources, event data corresponding to the one or more live events related to the selections 262 of the lineup 260. For example, the value determiner 235 can receive statistical updates, game state indicators, score values, and/or athlete performance metrics from external systems and/or data sources that provide live event data, as described herein. The value determiner 235 can compare each received data element to the stored conditions of corresponding selections 262 to determine intermediate and final outcomes 265 for the selections 262 of each active lineup 260, as described herein. In some implementations, the value determiner 235 can update outcome 265 determinations as new event messages are received, such that each selection 262 can be updated in real time or near real time, as described herein.

Once outcome 265 data has been determined for one or more selections 262 of a lineup 260, the value determiner 235 can determine an output value 267 and/or minimum value 268 for the lineup 260 based on a respective outcome 265 of each selection 262 and the respective multiplier value 274 corresponding to each selection 262 of the lineup. The value determiner 235 can determine a minimum value 268 for each lineup 260 using the entry amount 263 data and the multiplier value 274 associated with each selection 262 of the lineup 260. In some implementations, the value determiner 235 can determine a cumulative multiplier value 274 representing the product of individual multiplier values 274 of all selections 262 within the lineup 260, and can multiply that cumulative multiplier by the entry amount associated with the lineup 260. For example, if a lineup 260 includes several selections 262 associated with probability values 272 indicating relatively high confidence events (e.g., low-risk outcomes), the respective multiplier values 274 may yield a cumulative multiplier value 274 less than one, resulting in a lower minimum value 268 relative to a lineup 260 including selections 262 corresponding to 50/50 probabilities. Conversely, when a lineup 260 includes lower-probability selections 262 associated with greater individual multiplier values 274, the cumulative multiplier may exceed one and result in a greater minimum value 268 relative to a lineup 260 including selections 262 corresponding to 50/50 probabilities. The value determiner 235 can generate the resulting value as the minimum value 268 for that lineup 260, which represents the guaranteed payout value for the lineup 260 (e.g., before completion of all contests 255 and/or related live events) as described herein.

The value determiner 235 can determine a final output value 267 for each lineup 260 by processing the completed outcomes 265 across all contests 255 in which the lineup 260 is entered, as described herein. In some implementations, the final output value 267 for the lineup 260 can be determined after the corresponding live events have concluded and/or the peer-to-peer payout pools of the contests 255 have been finalized. To use the multiplier values 274 to reflect the difference in probability values 262 realized via any non-binary selections 262, the value determiner 235 can use the multiplier values 274 of the selections 262 included in the lineup 260 (e.g., the non-binary selections 262 that are identified as correct) to generate a number of standings points that quantify the proportional share of the prize pool available to that lineup 260 within a given payout tier (e.g., correctness level, number of correct selections 262 of the lineup 260, etc.) for each contest 255 in which the lineup 260 was entered.

The standings points can be determined as a function of the entry amount 263 and/or the effective multiplier derived from the multipliers 274 of the selections 262 that satisfied their respective conditions (e.g., the correct selections 262 that are associated with multiplier values 274). Each entry amount 263 can define a base quantity of standings points that establishes a proportional weighting for sharing a contest pool value (e.g., the sum total of all portions of entry amounts 263 associated with all lineups 260 entered into the contest 255, etc.) of a contest 255 once the lineup 260 qualifies for a payout tier (e.g., a respective number of correct selections 262). In some implementations, the effective multiplier can be derived from the cumulative product or other transformation of the multiplier values 274 of the selections 262 determined to be correct in the lineup 260. For example, a lineup 260 entered with an entry amount 263 of one unit and a set of selections 262 corresponding to multiplier values 274 greater than one can generate a greater number of standings points than a lineup 260 having the same entry amount 263 but only selections 262 corresponding to multiplier values 274 equal to one (e.g., multiplier values 274 representing 50/50 selections, etc.).

In some implementations, all standings points across qualifying (e.g., winning) lineups 260 for a payout tier of a contest 255 can be summed to generate a total standings point count, and the value determiner 235 can divide any remaining pool value above the guaranteed minimum values 268 among those lineups 260 in proportion to their respective standings points. For example, each lineup 260 can receive a fraction of a remaining pool determined by the ratio between its standings points and the total standings points across the tier. In some implementations, the output value 267 calculated for each lineup 260 can therefore include the guaranteed minimum value 268 previously credited and an incremental amount calculated according to the proportional share derived from the standings points. In some implementations, no reduction of the minimum value 268 occurs because the standings points operate only as an allocation parameter that determines how any additional pool value above the guaranteed minimums is distributed among eligible lineups 260, as described herein.

The outcome provider 240 can update a player profile 250 according to an output value 267 and/or minimum value 268 for a lineup 260. In some implementations, the outcome provider 240 can identify the player profile 250 associated with a winning lineup 260 (e.g., satisfying one or more win conditions) and can update one or more fields of the player profile 250 to reflect the credited amount. For example, the outcome provider 240 can access balance data stored within the player profile 250 and can increase the credit balance by the output value 267. In some implementations, the outcome provider 240 can update the player profile 250 by the output value 267 when the output value 267 exceeds the minimum value 268, as described herein.

In some implementations, the outcome provider 240 can provide the output value 267 and/or the minimum value 268 for display via one or more graphical user interfaces presented via a corresponding client device 220. The outcome provider 240 can transmit the output value 267 and the minimum value 268 in one or more electronic messages that include identifiers of the lineup 260, the entry amount 263, and/or any corresponding payout tiers applicable to the lineup 260. In some implementations, the client device 220 can use the transmitted data (e.g., information, display instructions, etc.) to present visual elements indicating contest 255 settlement status and/or any minimum values 268/output values 267 within a summary region of a displayed graphical user interface. The presentation of the output value 267 and/or the minimum value 268 at the client device 220 can occur dynamically as the outcome provider 240 generates new contest 255 results based on completion status of relevant live events and/or the conditional events thereof.

Figure 6:
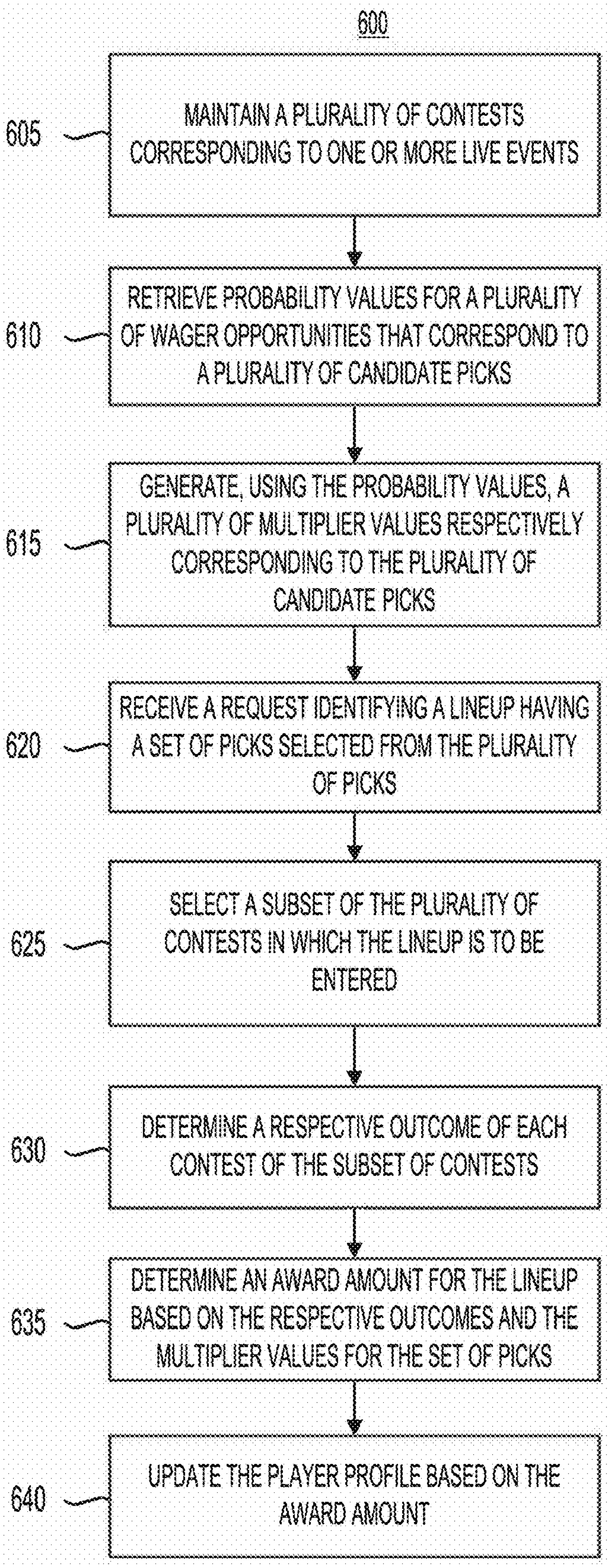
FIG. 6 is a flowchart of an example method for generating multipliers according to probability values associated with data records in a distributed computing environment, in accordance with one or more implementations.

Referring now to FIG. 6, illustrated is a flowchart of an example method 600 for generating multipliers according to probability values associated with data records in a distributed computing environment, in accordance with one or more implementations. The method 600 may be performed, for example, by the data processing system 205 of FIG. 2, any of the client devices 220 of FIG. 2, and/or a combination of the client devices 220 and the data processing system 205 of FIG. 2. Any computing device described herein may perform any step of the method 600. For the purposes of the following description, the operations/STEPs of the method 600 are described as being performed by a "data processing system" (e.g., the data processing system 205). Certain operations may be omitted and/or additional operations may be performed with respect to the method 500. In brief overview of the method 600, the method 600 can include maintaining a plurality of contests corresponding to one or more live events (STEP 605), retrieving probability values for wager opportunities corresponding to candidate picks (STEP 610), generating multiplier values based on the probability values for the candidate picks (STEP 615), receiving a request identifying a lineup having a set of picks selected from the candidate picks (STEP 620), selecting a subset of the contests in which the lineup is to be entered (STEP 625), determining a respective outcome for each contest of the selected subset (STEP 630), determining an award amount for the lineup based on the contest outcomes and multiplier values (STEP 635), and updating a player profile based on the determined award amount (STEP 640).

The method 600, at STEP 605, can include maintaining a plurality of contests (e.g., contests 255) corresponding to one or more live events and one or more candidate selections (e.g., candidate selections 262) for potential lineups. To do so, any of the operations of the contest maintainer 225 of FIG. 2 can be performed. The data processing system can maintain a set of contests within non-transitory memory (e.g., storage 215). In some implementations, the data processing system can maintain related candidate selections (e.g., candidate selections 262) for potential lineups (e.g., potential lineups 260 constructed via interactions at client devices 220) available for those live events and can update the contests in real time or near real time (e.g., using such lineups 260 as entries). Maintaining the contests may include automatically generating/creating additional contests when the number of open contests cannot satisfy assignment/selection operations for additional lineups (e.g., operations described in connection with the value determiner 235 of FIG. 2, etc.). The data processing system can use information relating to data records (e.g., wager opportunities) to create additional candidate selections for inclusion in the The method 600, at STEP 610, can include retrieving/obtaining/accessing probability values (e.g., probability values 272) for wager opportunities (e.g., data records 270, etc.) corresponding to candidate selections (e.g., candidate selections 262 that may be provided to client devices 220 to create lineups 260 as described herein). To do so, any of the operations of the contest maintainer 225 and/or the value determiner 235 of FIG. 2 may be performed. For example, the data processing system can retrieve/obtain/access, via one or more APIs, a plurality of probability values associated with wager opportunities for available live events, which may be used in creating/generating candidate selections for potential inclusion in lineups. Such probability values can be used to generate corresponding multiplier values (e.g., multiplier values 274) for such candidate selections. In some implementations, the data processing system can access sportsbook data sources/feeds/repositories that can provide line, price, and/or odds information, which can be transformed into and/or used as the probability values for subsequent computation. In one example, the data processing system can obtain fractional and/or decimal odds for each wager opportunity that is to be used to create a candidate selection and can convert such odds into implied probability values.

The method 600, at STEP 615, can include generating multiplier values (e.g., multiplier values 274) based on the probability values for the candidate selections. To do so, any of the operations of the contest maintainer 225 and/or the value determiner 235 of FIG. 2 may be performed. The data processing system can determine, for at least one candidate selection, that a wager opportunity (e.g., data record 270) used to generate a candidate selection according to the techniques described in connection with FIG. 2 is associated with a probability value different from a 50% probability, and can generate a multiplier value for that candidate selection in response to determining the deviation. In some implementations, to generate the multiplier value for a candidate selection, the data processing system can apply a nonlinear function, such as a logarithmic conversion, to map the probability value of the corresponding data record (e.g., wager opportunity) to a corresponding multiplier value inversely related to the likelihood of occurrence. For example, the data processing system can generate smaller multiplier values for higher-probability outcomes and greater multiplier values for lower-probability outcomes. In some implementations, the multiplier value can be generated to be less than a predetermined multiplier ceiling value (e.g., a configured threshold) stored within configuration parameters/settings of the data processing system.

The method 600, at STEP 620, can include receiving a request identifying a lineup (e.g., a lineup 260) having a set of selections (e.g., selections 262) selected from the candidate selections. To do so, any of the operations of the device communicator 230 of FIG. 2 may be performed. For example, the data processing system can receive, from a client device, a message identifying the player profile and a set of selections for the lineup. In some implementations, the request can include an indication of an entry amount (e.g., an entry amount 263) associated with the lineup. In some implementations, the data processing system can parse the request to verify that all identified selections are valid, and that the credit balance of the player profile includes an amount equal to or greater than the specified entry amount. Upon receiving and verifying the request, the data processing system can initiate contest entry operations in STEP 625.

The method 600, at STEP 625, can include selecting a subset of the contests in which the lineup is to be entered. To do so, any of the operations of the value determiner 235 of FIG. 2 may be performed. The data processing system can identify contests currently open for entry and select one or more contests that correspond to the live events identified by/associated with the lineup selections. The subset of contests may be selected further based on classifications, as described in connection with FIGS. 2 and 5. In some implementations, the data processing system can distribute a respective portion of the entry amount to each of the selected subset of contests based on seat availability and/or configurable allocation rules, as described herein. For example, the data processing system can assign equal portions of the entry amount to each contest within the subset. The data processing system can update each selected contest to indicate that the lineup is entered into the contest. In some implementations, such updates may include incrementing an entry/registration count associated with a contest. As described herein, the data processing system may close entry for a contest once one or more contest initiation conditions have been met (e.g., associated live events have started, a configured time period has expired, etc.)

The method 600, at STEP 630, can include determining a respective outcome (e.g., outcomes 265) for each contest of the selected subset. To do so, any of the operations of the value determiner 235 and/or the output provider 240 of FIG. 2 may be performed. The outcomes may be determined, for example, by evaluating the selections of all lineups entered into each contest using the obtained event data. Such evaluations may be performed in real time or near real time, as described herein. The data processing system can receive/obtain/access event data from one or more data feeds/sources corresponding to the live events associated with the selections of the entry lineups. In some implementations, the event data can include live statistical metrics and/or event outcomes provided/accessed via one or more APIs. In some implementations, the data processing system can evaluate the conditions of each selection relative to those metrics. For example, the data processing system can determine whether a numerical threshold condition identified in each selection was satisfied and can update the corresponding result to indicate a win, loss, or void for that contest instance.

The data processing system can use the determined outcomes of the selections to evaluate contest-level results and to assign each lineup to a corresponding winning tier within every contest in which the lineup was entered. In some implementations, the data processing system can determine the number of selections identified as correct for each lineup in the contest and compare that count against stored payout tier conditions defining target levels such as four of six, five of six, or six of six correct selections. For example, when the data processing system identifies a lineup having four correct selections in a five-selection contest, it can assign that lineup to the tier corresponding to four correct selections and compute an award multiplier and/or payout ratio associated with that tier using the techniques described herein. The data processing system can repeat this evaluation for all participating lineups to determine which lineups fall into each winning tier. In some implementations, the determined contest outcomes can be stored in association with each contest to facilitate the generation of award amounts (e.g., output values 267) for each lineup (e.g., by determining relative standings among entrants of the same contest, etc.).

The method 600, at STEP 635, can include determining an award amount (e.g., an output value 267 and/or a minimum value 268) for the lineup based on the outcomes of the contests in which the lineup was entered and the multiplier values. To do so, any of the operations of the value determiner 235 and/or the output provider 240 of FIG. 2 may be performed. In one example, The data processing system can determine a cumulative multiplier value for the lineup based on the product of the multiplier values associated with each of the correct selections of the lineup (e.g., when the lineup satisfies a winning condition). In some implementations, the data processing system can a minimum award amount (e.g., a minimum value 268) for the lineup and a final payout value (e.g., an output value 267) for the lineup.

The data processing system can determine the minimum award amount/value for the lineup using an entry amount associated with the lineup and the multiplier value corresponding to each selection included in the lineup. In some implementations, the data processing system can multiply the entry amount by a cumulative multiplier value derived from the product of the individual multiplier values of all correct selections of the lineup (e.g., if a predetermined number of selections in the lineup are correct, such that the lineup satisfies a win condition) to generate the minimum value for the lineup (e.g., prior to completion of all contests and/or live events). The data processing system can determine a final output value for the lineup after all live events and/or contests associated with the lineup have been completed/settled by determining outcomes of each selection and by applying the corresponding multiplier values to determine an effective total payout. In some implementations, the final output value may be calculated according to standing points allocated to the lineup, which may be a function of the cumulative multiplier value for the lineup, as described herein. In some implementations, the data processing system can determine a difference between the final output value and the minimum value.

The method 600, at STEP 640, can include updating a player profile based on the determined award amount (e.g., the minimum value 268, the output value 267, etc.). To do so, any of the operations of the value determiner 235 and/or the output provider 240 of FIG. 2 may be performed. The data processing system can update the player profile by modifying the credit balance and/or stored payout history data in the player profile. The player profile can be updated to reflect the determined award amount(s), as described herein. In some implementations, the data processing system can generate a message and/or response that includes the award amount(s), and can transmit the message/response to the client device corresponding to the lineup and/or selections for presentation to the user. The client device can display this information via a graphical user interface, for example within a payout summary or results panel showing the credited amount, the underlying lineup performance, and any incremental adjustments after the final settlement. In some implementations, display data provided by the data processing system can include labels identifying whether the amount represents a guaranteed payout, a peer-based bonus, and/or a combination thereof.

At least one aspect relates to a system. The system can maintain a plurality of contests and a plurality of candidate picks corresponding to one or more live events. The system can retrieve a plurality of probability values of a plurality of wager opportunities that respectively correspond to a plurality of candidate picks. The system can generate, using the plurality of probability values, a plurality of multiplier values respectively corresponding to the plurality of candidate picks. The system can receive, from a client device, a request identifying a player profile and a lineup comprising a set of picks selected from the plurality of candidate picks. The system can select, based on the set of picks of the lineup, a subset of the plurality of contests in which the lineup is to be entered. The system can determine, based on one or more messages indicating one or more events that occurred in the one or more live events, a respective outcome of each contest of the subset of the plurality of contests. The system can determine an award amount for the lineup based on (i) the respective outcome of each contest of the subset of the plurality of contests and (ii) each respective multiplier value of the plurality of multiplier values corresponding to each pick of the set of picks of the lineup. The system can update the player profile according to the award amount for the lineup.

In some implementations, the system can retrieve the plurality of probability values via one or more application programming interfaces. In some implementations, the system can determine, for at least one candidate pick of the plurality of candidate picks, that a corresponding wager opportunity is associated with a probability value different from a 50 percent probability. In some implementations, the system can generate a multiplier value of the plurality of multiplier values for the at least one candidate pick in response to determining that the corresponding wager opportunity is associated with the probability value different from the 50 percent probability. In some implementations, the system can generate each multiplier value of the plurality of multiplier values to be less than a predetermined multiplier value.

In some implementations, the system can detect a change to a first probability value of a first wager opportunity corresponding to a first pick of the set of picks. In some implementations, the system can update a first multiplier value of the plurality of multiplier values associated with the first pick in response to detecting the change to the first probability value of the first wager opportunity. In some implementations, the system can receive an indication of an entry amount associated with the lineup. In some implementations, the system can determine the award amount for the lineup further based on the entry amount. In some implementations, the system can determine a cumulative multiplier value for the lineup based on each respective multiplier value of the plurality of multiplier values corresponding to each pick of the set of picks of the lineup.

In some implementations, the system can determine the award amount for the lineup based on the cumulative multiplier value. In some implementations, the system can maintain, in non-transitory memory, a data structure storing each candidate pick of the plurality of candidate picks in association with a respective wager opportunity and a respective multiplier value. In some implementations, the system can determine that at least one candidate pick satisfies a criterion. In some implementations, the system can assign a multiplier value to the at least one candidate pick based on the criterion. In some implementations, the system can receive, from one or more external data feeds, event data corresponding to the one or more live events. In some implementations, the system can determine the respective outcome of each contest of the subset of the plurality of contests based at least in part on the event data.

At least one other aspect relates to a method. The method can include maintaining a plurality of contests and a plurality of candidate picks corresponding to one or more live events. The method can include retrieving a plurality of probability values of a plurality of wager opportunities that respectively correspond to a plurality of candidate picks. The method can include generating, using the plurality of probability values, a plurality of multiplier values respectively corresponding to the plurality of candidate picks. The method can include receiving, from a client device, a request identifying a player profile and a lineup comprising a set of picks selected from the plurality of candidate picks. The method can include selecting, based on the set of picks of the lineup, a subset of the plurality of contests in which the lineup is to be entered. The method can include determining, based on one or more messages indicating one or more events that occurred in the one or more live events, a respective outcome of each contest of the subset of the plurality of contests. The method can include determining an award amount for the lineup based on (i) the respective outcome of each contest of the subset of the plurality of contests and (ii) each respective multiplier value of the plurality of multiplier values corresponding to each pick of the set of picks of the lineup. The method can include updating the player profile according to the award amount for the lineup.

In some implementations, the method can include retrieving the plurality of probability values via one or more application programming interfaces. In some implementations, the method can include determining, for at least one candidate pick of the plurality of candidate picks, that a corresponding wager opportunity is associated with a probability value different from a 50 percent probability. In some implementations, the method can include generating a multiplier value for the at least one candidate pick in response to determining that the corresponding wager opportunity is associated with the probability value different from the 50 percent probability. In some implementations, the method can include generating each multiplier value of the plurality of multiplier values to be less than a predetermined multiplier value.

In some implementations, the method can include detecting a change to a first probability value of a first wager opportunity corresponding to a first pick of the set of picks. In some implementations, the method can include updating a first multiplier value of the plurality of multiplier values associated with the first pick in response to detecting the change to the first probability value of the first wager opportunity. In some implementations, the method can include receiving an indication of an entry amount associated with the lineup. In some implementations, the method can include determining the award amount for the lineup further based on the entry amount associated with the lineup. In some implementations, the method can include determining a cumulative multiplier value for the lineup based on each respective multiplier value of the plurality of multiplier values corresponding to each pick of the set of picks of the lineup.

In some implementations, the method can include determining the award amount for the lineup based on the cumulative multiplier value. In some implementations, the method can include maintaining a data structure storing each candidate pick of the plurality of candidate picks in association with a respective wager opportunity and a respective multiplier value. In some implementations, the method can include determining that at least one candidate pick satisfies a criterion. In some implementations, the method can include assigning a multiplier value to the at least one candidate pick based on the criterion. In some implementations, the method can include receiving event data corresponding to the one or more live events. In some implementations, the method can include determining the respective outcome of each contest of the subset of the plurality of contests based at least in part on the event data.

Implementations of the subject matter and the operations described in this specification can be implemented in digital electronic circuitry, or in computer software embodied on a tangible medium, firmware, or hardware, including the structures disclosed in this specification and their structural equivalents, or in combinations of one or more of them. Implementations of the subject matter described in this specification can be implemented as one or more computer programs, e.g., one or more components of computer program instructions, encoded on computer storage medium for execution by, or to control the operation of, data processing apparatus. The program instructions can be encoded on an artificially generated, propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can include a source or destination of computer program instructions encoded in an artificially generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The terms "data processing apparatus," "data processing system," "client device," "computing platform," "computing device," or "device" encompass all kinds of apparatuses, devices, and machines for processing data, including by way of example a programmable processor, a computer, a system on a chip, or multiple ones, or combinations, of the foregoing. The apparatus can include special purpose logic circuitry (e.g., an FPGA, an ASIC, etc.). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing, and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatuses can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The elements of a computer include a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive). Devices suitable for storing computer program instructions and data include all forms of non-volatile memory, media, and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube), plasma, or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can include any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system such as the data processing system 205 can include clients and servers. For example, the data processing system 205 can include one or more servers in one or more data centers or server farms. A client and server are generally remote from each other and typically interact through a communication network. The relationship of client and server arises by virtue of computer programs running on the respective computers and having a client-server relationship to each other. In some implementations, a server transmits data (e.g., an HTML page) to a client device (e.g., for purposes of displaying data to and receiving input from a user interacting with the client device). Data generated at the client device (e.g., a result of an interaction, computation, or any other event or computation) can be received from the client device at the server, and vice versa.

While this specification contains many specific implementation details, these should not be construed as limitations on the scope of any inventions or of what may be claimed, but rather as descriptions of features specific to particular implementations of the systems and methods described herein. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In some cases, the actions recited in the claims can be performed in a different order and still achieve desirable results. In addition, the processes depicted in the accompanying figures do not necessarily require the particular order shown, or sequential order, to achieve desirable results.

In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products. For example, the various computing systems described herein can include a single module, a logic device having one or more processing modules, or one or more servers.

Having now described some illustrative implementations and implementations, it is apparent that the foregoing is illustrative and not limiting, having been presented by way of example. In particular, although many of the examples presented herein involve specific combinations of method acts or system elements, those acts and those elements may be combined in other ways to accomplish the same objectives. Acts, elements, and features discussed only in connection with one implementation are not intended to be excluded from a similar role in other implementations.

The phraseology and terminology used herein is for the purpose of description and should not be regarded as limiting. The use of "including," "comprising," "having," "containing," "involving," "characterized by," "characterized in that," and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods described herein referred to in the singular may also embrace implementations including a plurality of these elements, and any references in plural to any implementation or element or act herein may also embrace implementations including only a single element. References in the singular or plural form are not intended to limit the presently disclosed systems or methods, their components, acts, or elements to single or plural configurations. References to any act or element being based on any information, act, or element may include implementations where the act or element is based at least in part on any information, act, or element.

Any implementation disclosed herein may be combined with any other implementation, and references to "an implementation," "some implementations," "an alternate implementation," "various implementation," "one implementation," or the like are not necessarily mutually exclusive and are intended to indicate that a particular feature, structure, or characteristic described in connection with the implementation may be included in at least one implementation. Such terms as used herein are not necessarily all referring to the same implementation. Any implementation may be combined with any other implementation, inclusively or exclusively, in any manner consistent with the aspects and implementations disclosed herein.

References to "or" may be construed as inclusive so that any terms described using "or" may indicate any of a single, more than one, and all of the described terms.

Where technical features in the drawings, detailed description or any claim are followed by reference signs, the reference signs have been included for the sole purpose of increasing the intelligibility of the drawings, detailed description, and claims. Accordingly, neither the reference signs nor their absence have any limiting effect on the scope of any claim elements.

The systems and methods described herein may be embodied in other specific forms without departing from the characteristics thereof. Although the examples provided may be useful for assigning protected network sessions for network applications, the systems and methods described herein may be applied to other environments. The foregoing implementations are illustrative rather than limiting of the described systems and methods. The scope of the systems and methods described herein may thus be indicated by the appended claims, rather than the foregoing description, and changes that come within the meaning and range of equivalency of the claims are embraced therein.

What is claimed is:

1. A system, comprising:

one or more processors coupled to non-transitory memory, the one or more processors configured to:

maintain, in the non-transitory memory, one or more data structures storing a plurality of sessions corresponding to a plurality of live events, the one or more data structures associating each session with a respective condition status field;

receive, from a client device associated with a network profile, a request identifying a grouping comprising a plurality of selections, the grouping corresponding to a plurality of conditions respectively associated with a plurality of output values;

select, based on the plurality of selections of the grouping, a subset of sessions of the plurality of sessions in which the grouping is to be entered;

monitor, via one or more communication interfaces, state data received from one or more external data sources corresponding to the subset of the plurality of live events, and determine, based on i) the state data, ii) the plurality of selections of the grouping, and iii) a subset of the plurality of live events corresponding to the plurality of selections, that a first condition of a plurality of conditions of the grouping is satisfied prior to completion of all of the plurality of live events;

responsive to determining that the first condition of the grouping has been satisfied, update the condition status field in the one or more data structures to indicate satisfaction of the first condition;

update, based on the updated condition status field, the network profile according to a first output value of the plurality of output values corresponding to the first condition, wherein updating the network profile according to the first output value occurs prior to completion of all of the plurality of live events;

determine, based on a respective outcome of each session of the subset of the plurality of sessions following the completion of all of the plurality of live events, a second output value for the grouping; and update the network profile according to the second output value.

2. The system of claim 1, wherein the one or more processors are further configured to:

determine that the first condition of the grouping is satisfied based on a predetermined number of the plurality of selections being satisfied.

3. The system of claim 2, wherein the one or more processors are further configured to:

determine a number of the plurality of selections that are satisfied prior to completion of all of the plurality of live events; and determine the first output value based on the number of the plurality of selections that are satisfied prior to completion of all of the plurality of live events.

4. The system of claim 1, wherein the one or more processors are further configured to:

receive, from the client device, an indication of an input value associated with the grouping; and determine the first output value based at least in part on a multiplier and the input value.

5. The system of claim 4, wherein the one or more processors are further configured to determine the multiplier as a function of a number of the plurality of selections that are satisfied.

6. The system of claim 1, wherein the one or more processors are further configured to:

receive, from one or more external data sources, outcome data corresponding to the subset of the plurality of live events; and determine that the first condition is satisfied based at least in part on the outcome data indicating that the plurality of selections satisfy a predetermined level of correctness.

7. The system of claim 6, wherein the one or more processors are further configured to:

determine, based on the outcome data, that all of the plurality of live events have been completed; and determine the second output value for the grouping responsive to determining that all of the plurality of live events have completed.

8. The system of claim 1, wherein the one or more processors are further configured to:

determine that the second output value exceeds the first output value; and update the network profile based on an additional output value equal to a difference between the second output value and the first output value.

9. The system of claim 1, wherein updating the network profile according to the first output value comprises:

update the network profile based on the first output value prior to determining the second output value.

10. The system of claim 1, wherein the one or more processors are further configured to:

determine that a total output value for the grouping does not exceed the first output value; and determine that the second output value is zero in response to determining that the total output value for the grouping does not exceed the first output value.

11. A method, comprising:

maintaining, by one or more processors coupled to non-transitory memory, in the non-transitory memory, one or more data structures storing a plurality of sessions corresponding to a plurality of live events, the one or more data structures associating each session with a respective condition status field;

receiving, by the one or more processors, from a client device associated with a network profile, a request identifying a grouping comprising a plurality of selections, the grouping corresponding to a plurality of conditions respectively associated with a plurality of output values;

selecting, by the one or more processors, based on the plurality of selections of the grouping, a subset of sessions of the plurality of sessions in which the grouping is to be entered;

monitoring, by the one or more processors, via one or more communication interfaces, state data received from one or more external data sources corresponding to the subset of the plurality of live events, and determining, by the one or more processors, based on i) the state data, ii) the plurality of selections of the grouping, and iii) a subset of the plurality of live events corresponding to the plurality of selections, that a first condition of a plurality of conditions of the grouping is satisfied prior to completion of all of the plurality of live events;

responsive to determining that the first condition of the grouping has been satisfied, updating, by the one or more processors, the condition status field in the one or more data structures to indicate satisfaction of the first condition;

updating, by the one or more processors, based on the updated condition status field, the network profile according to a first output value of the plurality of output values corresponding to the first condition, wherein updating the network profile according to the first output value occurs prior to completion of all of the plurality of live events;

determining, by the one or more processors, based on a respective outcome of each session of the subset of the plurality of sessions following the completion of all of the plurality of live events, a second output value for the grouping; and updating, by the one or more processors, the network profile according to the second output value.

12. The method of claim 11, further comprising determining, by the one or more processors, that the first condition of the grouping is satisfied based on a predetermined number of the plurality of selections being satisfied.

13. The method of claim 12, further comprising:

determining, by the one or more processors, a number of the plurality of selections that are satisfied prior to completion of all of the plurality of live events; and determining, by the one or more processors, the first output value based on the number of the plurality of selections that are satisfied prior to completion of all of the plurality of live events.

14. The method of claim 11, further comprising:

receiving, by the one or more processors, from the client device, an indication of an input value associated with the grouping; and determining, by the one or more processors, the first output value based at least in part on a multiplier and the input value.

15. The method of claim 14, further comprising determining, by the one or more processors, the multiplier as a function of a number of the plurality of selections that are satisfied.

16. The method of claim 11, further comprising:

receiving, by the one or more processors, from one or more external data sources, outcome data corresponding to the subset of the plurality of live events; and determining, by the one or more processors, that the first condition is satisfied based at least in part on the outcome data indicating that the plurality of selections satisfy a predetermined level of correctness.

17. The method of claim 16, further comprising:

determining, by the one or more processors, based on the outcome data, that all of the plurality of live events have been completed; and determining, by the one or more processors, the second output value for the grouping responsive to determining that all of the plurality of live events have completed.

18. The method of claim 11, further comprising:

determining, by the one or more processors, that the second output value exceeds the first output value; and updating, by the one or more processors, the network profile based on an additional output value equal to a difference between the second output value and the first output value.

19. The method of claim 11, wherein updating the network profile according to the first output value comprises updating, by the one or more processors, the network profile based on the first output value prior to determining the second output value.

20. The method of claim 11, further comprising:

determining, by the one or more processors, that a total output value for the grouping does not exceed the first output value; and determining, by the one or more processors, that the second output value is zero in response to determining that the total output value for the grouping does not exceed the first output value.

* * * * *